United States Patent Office 3,439,794
Patented Apr. 22, 1969

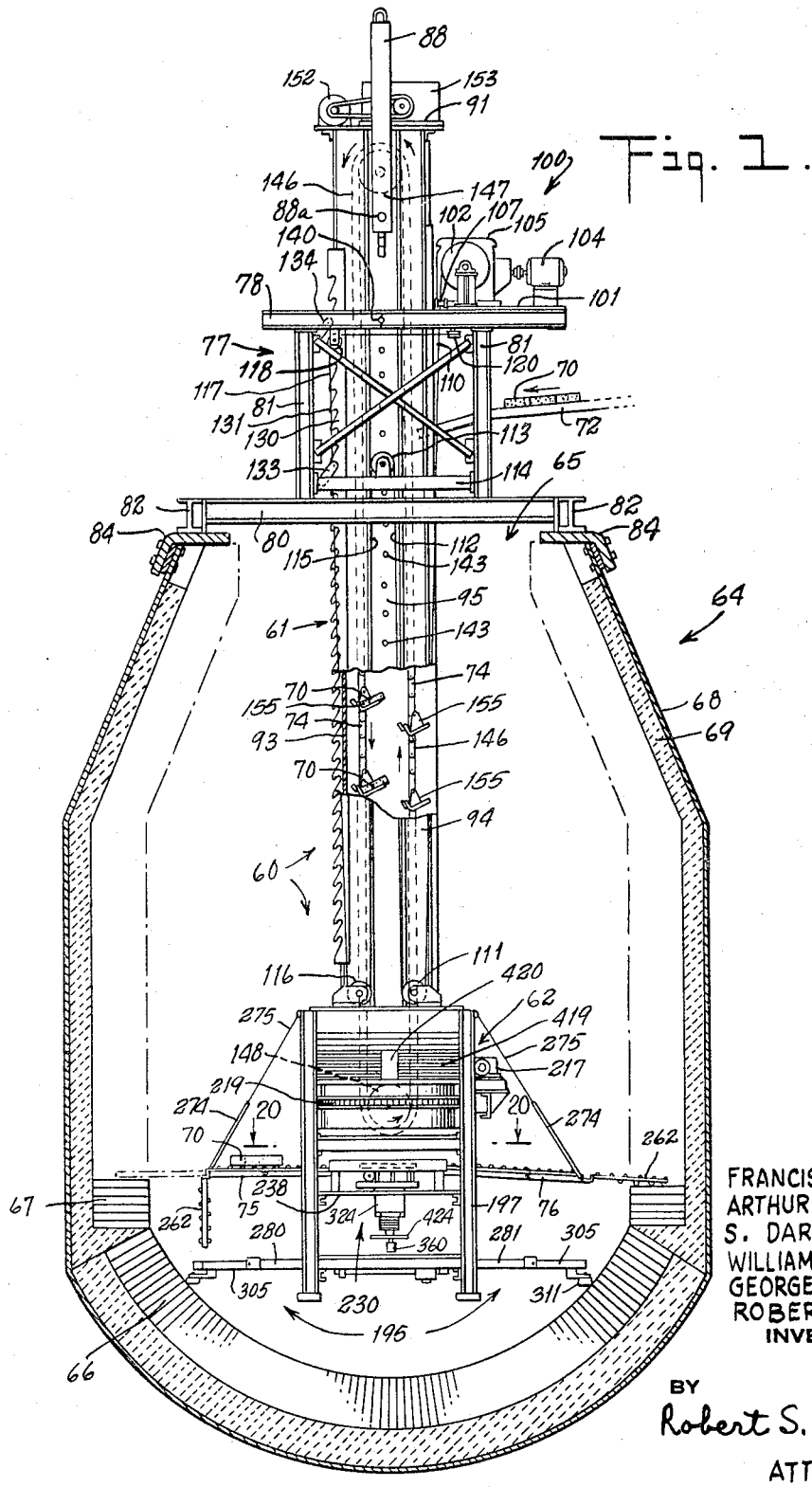

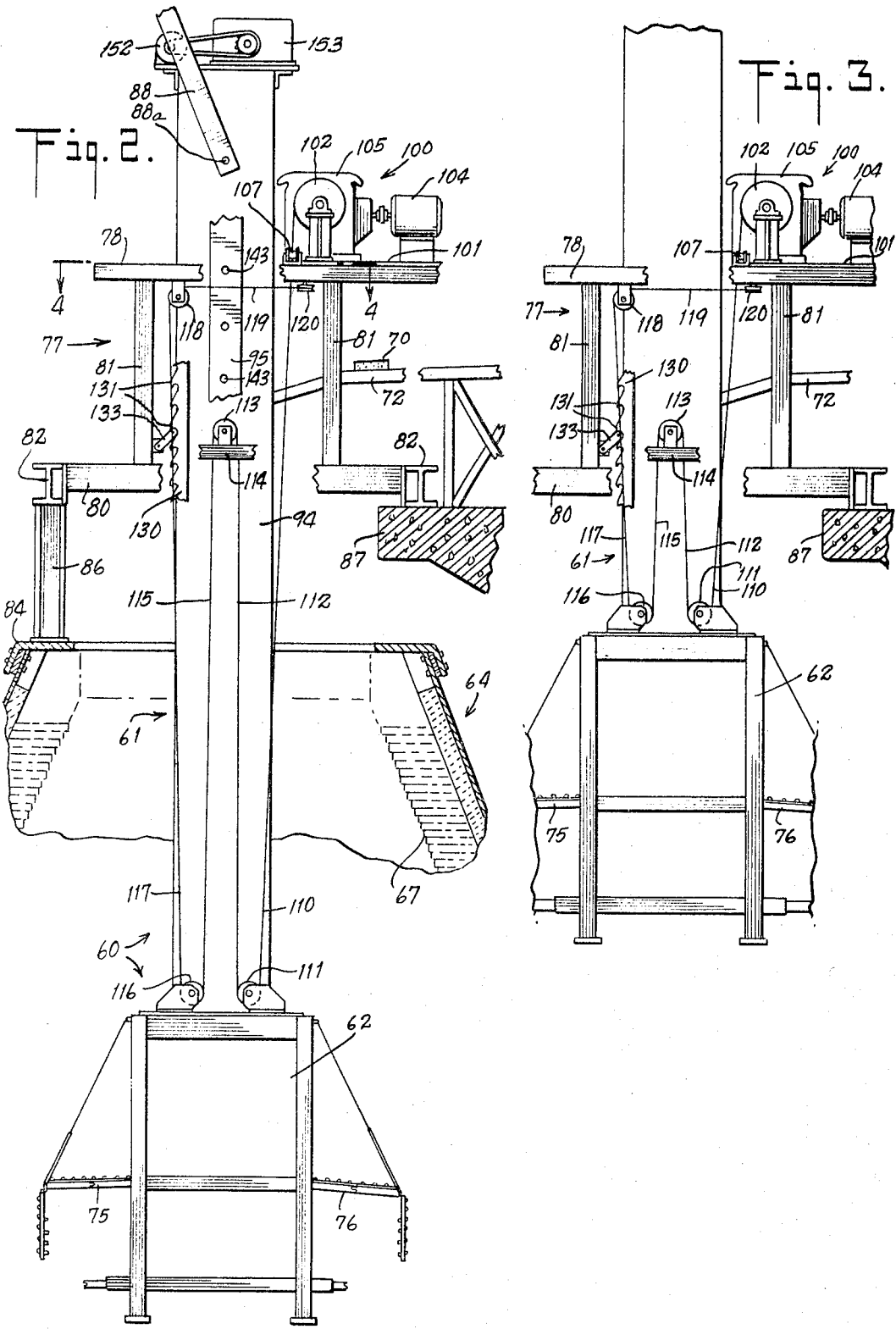

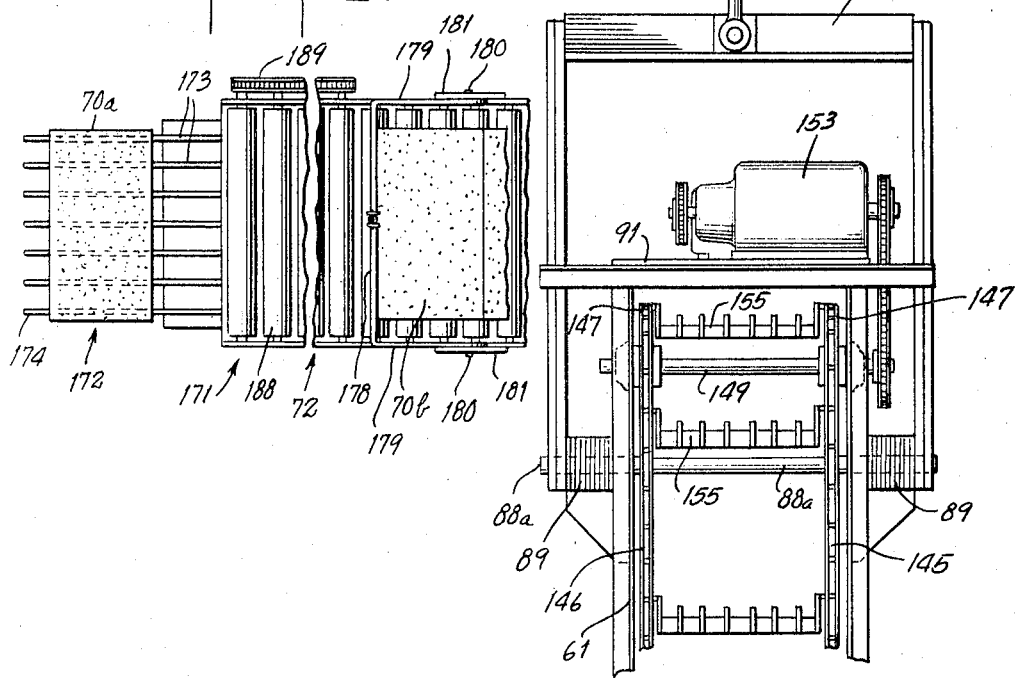
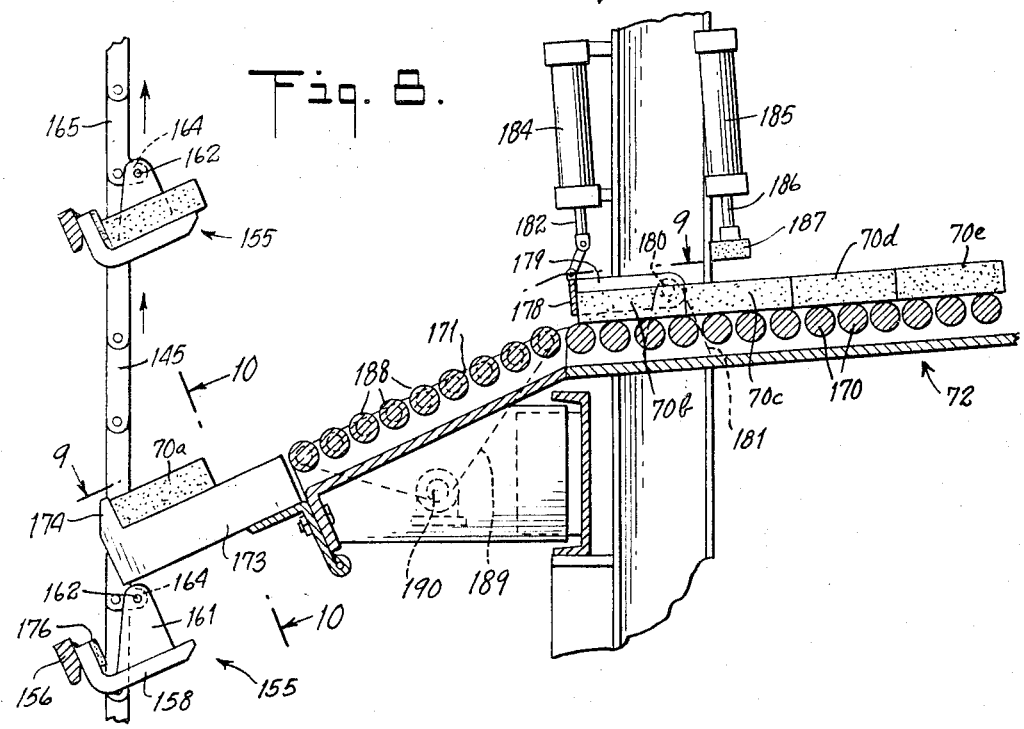

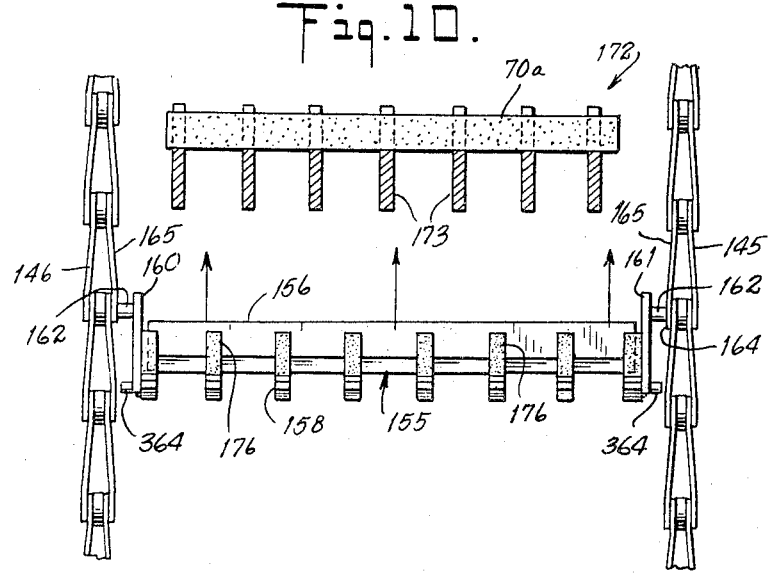
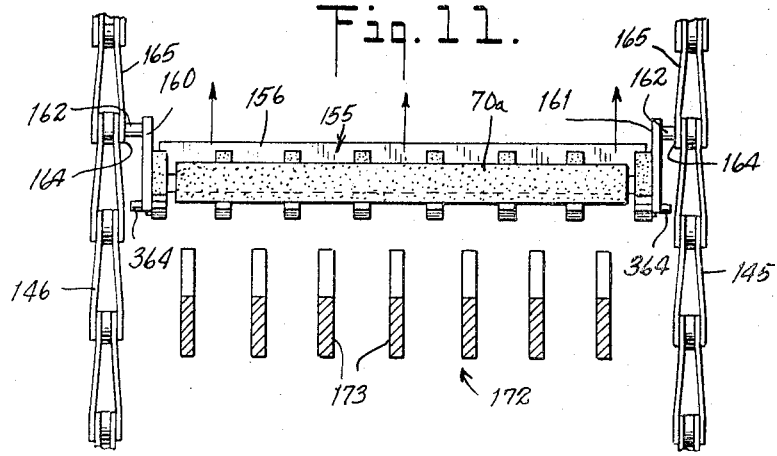
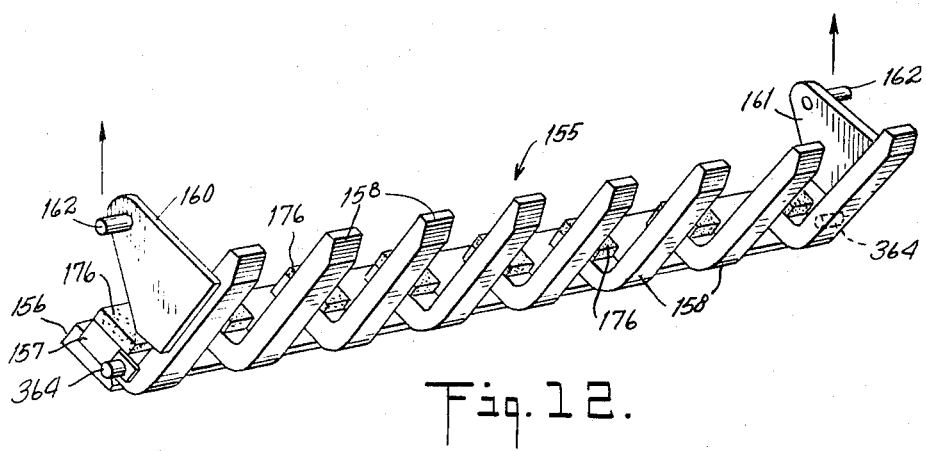

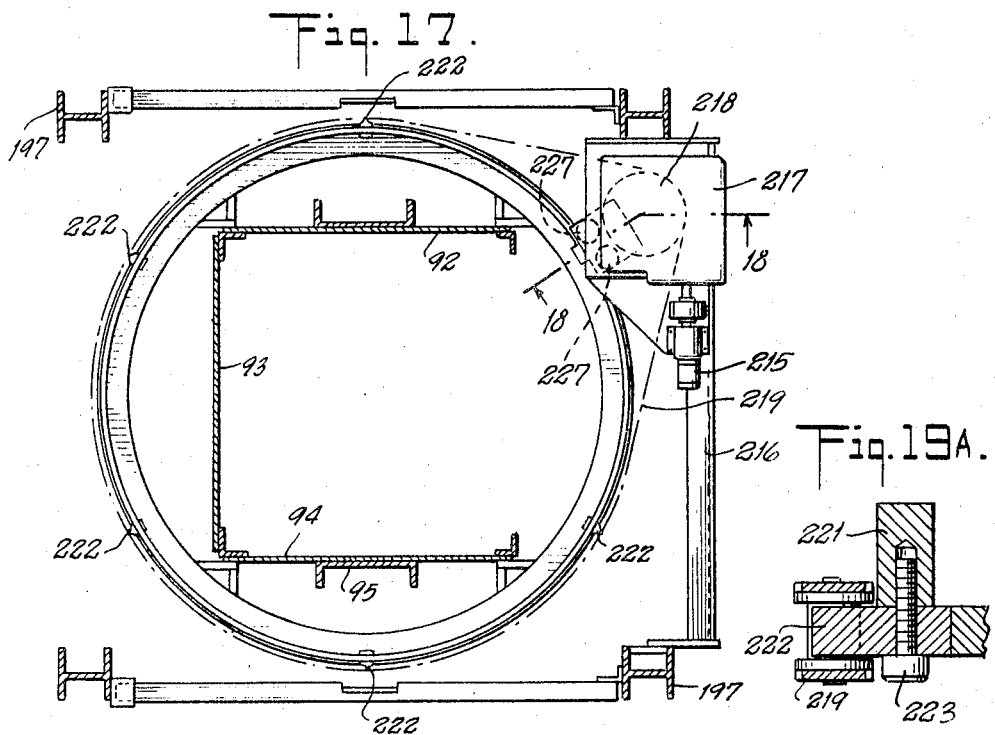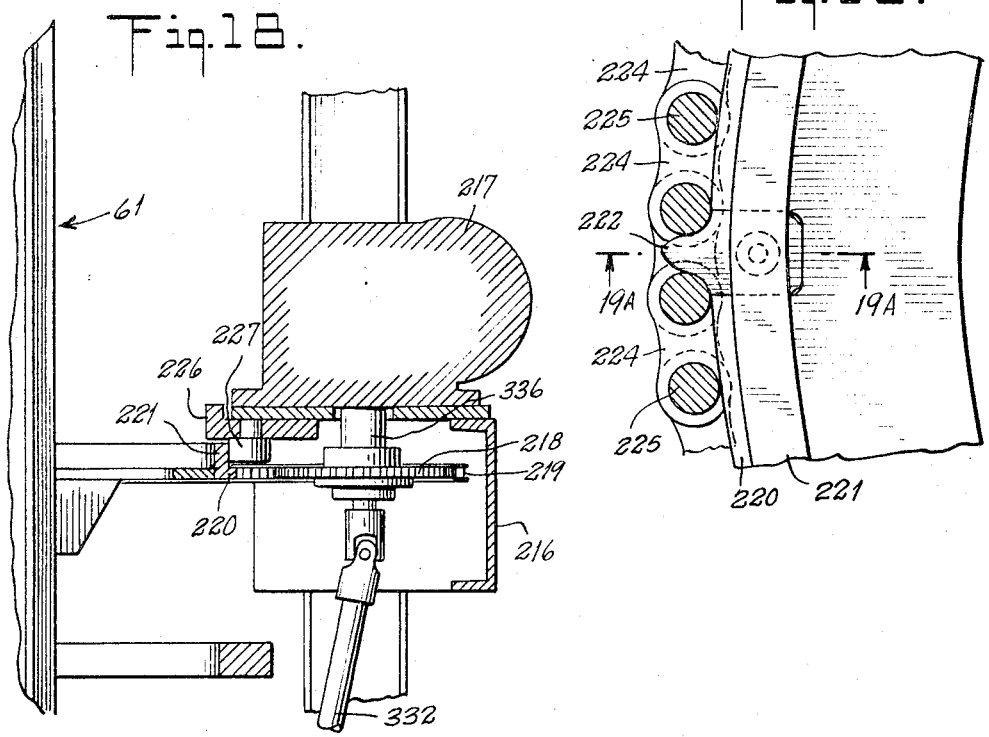

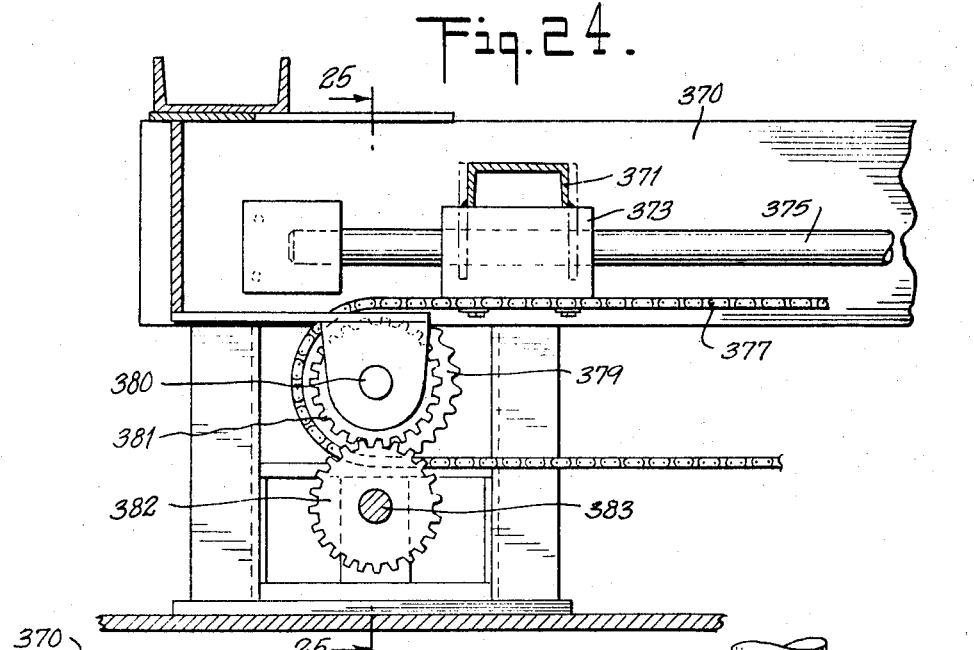
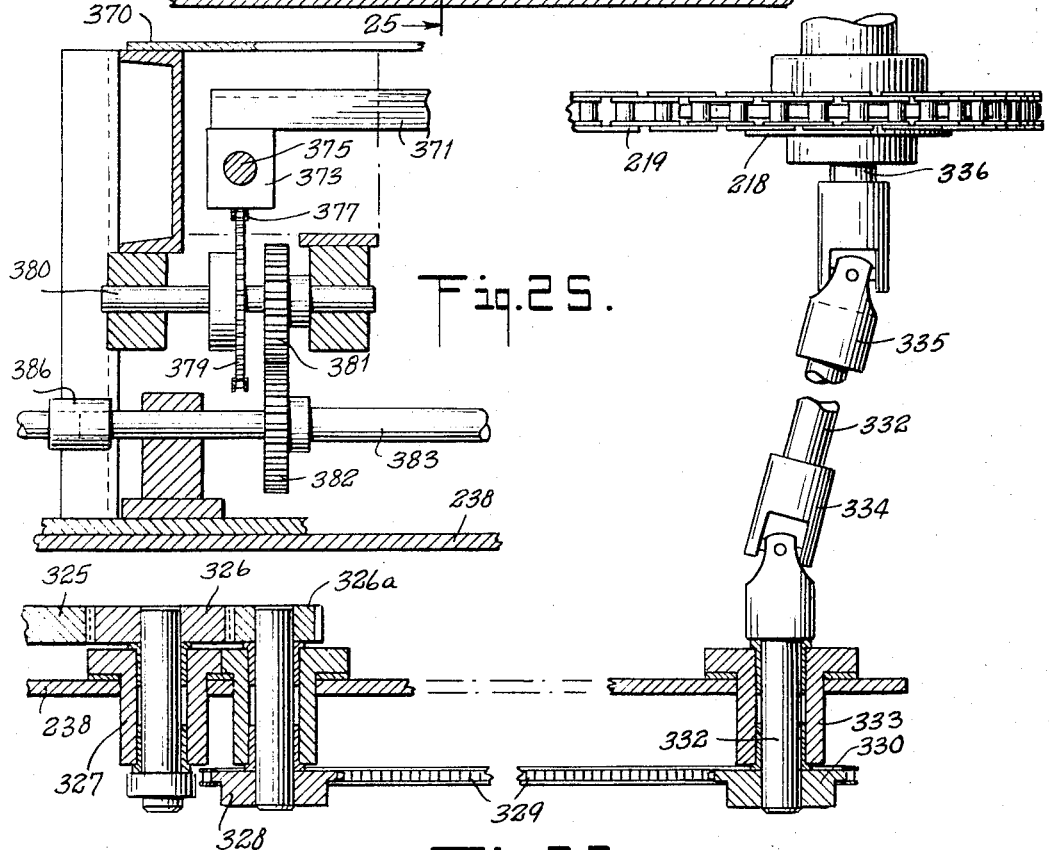

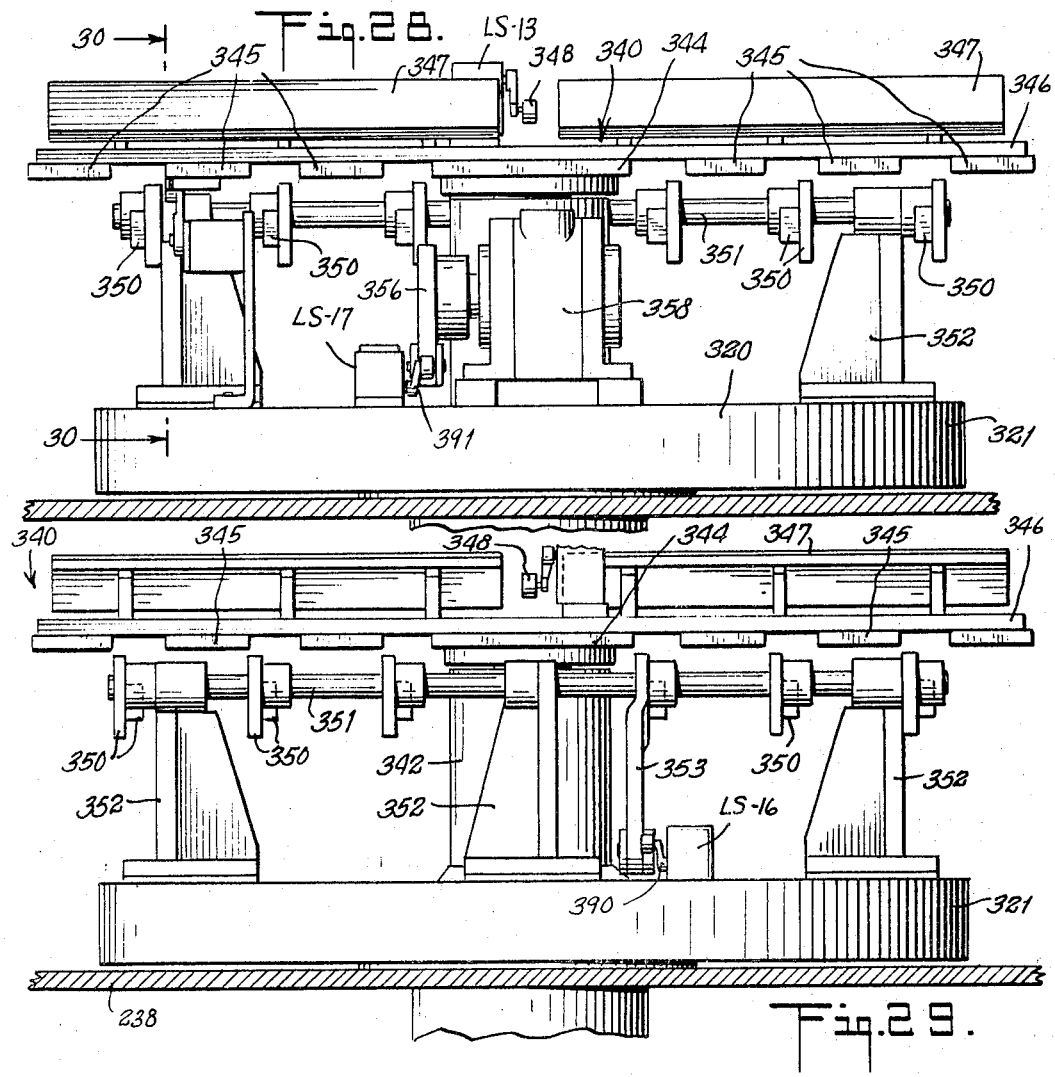
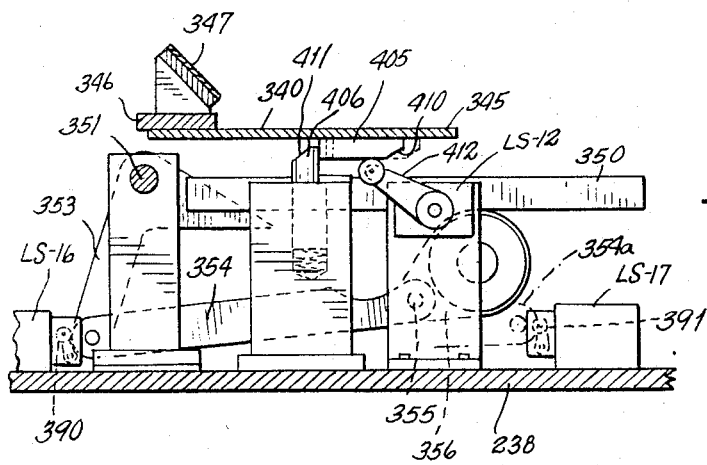

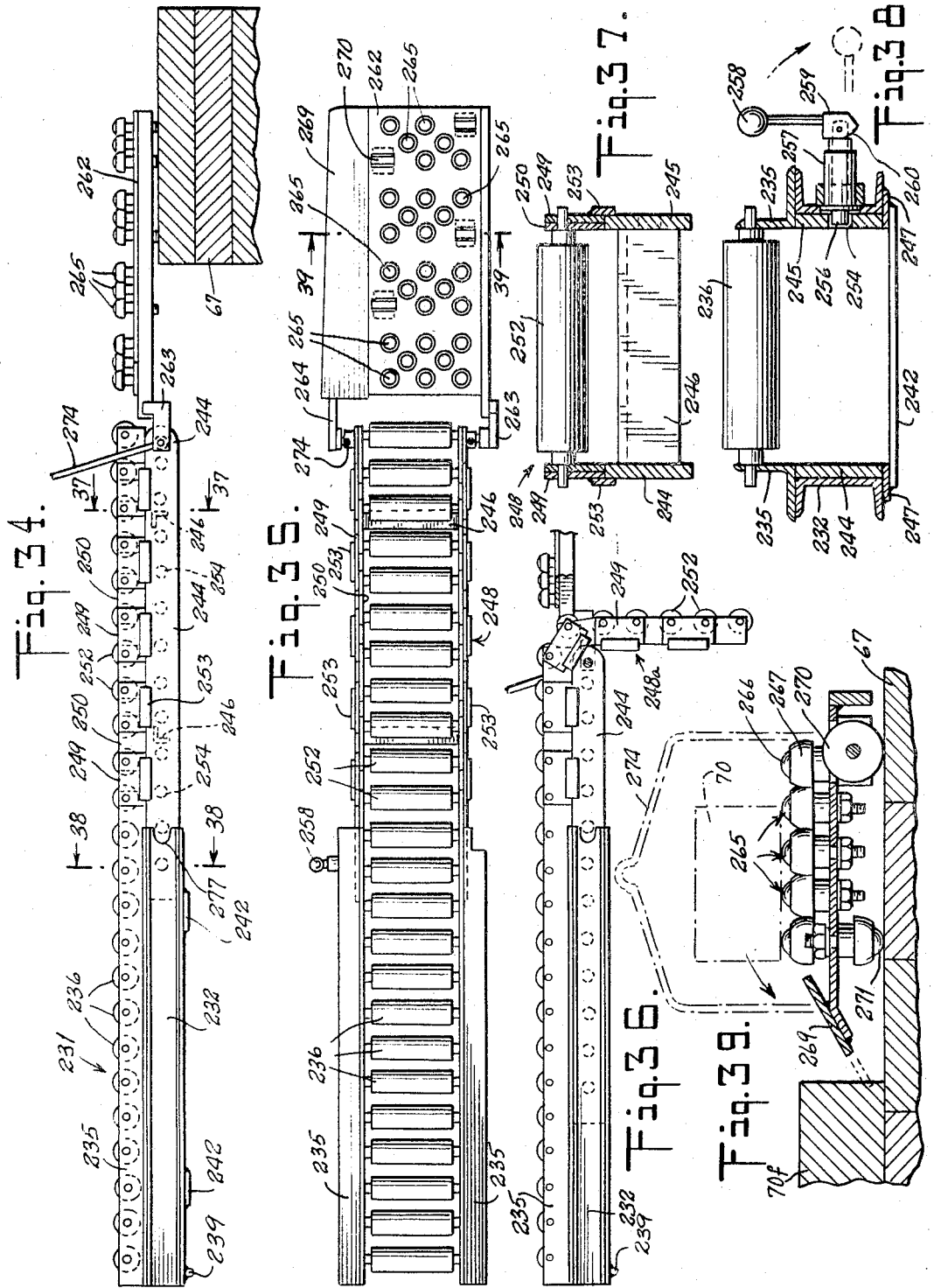

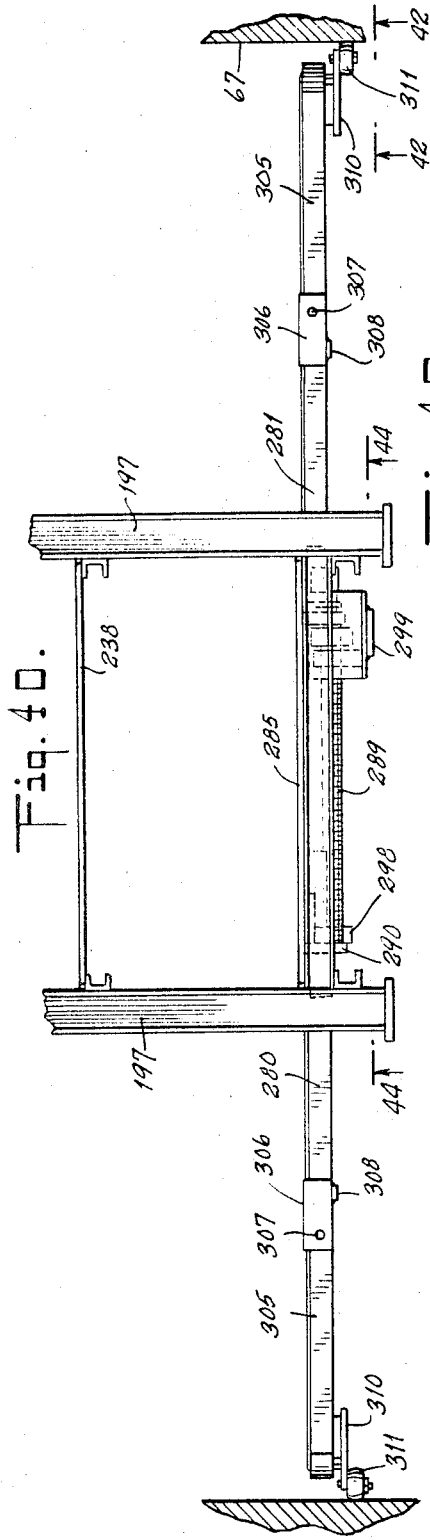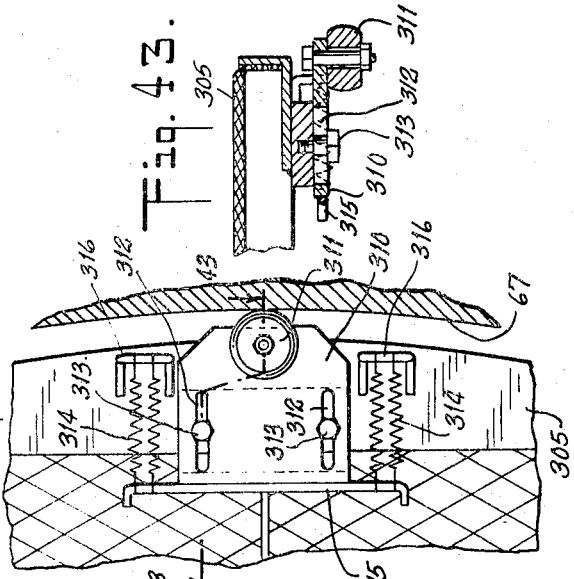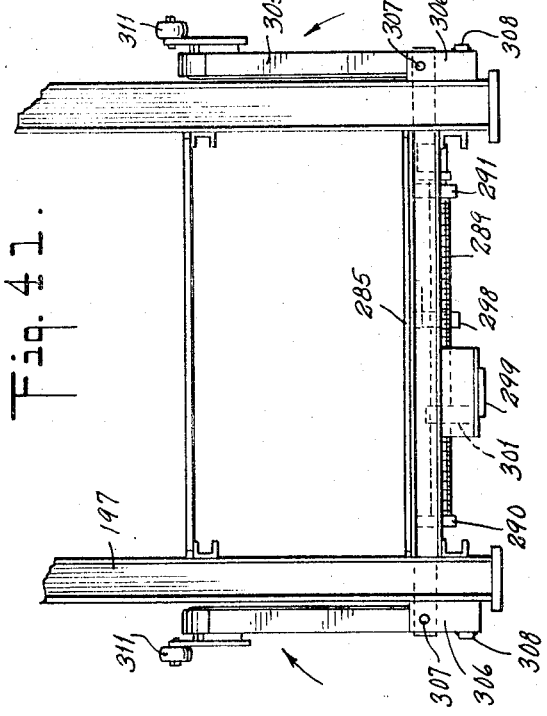

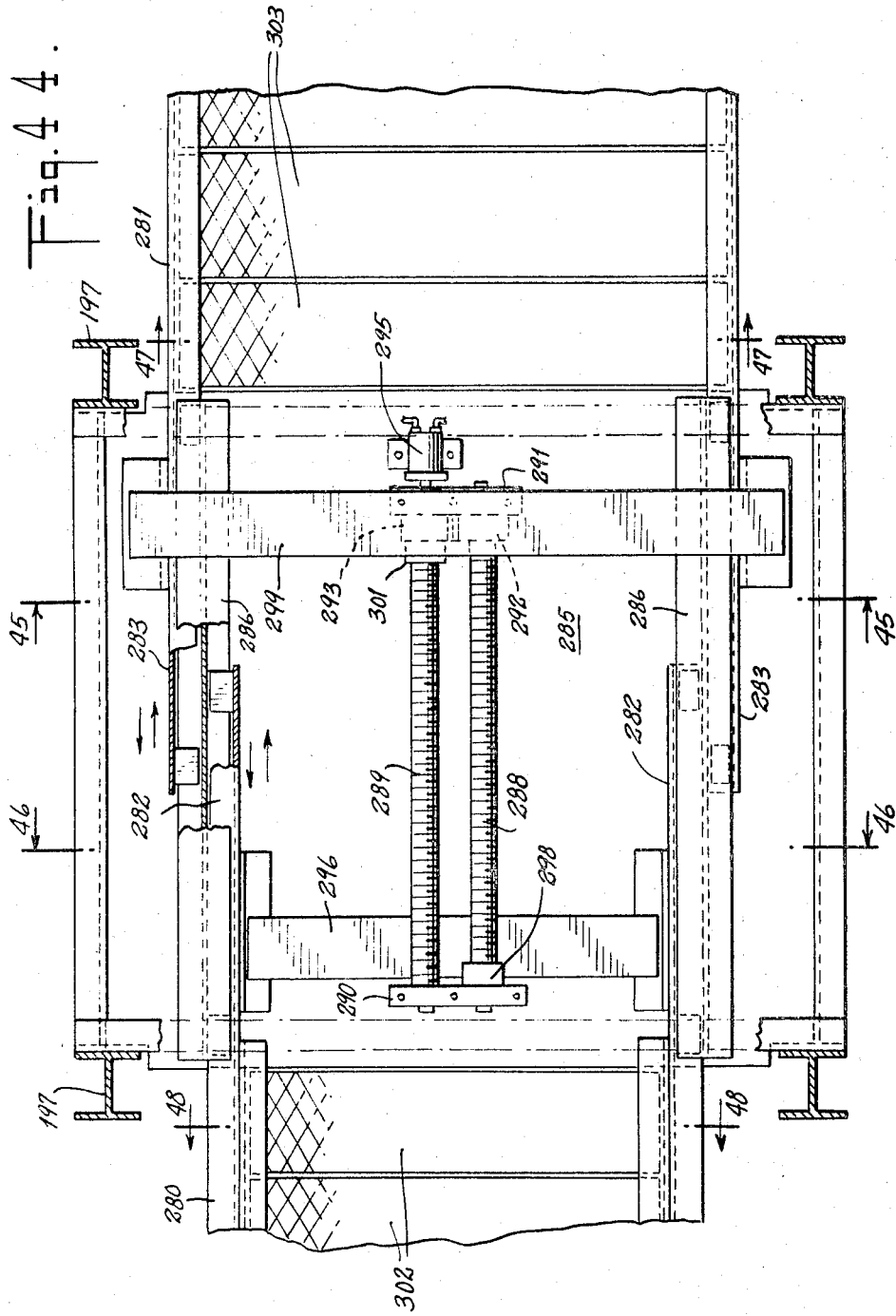

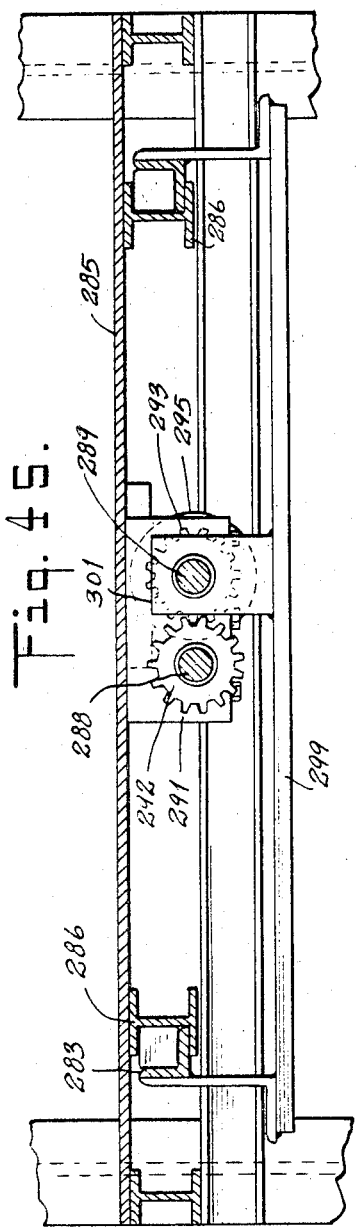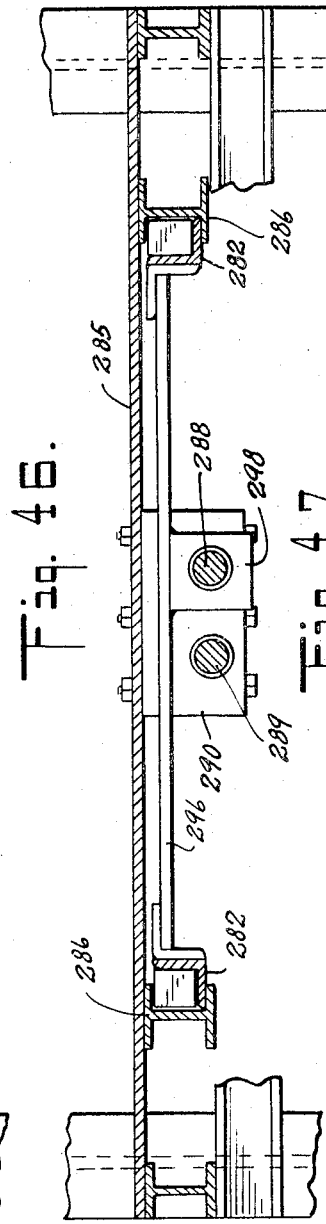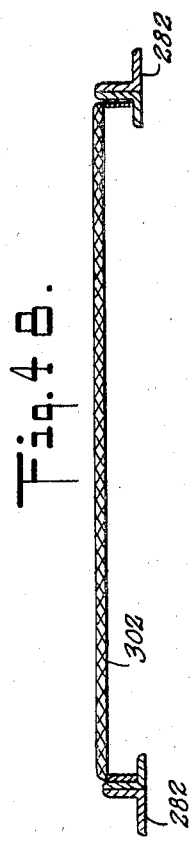

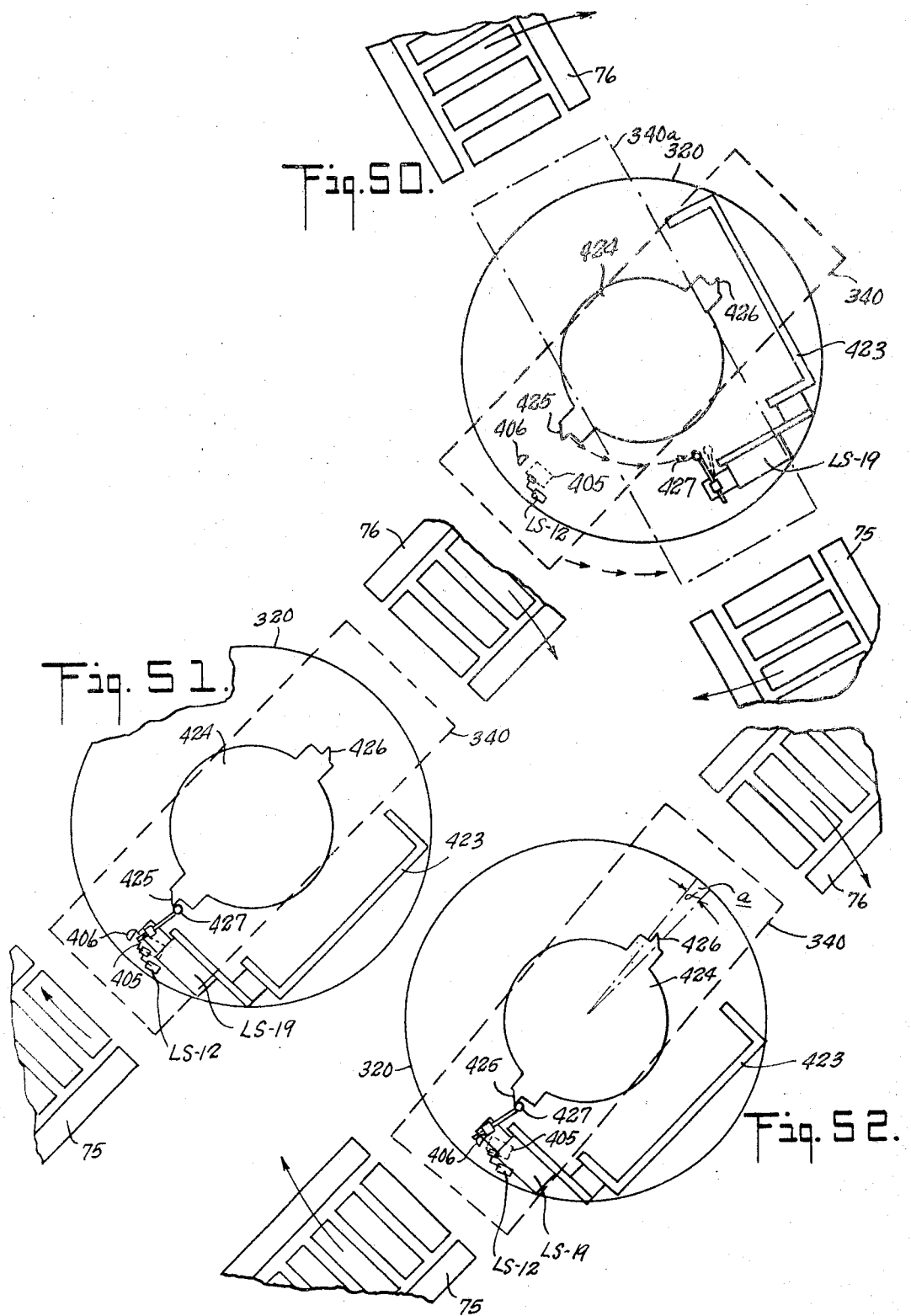

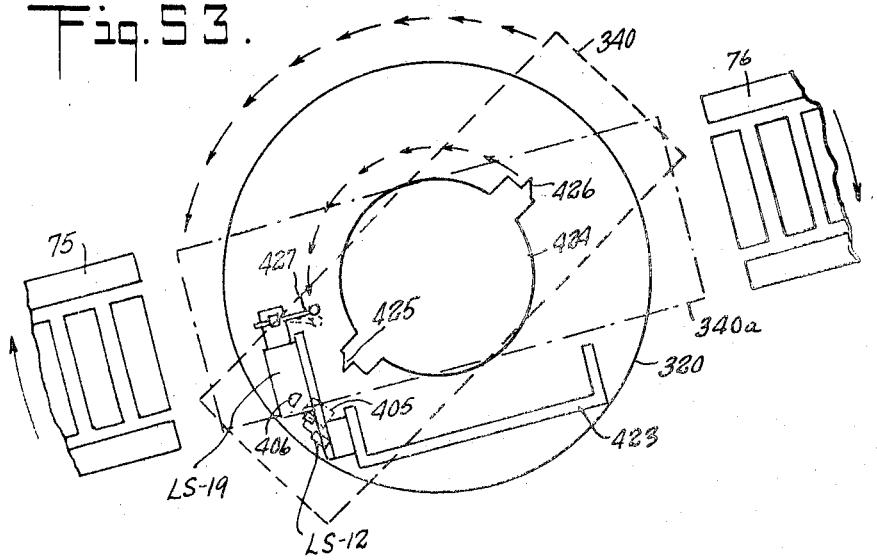
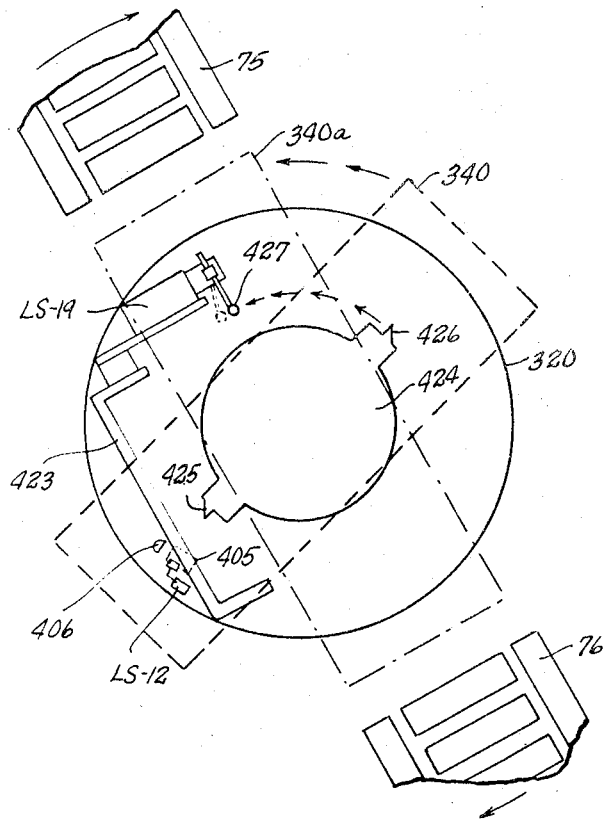

3,439,794
APPARATUS FOR CONVEYING AND DISTRIBUTING ARTICLES IN A CONFINED REGION
Francis W. Park, Novelty, Arthur K. Blough, Chagrin Falls, Stanley Darwin Noll, Shaker Heights, William F. Delfeld, Lyndhurst, George I. Kraus, University Heights, and Robert Kraus, Cleveland Heights, Ohio, assignors, by direct and mesne assignments, to Republic Steel Corporation, Cleveland, Ohio, a corporation of New Jersey
Filed Dec. 30, 1966, Ser. No. 606,058
Int. Cl. B65g 37/00; F27d 1/16
U.S. Cl. 198—83                              36 Claims

ABSTRACT OF THE DISCLOSURE

A tower to be lowered by an overhead crane into place in a steelmaking furnace vessel has an elevator consisting of a basket conveyor for refractory bricks and has a rotating carriage at the lower end with opposite lateral run-out conveyors to deliver bricks for use in lining the vessel. An escapement feeds successive bricks to the baskets at an upper locality, to be carried by the conveyor up around an upper sprocket and downward to the carriage where a cam tilts the baskets to dump each brick onto chute arms which automatically rock down to deposit the brick on a distributor table. The table automatically turns through the required angle into alignment with the run-out conveyors, onto one of which a pusher mechanism, traversing the table, then delivers the brick. An upper frame around the tower, removably seated on stationary structure above the vessel, supports the tower, and with it the carriage, by a cable hoist whereby the tower and carriage are progressively raised to suit upward progress of bricklaying. A rack and pawl provide a safety latch relative to downward displacement of the tower. The run-out conveyors include extendable roller beds and terminal structures for delivering bricks at the course being laid. The carriage also has power-driven, extendable sliding platform structures for working personnel adjacent the conveyors, the platforms and conveyors thus accommodating different diameters of the furnace vessel.

The brick delivery system including escapement, elevator, chute arms, distributor table and pushers is automatically controlled, the distribution system of the distributor table and pushers including a sequence timer and sequential circuitry, responsive to successive bricks on the table. Control is provided to distribute bricks in alternate directions on the run-out conveyors or on either conveyor alone. The extent of table movement into alignment with the run-out conveyors is controlled by structure maintained in constant orientation with the tower while the carriage turns. A complete function of the apparatus is to receive bricks from a line at an upper locality and deliver them automatically onto the rising brickwork at succeeding points of use around the interior of the vessel.

---

This invention relates to apparatus, especially of a sort movable in its entirety, for conveying articles into and distributing them within a confined region, and is more particularly concerned with apparatus for lowering and distributing bricks within large, open-top furnace vessels for lining or relining such vessels.

The novel apparatus of the invention, as in the embodiment hereinbelow described, is primarily designed for automatically supplying refractory bricks into vessels of the type employed in the basic oxygen process for making steel, being very large, open-mouth furnaces which in their normal upright position have a generally cylindrical configuration about a vertical axis, with a suitable bottom, usually curved, and with an inwardly tapering or frusto-conical configuration at the upper part. Vessels of this sort have to be relined with heavy refractory brick at rather frequent intervals, throughout the entire inside surface of the furnace shell. Since the furnace is unproductive during the down time incidental to the relining operation, it is important to expedite such operation, as well as to reduce the physical burden on required personnel, including those engaged in actual laying-up of the brick.

Whereas various kinds of conveying and distributing equipment have been heretofore made or proposed for a number of uses, including some forms of apparatus for lowering bricks or the like downwardly into furnace chambers, and likewise for effecting some lateral distribution of such articles, such apparatus has not been entirely satisfactory or has failed to provide maximum speeds or adequately controllable rates of operation, or has otherwise fallen short with respect to attainment of practical automation of the conveying and delivery operations, and in minimizing the requirement of manual labor by persons of requisite skill in the actual placing of the bricks to build up the inner wall.

An important object of the invention, therefore, is to provide an improved machine of the class described, adapted for transferring successive articles such as heavy refractory bricks from an appropriate receiving locality, and conveying them to a lower region, and there distributing them to successive, selected localities of use at the periphery of such region. Another object is to provide apparatus of this type, including improved arrangements for supplying successive articles such as bricks to a vertical conveyor or elevator, which at its lower point delivers such articles to lateral distribution means.

Another and especially important object is to afford improved transfer and distribution arrangements or mechanism whereby bricks delivered at the foot of a vertical elevator are received, suitably oriented or aligned, and conducted to the desired locality of use at the inner furnace wall or the like. A corollary object of importance is the provision of brick conveying and delivery apparatus of novel character whereby the lateral distribution of the bricks is continued to the ultimate locality of the laid-up bricks on the wall, progressively following the path of bricklaying, for a minimum of manual handling or carrying of the individual, heavy refractory shapes which usually constitute such bricks.

A still further object is the provision of novel and improved apparatus for use in furnace relining, which is readily movable as an entirety, i.e. as a complete assembly, for insertion into and withdrawal from the chamber of the furnace structure. Another object is to afford such apparatus, wherein the lateral delivery parts are not only vertically movable for progressive agreement with the situation of the buildup of bricks, but are arranged for variability or adjustability in conference with the lateral periphery of the region so that the inner contour of the vessel is appropriately followed, provision also being made for retraction of the distributing parts to permit ready introduction and withdrawal of the equipment through the mouth of the vessel.

Still further objects are to provide improved and more readily controlled equipment of the character described, and especially including novel, automatic distributing arrangements for aligning and laterally directing the bricks in one or a plurality of directions from the foot of the elevator or vertical conveyor. An additional aim of the improved arrangements is to handle the bricks with as much expedition as the laying operation can accommodate, and yet with careful attention in all parts of the path of the bricks to avoid damage or breakage of this relatively costly commodity. A supplemental object is to achieve various purposes as indicated above in equipment of this character, yet at the same time to afford commodious accommodation for working personnel, including particularly those engaged in the actual bricklaying operation adjacent the lateral distributing instrumentalities, such accommodation being adjustable to suit the inner contour of the furnace at all elevations.

To these and other ends the apparatus of the invention, in its complete and preferred embodiments such as set forth below by way of example, comprises an assembly of a supporting frame or housing, and an elevator tower carrying a rotating carriage at the foot, the whole being organized to be lifted and moved by an overhead crane or the like for insertion into and withdrawal from an upright open-mouth furnace vessel. The tower-supporting frame is arranged to rest on a suitably fixed support such as the top of the vessel or other floor or bearing structure, while the tower is carried within this frame by suitable cable-hoist means, enabling the tower and its carriage to be moved vertically, and especially to achieve the desired incremental upward movement appropriate for delivery of bricks at the successive levels of actual bricklaying operation.

The tower includes a vertical conveyor or elevator of the sort comprising an endless chain on which suitable baskets are mounted, each for receiving bricks, conveniently a single brick where these articles are of the relatively large size required in basic oxygen furnaces. The hoist-supporting frame may be located at a brick-feeding floor of the furnace shop or building, for convenience of personnel in attending the operation, and the apparatus includes novel escapement means whereby individual bricks are released from a train of such articles, to be received by successive baskets of the conveyor, the arrangement further being such that the bricks are thus loaded onto upwardly traveling baskets, whereupon the latter carry the bricks around the top sprocket means of the endless chain and then travel downward to the foot of the elevator. The apparatus at the last-mentioned locality comprises cam means engageable with successive baskets for tipping them, in turn, to discharge the bricks onto a suitable receiving chute or rest, immediately above a distributor table which is associated with lateral run-out conveyors, the receiving chute, table and conveyors being carried by the rotating carriage at the foot of the tower.

The run-out conveyor means is thus arranged to turn with the carriage below the lower end of the tower, so as to move successive bricks outward to successive desired locations around the inner periphery of the furnace vessel. Very preferably two such lateral conveyors are accommodated on the carriage, e.g. running in opposite directions. Each conveyor includes novel structure for adjusting its length to suit the inside diameter of the furnace at the level of conveyor service, and also includes means adapted to rest on brick already laid at the locality of work, for delivery of bricks there. The carriage structure also has laterally adjustable platform means for working personnel, located so that as the carriage turns, such persons are always situated in optimum position for the work.

A particularly advantageous feature of the invention involves arrangements disposed in the carriage for automatically aligning bricks, as successively received from the elevator, with the lateral conveyor means, and for successively advancing the aligned bricks onto and along such conveyor means, e.g. in alternating directions or repeatedly in a single direction. This aligning means includes the distributor table mentioned above, coacting with the brick-receiving chute and with the angular position of the carriage in its path of rotation, e.g. advantageously through linkage with the means provided to drive the carriage around such path.

Further features and details of the apparatus, including additional aspects of the invention, are hereinbelow disclosed or rendered apparent in connection with the accompanying drawings that depict a presently preferred embodiment.

Referring to the drawings:

FIG. 1 is an elevational view, on a reduced scale relative to other views, of the entire apparatus as positioned with the carriage in working location within a furnace vessel, which is shown in vertical section;

FIG. 2 is a somewhat simplified view of the tower and supporting frame, similar to FIG. 1 but with parts broken away to illustrate the hoist arrangement, this and the succeeding figure also showing an alternative supporting structure for the frame;

FIG. 3 is a fragmentary view similar to FIG. 2, showing the tower in a nearly uppermost position relative to the frame;

FIG. 7 is a fragmentary side elevation at the top of the tower, as viewed from the right in FIG. 1;

FIG. 8 is an enlarged vertical section, parallel with the plane of FIG. 1, showing the apparatus, including the escapement, for delivering bricks to the elevator;

FIG. 9 is a fragmentary plan view on line 9—9 of FIG. 8;

FIG. 10 is a fragmentary vertical view, partly in section on line 10—10 of FIG. 8, showing a conveyor basket about to lift a brick from the delivery means of FIG. 8;

FIG. 11 is a view similar to FIG. 10, but showing the basket after it has received the brick;

FIG. 12 is a perspective view of one of the conveyor baskets of the elevator, shown as if in position of such basket in FIG. 8;

Figure 13:
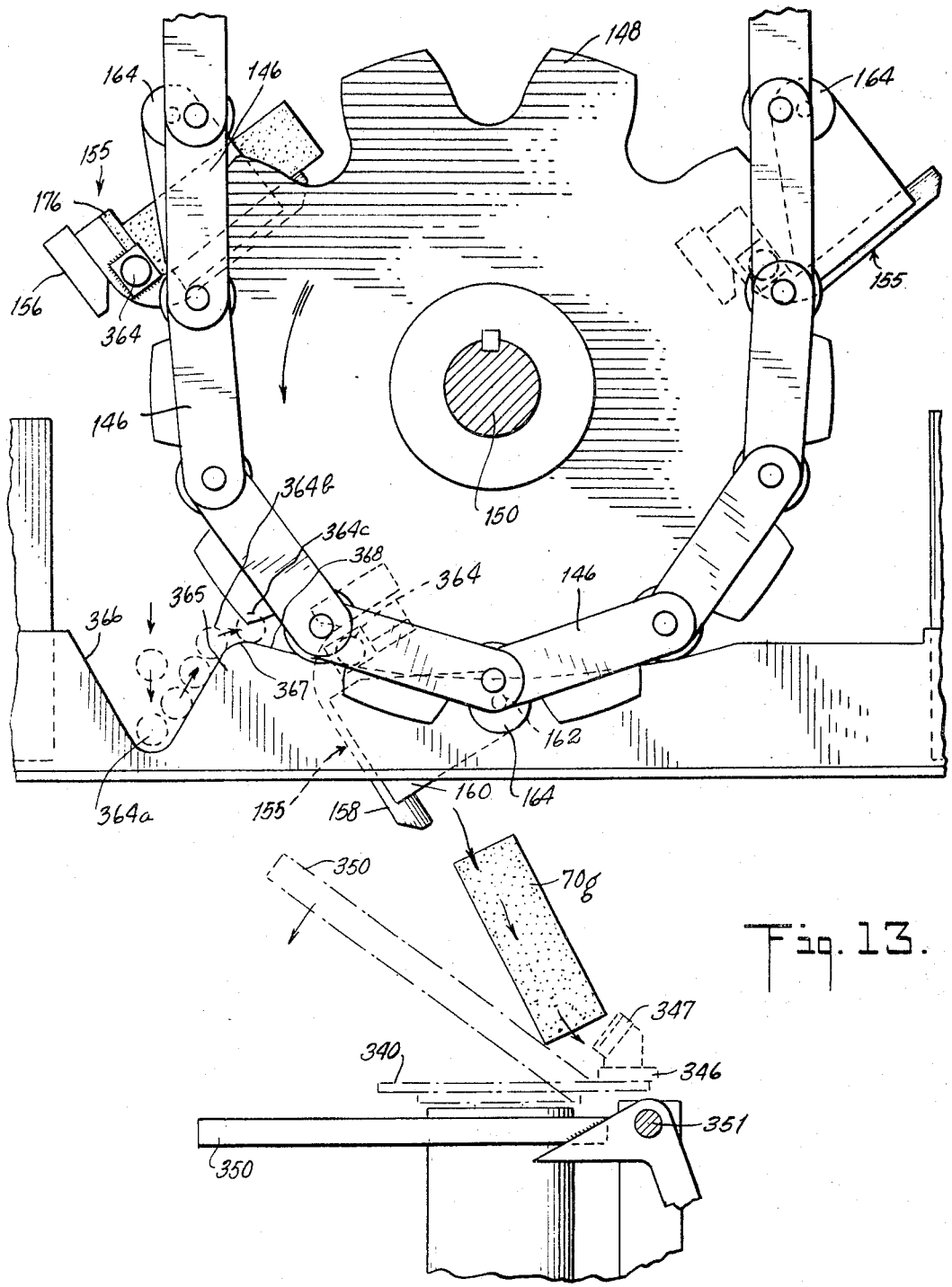
FIG. 13 is a greatly enlarged fragmentary view, chiefly in elevation on a plane parallel to that of FIG. 1 and seen from the same direction, showing a lower sprocket of the elevator, and the discharge of a brick therefrom to the receiving chute.
Figure 14:
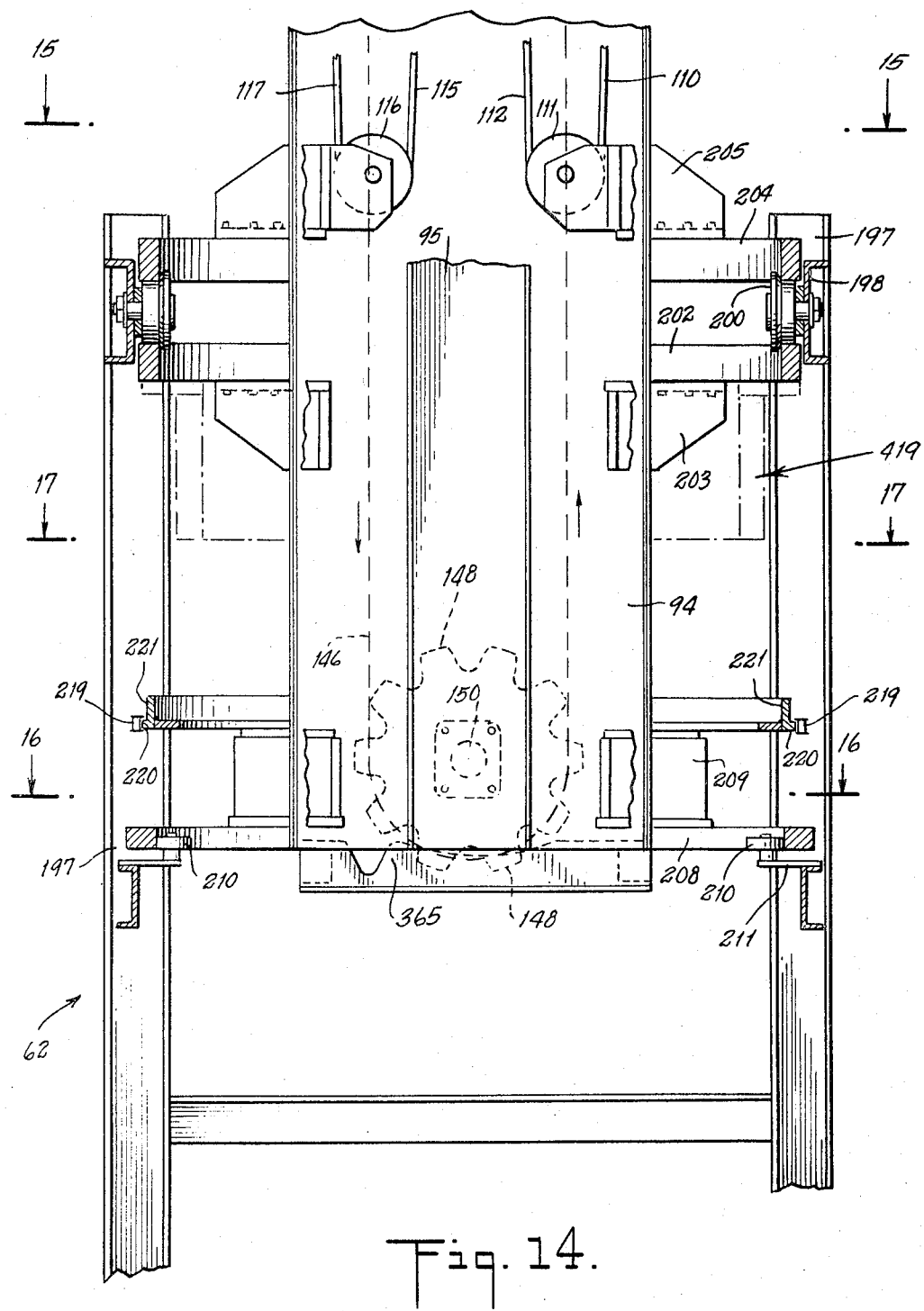
FIG. 14 is a view, in the same plane as FIG. 1 but along a line in vertical mid-section of the carriage yet showing the tower in elevation to illustrate the rotatable mounting of the carriage on the tower.
Figure 15:
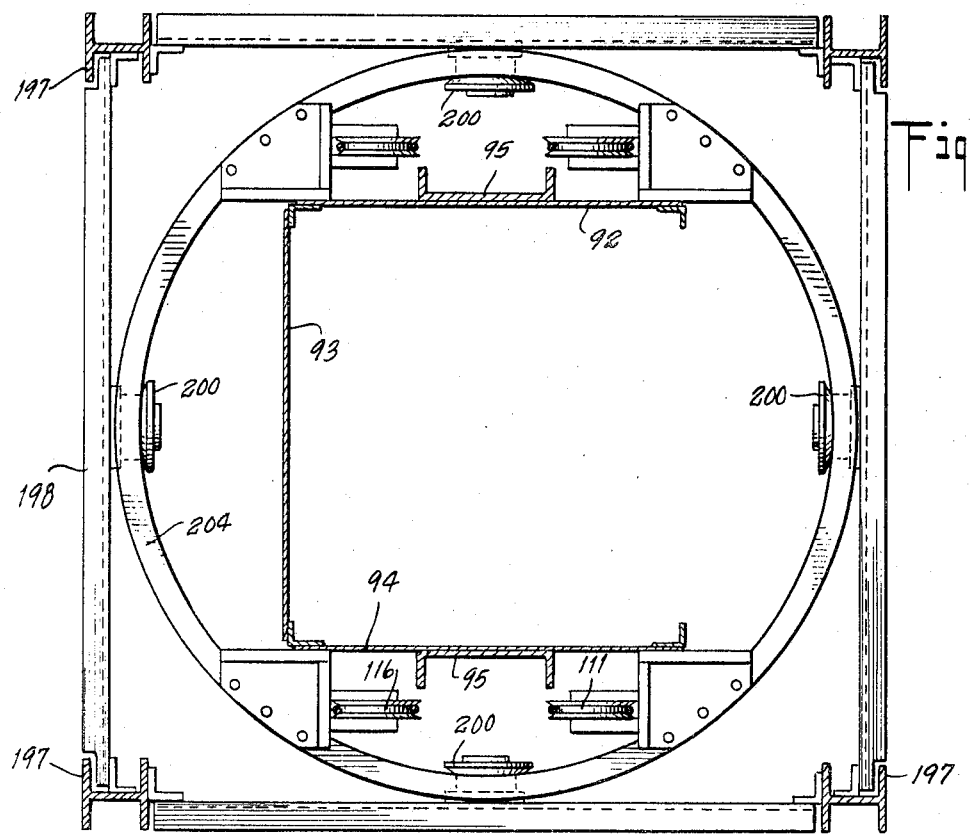
Figure 16:
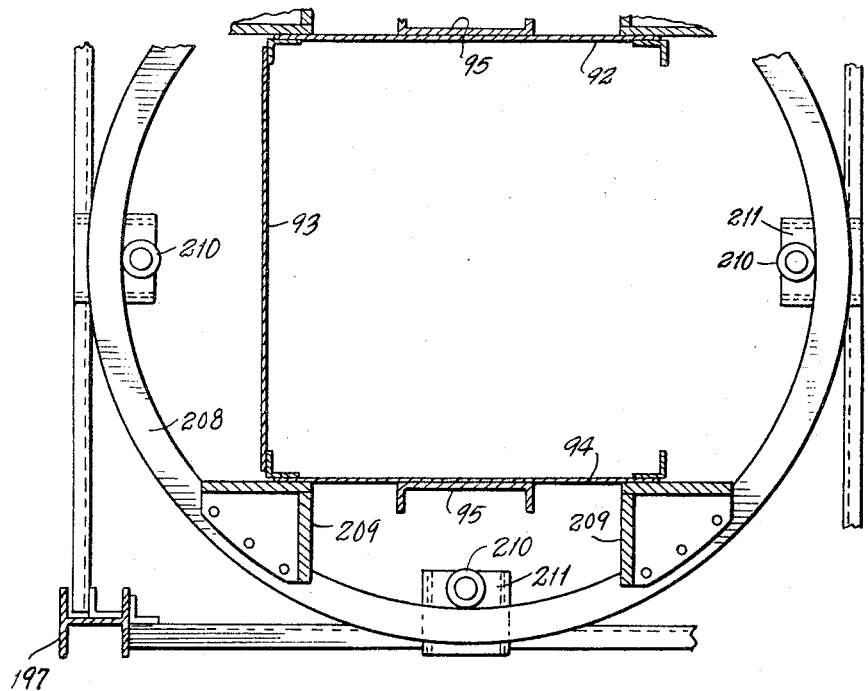
Figure 20:
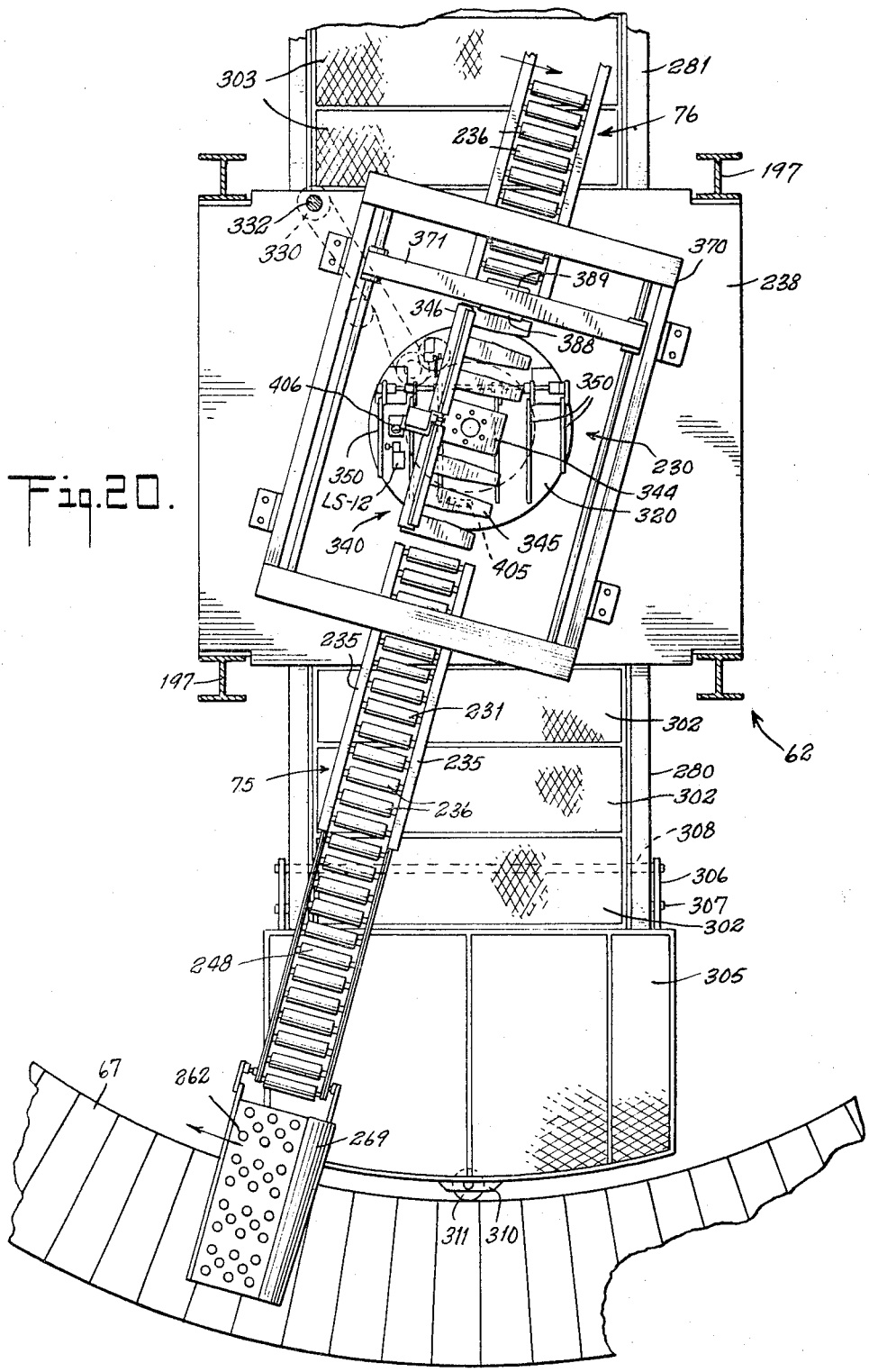
Figure 21:
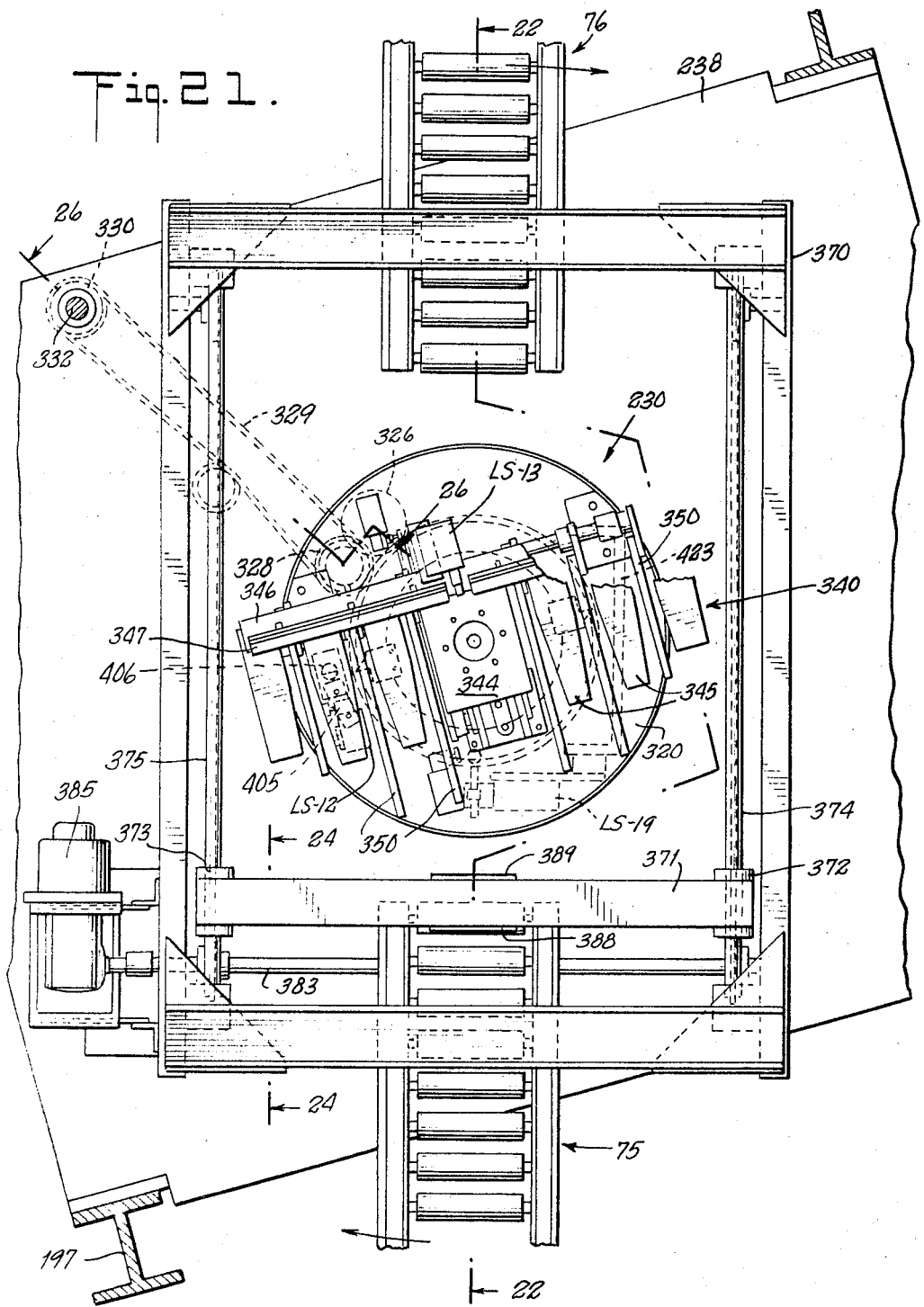
Figure 22:
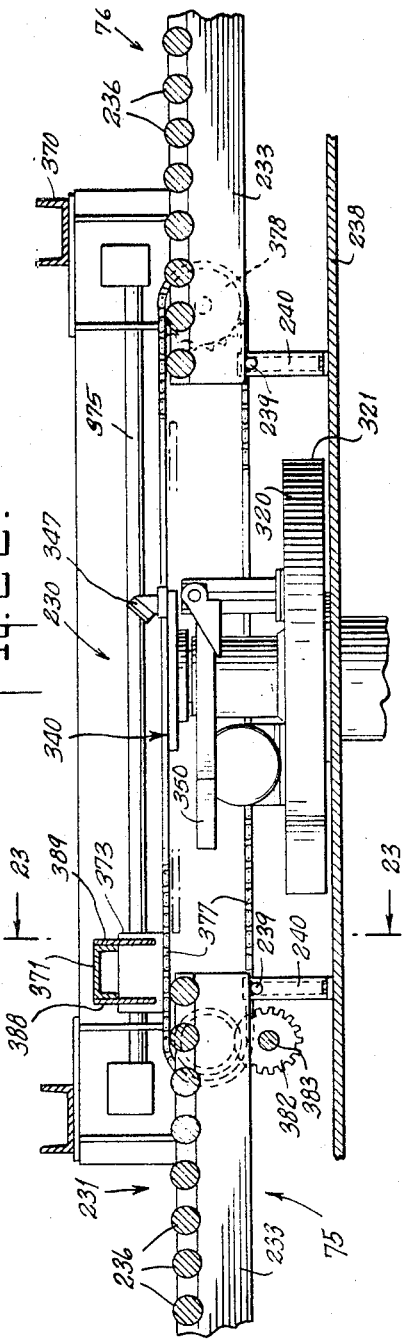
Figure 23:
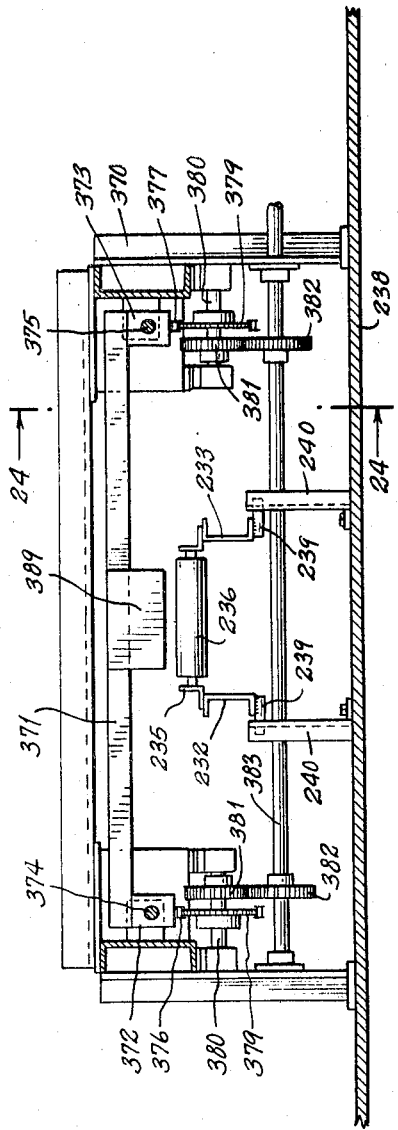
Figure 27:
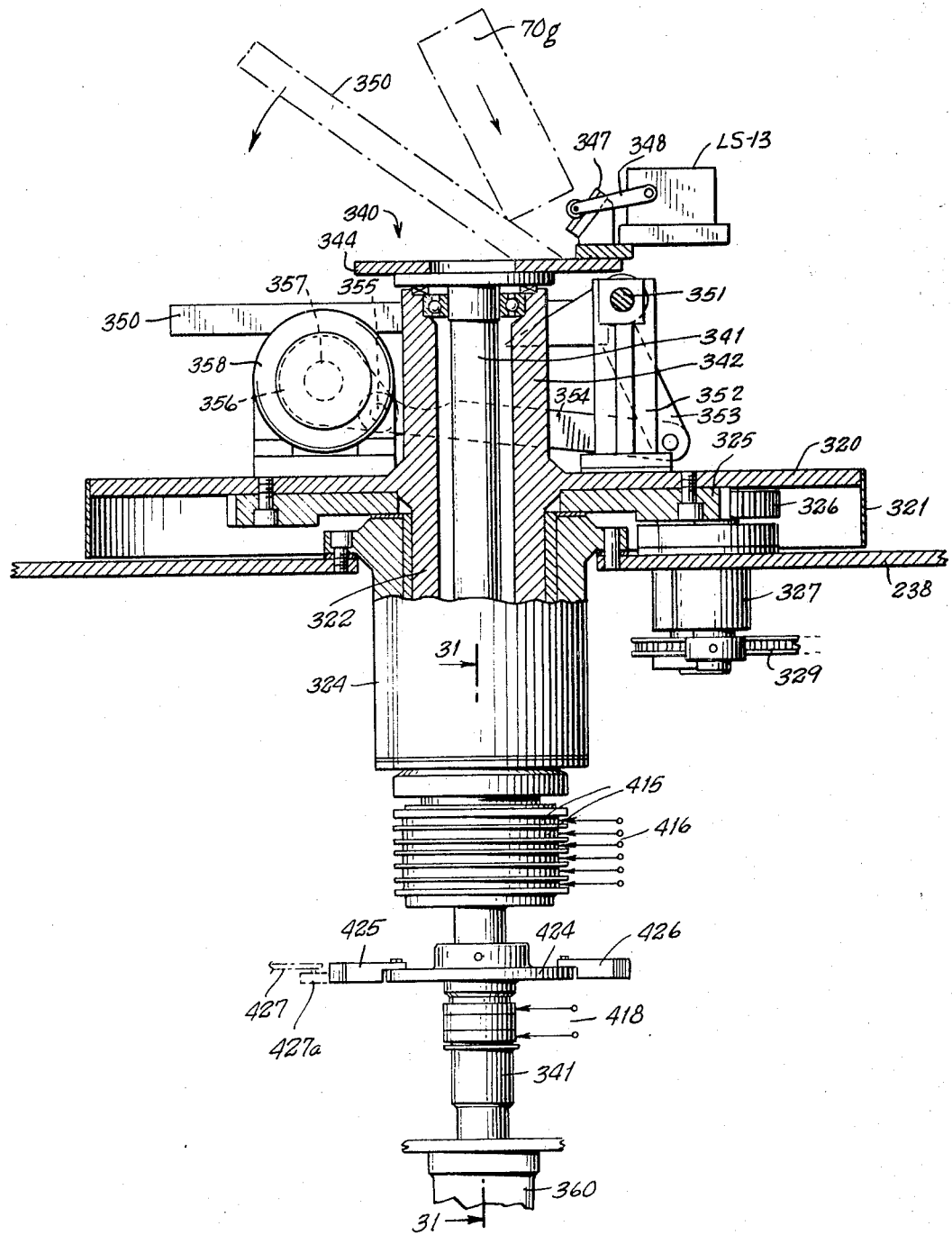
Figure 31:
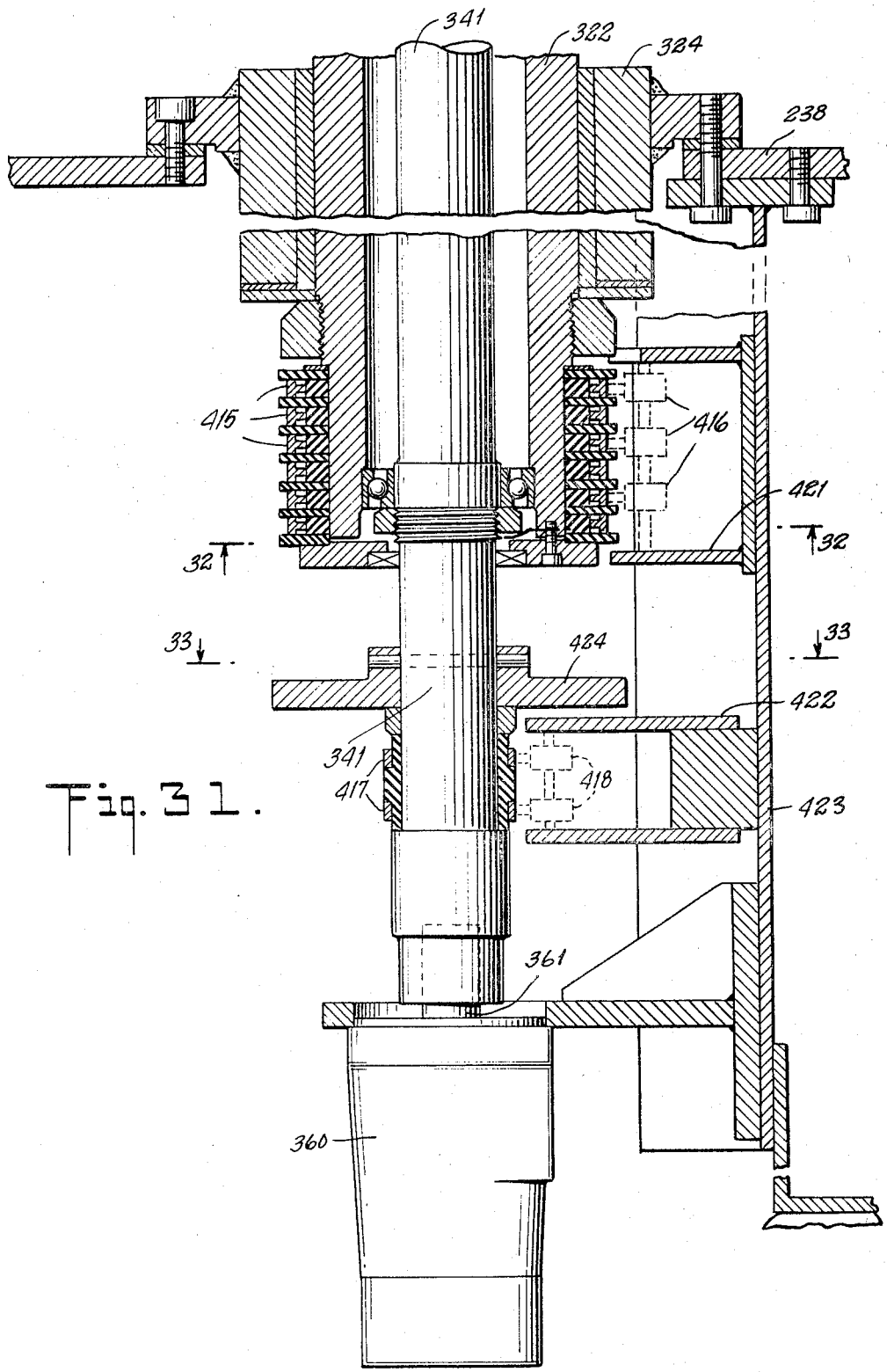
Figure 32:
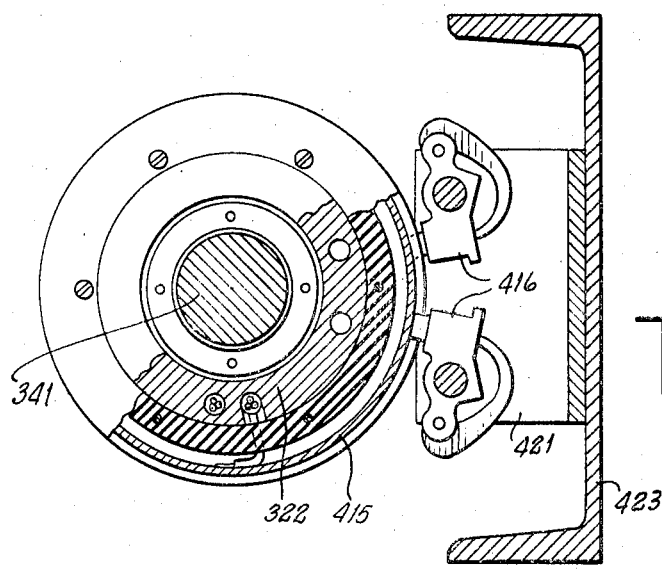
Figure 33:
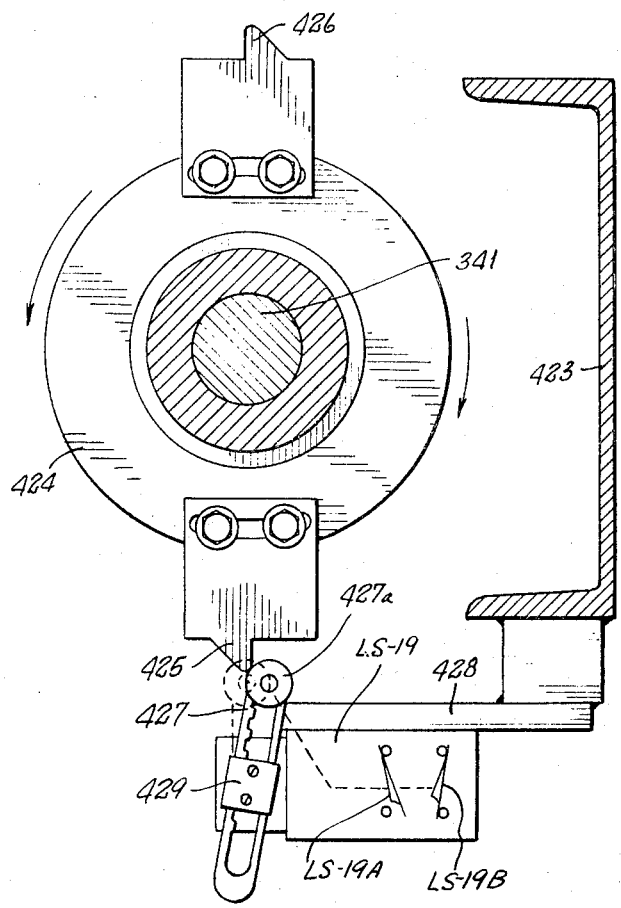
Figure 49:
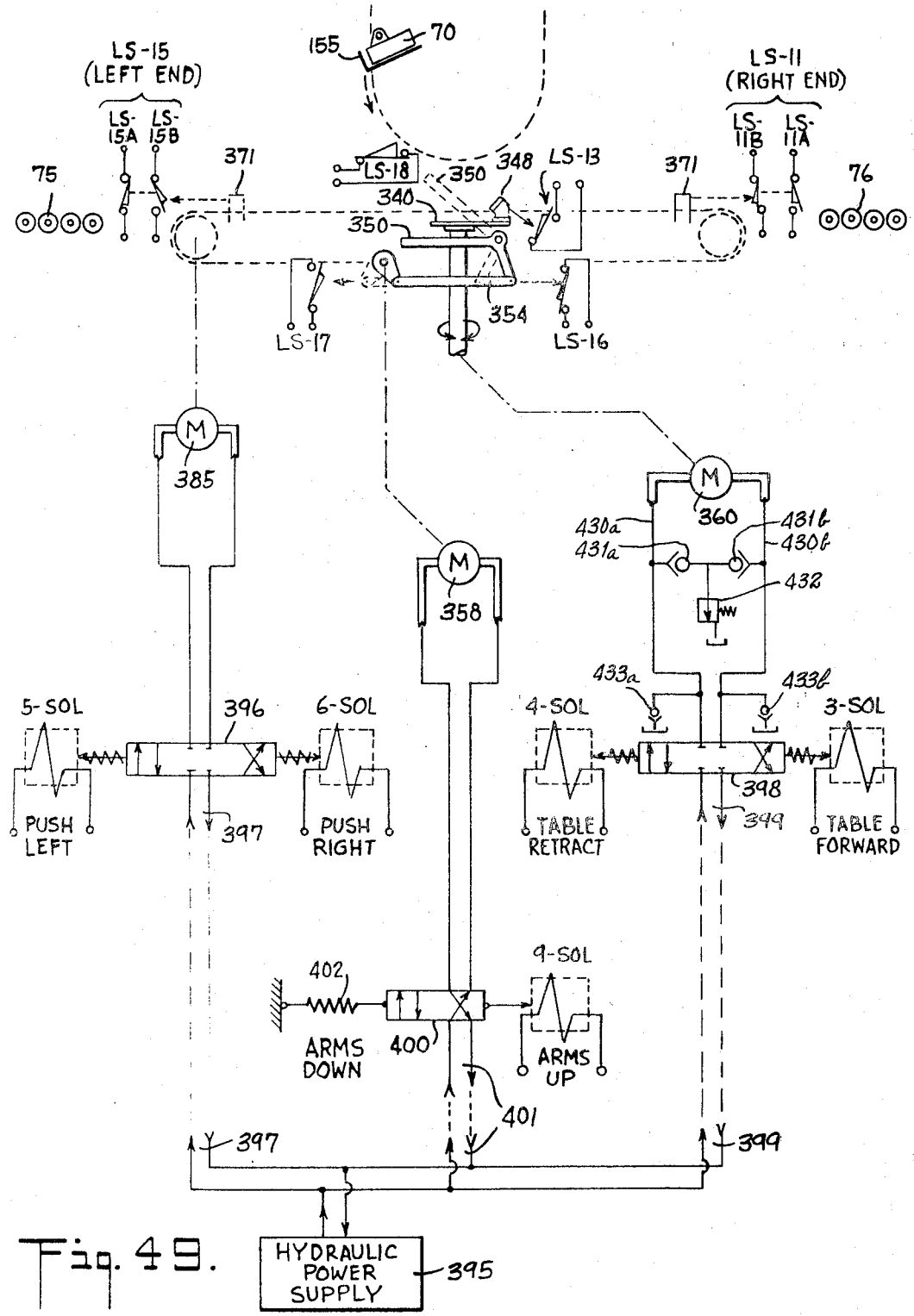
Figure 55:
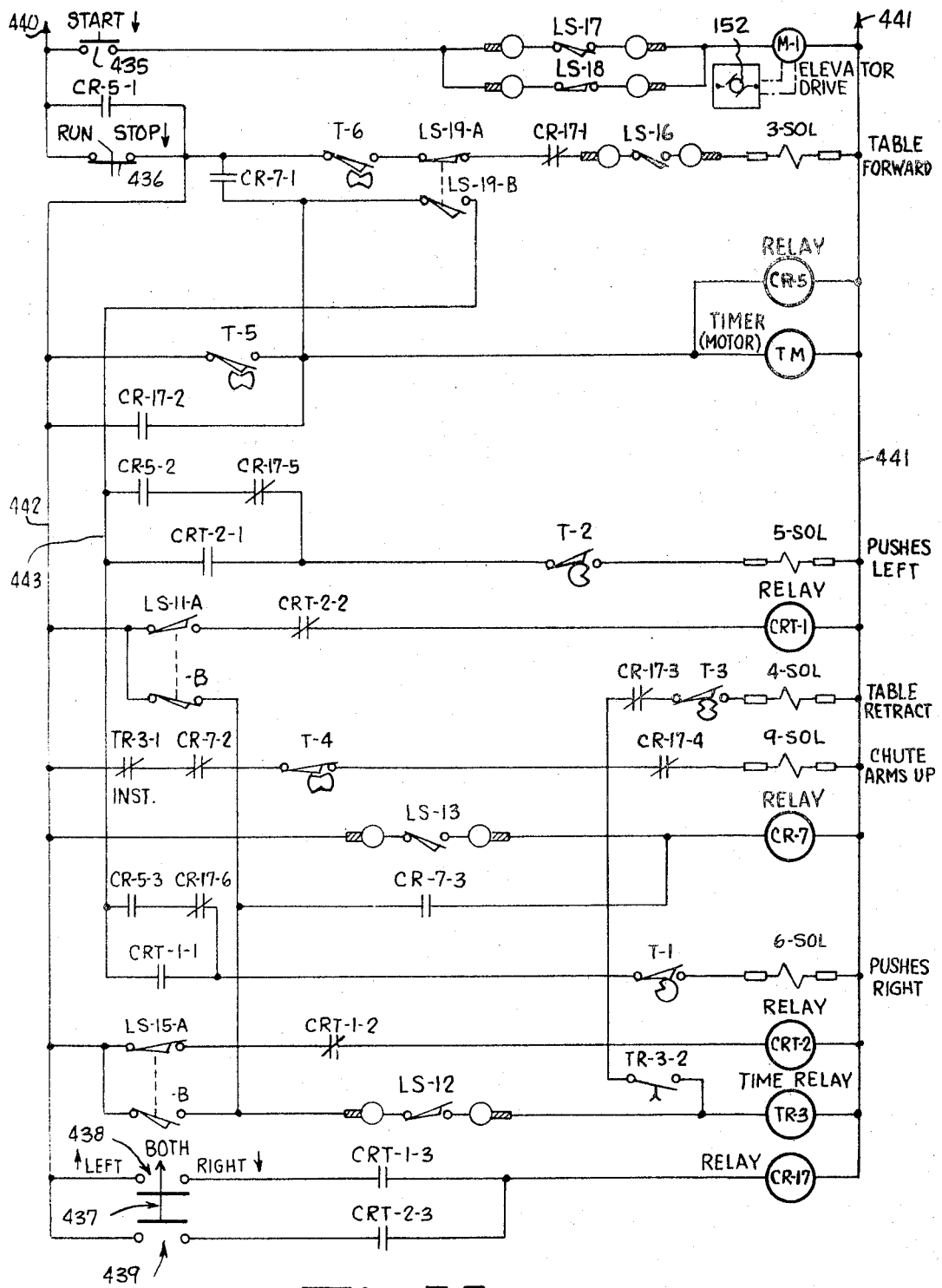
Figure 56:
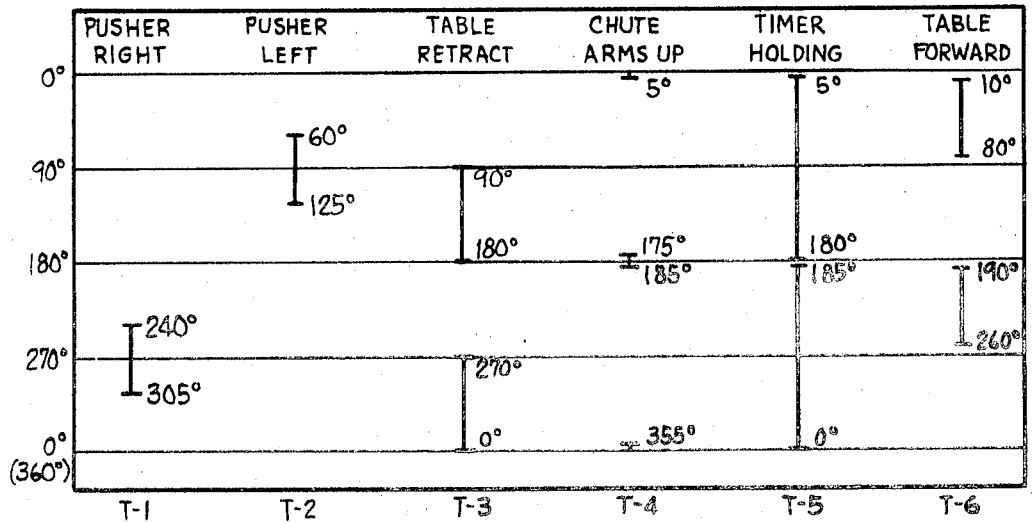

FIGS. 15 and 16 are horizontal sections respectively on lines 15—15 and 16—16 of FIG. 14;

FIG. 17 is a somewhat reduced horizontal section as if on line 17—17 of FIG. 14, but also showing the carriage drive mechanism in plan;

FIG. 18 is an enlarged elevational view, partly in section, on line 18—18 of FIG. 17;

FIG. 19 is a greatly enlarged fragmentary plan, with the chain in section, showing the drive chain and a coacting tooth on the tower ring of FIG. 17;

FIG. 19A is a vertical section on line 19a—19a of FIG. 19;

FIG. 20 is a plan view of the distributor mechanism, run-out conveyor means and platform structure of the carriage, with one end broken away, and taken generally as on lines 20—20 of FIG. 1, FIG. 1 having been a view as if generally from the right of FIG. 20;

FIG. 21 is an enlarged plan view of the central portion of FIG. 20, showing certain further parts and a different position of parts;

FIG. 22 is a vertical section, with the distributor table in elevation, on line 22—22 of FIG. 21;

FIG. 23 is a vertical section on line 23—23 of FIG. 22;

FIG. 24 is an enlarged, fragmentary vertical section on line 24—24 of FIG. 23 (also as indicated in FIG. 21);

FIG. 25 is a vertical section on line 25—25 of FIG. 24;

FIG. 26 is a fragmentary sectional view, essentially on line 26—26 of FIG. 21, showing linkage between the distributor mechanism and the carriage drive;

FIG. 27 is an enlarged view, chiefly in central vertical section, of the distributor table and aligning plate organization, seen similarly to FIGS. 13 and 22, as if on planes parallel to FIG. 22;

FIG. 28 is an elevation of the main body of mechanism in FIG. 27, seen from the left in that figure;

FIG. 29 is an elevation similar to FIG. 28, seen from the right in FIG. 27;

FIG. 30 is a section on line 30—30 of FIG. 28;

FIG. 31 is a greatly enlarged vertical section of the lower part of the distributor table shaft structure, taken on the same plane as the section of FIG. 27;

FIG. 32 is a horizontal section on line 32—32 of FIG. 31;

FIG. 33 is a horizontal section on line 33—33 of FIG. 31, with a switch assembly in diagram;

FIG. 34 is an elevation of one of the run-out conveyors, being the conveyor shown fragmentarily at the top of FIG. 20 and viewed as from the right in that figure;

FIG. 35 is a plan view of the conveyor of FIG. 34;

FIG. 36 is a fragmentary elevational view, similar to FIG. 34 but showing the conveyor adjusted for a shorter path;

FIGS. 37 and 38 are enlarged vertical sections respectively on lines 37—37 and 38—38 of FIG. 34;

FIG. 39 is an enlarged vertical section on line 39—39 of FIG. 35 showing removal of bricks from the conveyor;

FIG. 40 is an enlarged elevational view, similar to FIG. 1, showing the platform mechanism at the foot of the carriage;

FIG. 41 is a view similar to FIG. 40, showing the platforms retracted and folded upward;

FIG. 42 is an enlarged horizontal view, looking upward on line 42—42 of FIG. 40;

FIG. 43 is a fragmentary section on line 43—43 of FIG. 42;

FIG. 44 is an enlarged horizontal view, with parts broken away, looking upward on line 44—44 of FIG. 40;

FIGS. 45, 46, 47 and 48 are vertical sections respectively on lines 45—45, 46—46, 47—47 and 48—48 of FIG. 44, each section being seen, however, with the lower or underneath portion (shown closest to the viewer in FIG. 44) at the bottom;

FIG. 49 is a schematic view of various limit switches and drive motor systems for the distributor and push-off mechanisms of FIGS. 20–30;

FIGS. 50, 51, 52, 53 and 54 are simplified outline views, generally similar to FIGS. 20, 21 and 33, showing positions of the distributor table and its cam and the run-out conveyors, as the carriage turns;

FIG. 55 is a wiring diagram of the automatic distributing and push-off operations;

FIG. 56 is a timing diagram of a sequence timer in FIG. 55; and

Figure 57:
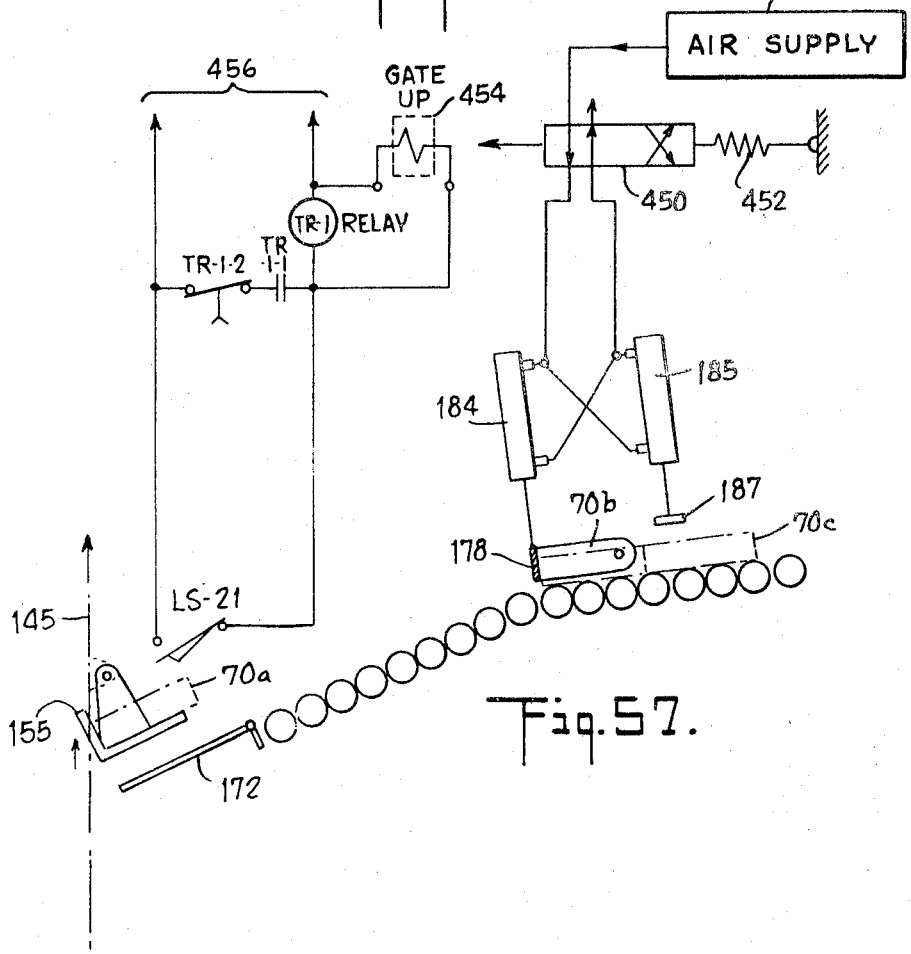

FIG. 57 is a wiring diagram of the brick delivery escapement of FIG. 8.

GENERAL ORGANIZATION

In the several views, the structure of various parts has been simplified and a considerable number of auxiliary elements such as handrails, walkways, ladders (e.g. on the tower), table supports (as for the brick feed mechanism), conventional electrical switches and cables, hydraulic supply lines and sources of hydraulic power, auxilary supporting and housing structure for the furnace and related environment and the like, have been omitted for the sake of clarity, it being understood, without such showing or further description herein, that necessary elements and structure of known or conventional character will be included or employed for usual functions as will be recognized by persons skilled in the art.

Referring primarily to FIG. 1, the machine comprises a tower-carriage assembly generally designated 60 and comprising a tall upright tower 61 and a carriage structure 62 partly surrounding the lower part of the tower, and extending beneath it, being aranged to be rotated on a vertical axis while supported by the tower 61, i.e. on a center line or axis of the tower. As shown, the machine is designed so that the tower-carriage 60 can be positioned within a furnace vessel 64 that has a large open mouth 65 at the top and that is required to be lined or relined with brick as indicated collectively at 66 in the bottom area and 67 at the side wall. While the apparatus is useful for other localities of work, such as open-top furnaces of other shape and function, the vessel 64 is illustrated as appropriate for the basic oxygen process of making steel, disposed in its normal upright position and without showing its supporting structure or related hood or instrumentalities. As shown by way of example, the vessel has an outer steel shell 68 and adjacent the latter on the inside a layer of refractory 69, to back up the innermost lining of brickwork that is to be applied as indicated at 66 and 67.

The function of the machine is to receive successive refractory bricks, generally designated 70, as from a feed conveyor 72, and to carry these bricks down to the carriage 62 where they are distributed laterally for use. For such purpose, the tower includes an endless chain conveyor 74, and the carriage has a pair of lateral run-out conveyors 75, 76 as more fully described below.

Figure 4:
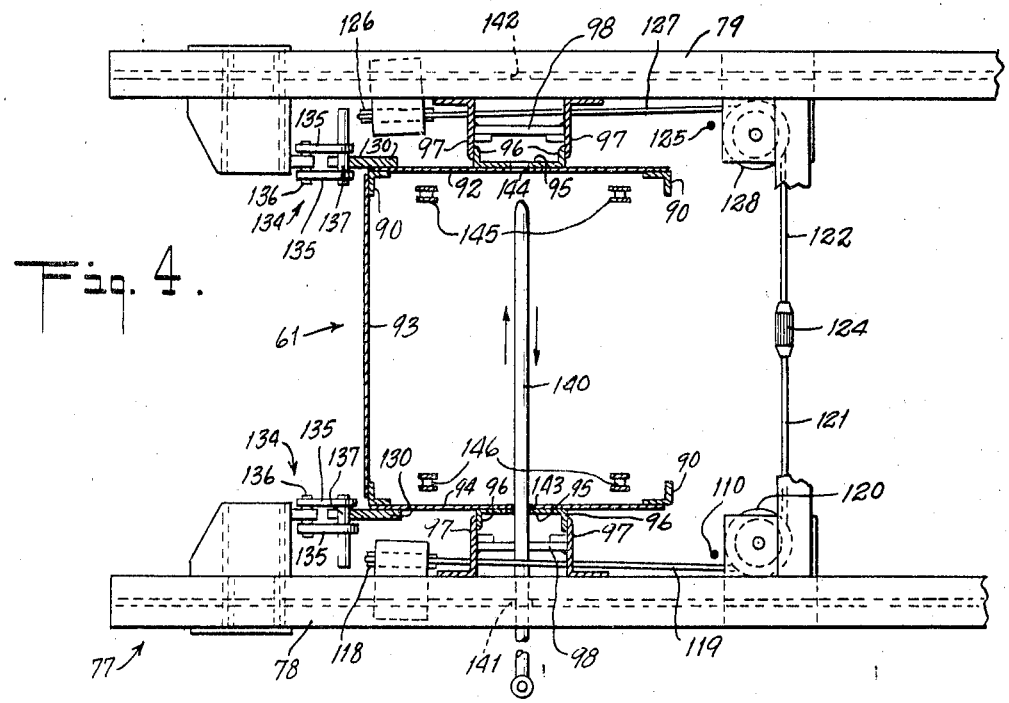
FIG. 4 is a horizontal section on line 4—4 of FIG. 2.
Figure 6:
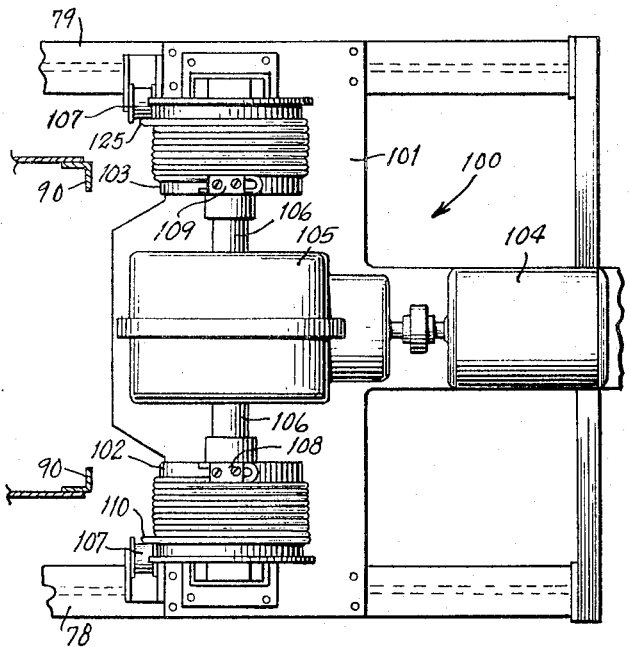
FIG. 6 is a fragmentary plan view of the supporting frame showing the hoist drums and driving mechanism.

In use, the tower-carriage is suspended by and within a supporting frame 77, which is conveniently a rectangular, box-like framework surrounding the tower 61 and having a pair of upper horizontal beams 78, 79 (see also FIGS. 4 and 6), as well as a like pair of lower horizontal beams, one on each side of the tower as represented by the beam 80 in FIG. 1. The frame 77 also includes suitable columns or uprights as at 81, 81, completing the basic structure, the whole being arranged to surround the tower 61 (FIG. 4).

For simplicity in FIG. 1, the frame 77 is shown resting solely on the top of the furnace, as by support of certain cross-members 82, 82 (that join the ends of the beams 80) on a ring plate 84 surrounding the furnace mouth, but a presently preferred arrangement is illustrated in FIG. 2 where the platform constituted by the beams 80 is disposed at a somewhat higher level above the furnace vessel 64. In FIG. 2 (see also FIG. 3) the beams 80 and cross-member 82 have a depending leg structure 86, which at its foot rests on the top ring plate 84, i.e. thus supporting one end of the frame assembly 77, while the other end of such assembly, viz. the opposite ends of the beams 80, can be conveniently carried on a permanent floor structure 87, appropriately located in the building or shop and also constituting the service floor where bricks 70 are stored and delivered to the machine. The arrangement in FIGS. 2 and 3 is particularly suitable in enabling the carriage 62 to reach an uppermost position, when it is raised with the assembly 60, for convenient completion of the bricklaying operation at the top level of the inside wall of the vessel 64.

The upper end of the tower 61 carries a large rectangular bail 88 pivotally carried by a shaft 88a in bearing blocks 89, 89 (FIGS. 1, 2 and 7), so that upon engaging this bail with the hook of an overhead crane or the like, the entire machine, including the tower-carriage 60 and the supporting frame 77, may be lifted and moved about, particularly for insertion into and withdrawal from a furnace vessel 64, as well as for storage of the equipment at other times, by resting it on the base of the carriage 62.

TOWER AND HOIST

The tower 61 may be essentially square in cross-section, constituted by vertical angle-section members or columns 90 at the four corners (see FIGS. 4 and 6), with suitable cross bracing as necessary (not shown) and having appropriate cross framework at its top, arranged to provide a platform 91. Sheet metal covers or plates are conveniently provided for the side faces of the tower, e.g. as shown at 92, 93, 94 in FIG. 4, both as safety guards and also as part of the structural or bracing arrangement. These walls or covers are omitted at localities where access to the contained elevator is required, as for example in the region of the upper frame 77 (FIGS. 4 and 6) where bricks are supplied, and likewise at the bottom (FIG. 14) where bricks are discharged.

Suitable guide means are included to maintain proper mutual alignment between the tower and its supporting frame 77. Thus for instance, each of the side walls 92, 94 carries a channel member 95 having a pair of outstanding flanges 96 which are respectively abutted, e.g. on their outer side surfaces, by the flanges of angle members 97 secured to the frame 77. Each pair of elements 97 is spaced by a structure 98 which may also bear on the edges of the channel flanges 96, so that the sliding assembly at each side, with lubrication if and as necessary, guides the tower against lateral displacement outward or sidewise, while permitting free vertical movement. Although these guide assemblies are shown in FIG. 4 as associated with the upper transverse beams 78, 79 of the frame 77, like structure may also be disposed inside the lower beams, e.g. beam 80, for cooperating, similar function.

The tower 61, and with it the carriage 62 are supported and moved vertically by a cable hoist system including a hoist mechanism 100 that is carried on a platform 101, on the beams 78, 79 and comprises a pair of winding drums 102, 103 and an electric motor 104 connected through a reducing gear mechanism 105 for simultaneous drive of the drums on a common double-ended driven shaft 106. The drums 102, 103, adjacent their innermost edges, respectively carry fastening means 108, 109 for the ends of a cable which in each instance can be wound on the drum toward the outer, flanged end. As shown in FIGS. 1 to 3 and 6, the cable running downward from each drum is guided by a roller 107, positioned below so that when the winding of cable on the drum has reached the outer, flanged end, it will reverse and progressively advance tower the inner end. The line of such cable (see also FIG. 4) for raising and lowering the tower runs, for example, from the drum 102, downward at 110, around a sheave 111 journaled at a lower part of the face 94 of the tower, thence upwardly at 112, around a sheave 113 journaled to appropriate supporting structure 114 at a lower part of the adjacent side of the frame 77, and then downwardly again at 115. From the last-mentioned reach 115, the cable passes around a further sheave 116, situated as a companion to the sheave 111 near the foot of the tower, and thence upwardly at 117 to a further sheave or pulley 118 carried at the underside of the frame member 78. The cable turns 90° around this pulley 118, then runs horizontally across the tower at 119 to a further sheave or pulley 120 on a vertical axis, the cable there making a 90° horizontal turn to extend at 121 across the space between the beams 78 and 79. At such locality the cable joins the end portion 122 of a similar length of cable (from the other drum 103) with a coupling 124. The path of cable from the drum 103 to the locality of the coupling 124 is arranged and supported identically with the cable section 110–112–115–117, on the opposite side of the tower. Such further path, including a pair of sheaves at the bottom of the tower and an upper sheave on the frame 77, is a duplicate of the path over the sheaves 111, 113 and 116 and is therefore not illustrated. Having started downward at 125 from the drum 103, and returning over a pulley 126, like the pulley 118, the duplicate cable path extends at 127, essentially parallel to the path 119, and then horizontally around the pulley 128 (like the pulley 120), to become the transverse terminal portion of the cable 122 which is coupled to the end 121 of the other cable.

As will now be seen, the arrangement of the cable lengths from the drums 102 and 103 provide a mechanically advantaged cable hoist system, effective at opposite sides of the tower and self-balanced by the transverse connection at the coupling 124, whereby upon driving the drums simultaneously at the same speed, the tower is appropriately raised or lowered. That is to say, as the cable is wound on each of the drums the tower-carriage assembly is elevated, while unwinding the cable from the drums correspondingly lowers the assembly, in each case at a rate determined by the drive 105.

The cable system also serves, with the drive appropriately halted and braked, to hold the tower stationary at any selected elevation. FIGS. 2 and 3 thus illustrate the tower, and carriage, in respectively different vertical positions as controlled and held by the hoist system. In FIG. 2, the tower is at a lower location, similar to FIG. 1, where as in FIG. 3 it has been raised to an upper position, as toward the end of a complete relining operation in the furnace vessel 64.

Figure 5:
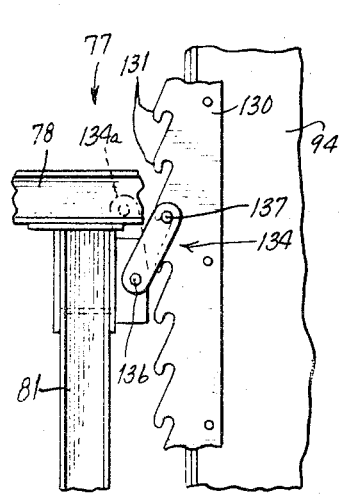
FIG. 5 is an enlarged elevational view of a portion of the supporting frame and adjacent tower, showing a safety latch.

Suitable safety latch means is also provided, in the nature of a vertical linear ratchet and pawl, whereby fall of the tower is positively prevented should there be any breakage of the cable or undesired function of the hoist arrangement. Thus at each of preferably two corners of the tower there is an elongated ratchet or rack structure 130 having a multiplicity of downwardly sloping teeth 131 (FIGS. 1, 2, 3, 4, and 5), thereby providing a series of locking notches along the vertical extent of the tower. The supporting frame 77 carries at each side a vertically spaced pair of pawl-like latches 133, 134, arranged to coact with the teeth 131 or notches of the elements 130. As best seen in FIGS. 4 and 5, each of the latch devices such as 134, comprises a pair of arms 135, 135 pivoted to the stationary frame as at 136 and joined at their outer ends by a transverse pin 137 which is engageable with the notches in the member 130, being disposed to rest, under gravity, in an inclined position against the member 130. Thus as the tower is moved upwardly, which is its normal course in the relining operation, the latch device 130 swings counterclockwise (FIG. 5) around the successive teeth 131, but if for any reason an unwanted downward movement occurs, the pin 137 is adapted to move into the notch behind that one of the teeth 131 which is immediately above, thereby positively holding the structure 130 and with it the tower to which it is secured, against further downward motion. For maximum effectiveness, there is a rack or ratchet member 130 at each of two corners of the tower (FIG. 4), and as stated, the frame 77 carries two vertically spaced latch devices 133 and 134, functioning essentially identically. The vertical spacing between latches 133 and 134 on each side may be such that when one or the other engages behind a tooth 131, the other is about halfway between positions of engagement, thereby minimizing the distance of fall should the latch system come into operation. When it is necessary to lower the tower relative to the frame 77 all four latches are released, as by swinging them to a position as indicated in dotted lines 134a in FIG. 5, with the aid, if necessary, of some slight preliminary upward tower movement to be sure that all four are released.

When the tower assembly and the supporting frame 77 are to be moved together, as for displacing the entire machine with a crane engaging the bail 88, it is necessary to secure the supporting frame against downward displacement relative to the tower. While any of a variety of latching or locking means may be utilized, a simple device may include one or more long, relatively heavy pins, such as the pin 140 shown in FIGS. 1 and 4, which can be inserted through appropriately registered holes in the frame 77 and the structure of the tower 61. Thus as seen in FIG. 4, the pin 140 is adapted to traverse holes as indicated at 141, 142 in the beams 78, 79, and similar holes at 143, 144 in reinforced portions of the tower walls 94, 92. For clarity of illustration, the pin 140 is shown only partly inserted in FIG. 4, and is also illustrated in place in FIG. 1; when the machine is to be moved, the pin is fully inserted, permitting the frame to be positively carried by the tower, whereas upon installation of the machine for use, as in FIGS. 1 and 2, the pin is completely withdrawn, allowing the tower to be supported by the hoist system as described above. If desired, appropriate hole arrangements may be spaced along the vertical extent of the tower, to secure the frame at various levels, such holes being indicated at 143 in FIGS. 1 and 2.

TOWER ELEVATOR AND BRICK FEED THERETO

Referring particularly to FIGS. 1, 7, 8 and 10 to 14, the tower encloses and supports an endless, vertical, basket conveyor system, conveniently identified as the elevator, as for receiving bricks 70 from the supply station 72 and delivering them at the lower end of the tower, for handling by the distributor and lateral conveyor means. The elevator advantageously comprises a laterally spaced pair of chains of double links 145, 146, respectively traversing two upper sprockets 147, 147 and two lower sprockets 148, which are arranged similarly to the upper pair, but of which only one is shown as in FIGS. 1, 13 and 14. Each pair of sprockets is mounted on a suitable shaft, as the shaft 149 for the upper pair 147 and the shaft 150 for the lower pair 148, the shafts in turn being journaled in suitable bearings carried by the side structure of the tower.

The upper sprocket wheels and thus the chains 145, 146 are positively driven by a suitable electric motor 152, adjustable gear mechanism 153 and appropriate belt or chain connection from the latter to the shaft 149, the driving means 152, 153 being mounted on the platform 91 at the top of the tower. It will be understood that although not shown, the journal bearings for the shaft 150 of the lower sprockets 148 can be vertically adjustable, if desired, for take-up purposes, to keep the chains 145, 146 suitably taut.

At regularly spaced intervals the chains 145, 146 carry baskets 155 spanning the distance between them. Each of the baskets 155 comprises a horizontal bar 156 to which are welded, at regularly spaced intervals, a multiplicity of L-shaped members each consisting of one arm 157 thus secured to the bar 156, and a longer, projecting arm 158, these elements being spaced along the bar so that the basket, in suspended position, affords an elongated L-shaped rest, of which one side is formed by the mutually spaced arms 158. A pair of plates 160, 161 serves to suspend the basket from the chains, the plates being respectively secured at the outer sides of the terminal arms 158 in the row of such parts. Near their upper ends the plates 160, 161 carry outwardly projecting studs or pivot pins 162, 162 which are supported in appropriate holes of projecting lugs 164 that are provided as integral parts of selected link elements 165 in the chains 145, 146. The lug-carrying links 165 are located at desired intervals, i.e. for appropriate convenience in support of the baskets and in providing for loading and unloading operations relative to the elevator. Thus the baskets are mounted to swing from successive locations along the chains, e.g. every fifth link (shown for simplicity as every fourth in FIG. 13), maintaining an essentially constant position as the conveyor moves vertically up and down, and around the sprockets at the top. The proportioning of parts of the baskets may indeed be such, as shown, that the center of gravity is not appreciably shifted in a lateral direction between unloaded and loaded conditions.

In accordance with a further feature of the invention the conveyor or elevator is driven so that the baskets move upward past the brick loading means 72, receiving a brick on each basket, and then continue around the upper sprockets 147, 147, thereafter descending the entire height of the tower to the lower sprockets 148, where the baskets are tilted to dump the brick from each as shown in FIG. 13 and more fully described below. Although other means, or indeed manual operation if desired, may be provided for loading successive bricks on the baskets 155, an automatic arrangement is illustrated in FIGS. 8 and 9, and generally designated 72. It will be understood that this mechanism is designed to receive a row of bricks in sidewise abutment, from appropriate supply means or operations, e.g. of a conventional sort for establishing a progressing row of articles.

The mechanism 72 includes a roller conveyor 170 tilted downwardly at a small angle of grade sufficient to insure advance of a row of bricks thereon. Beyond this conveyor a further roller conveyor section 171 extends, at a steeper incline, and has an associated terminal chute or platform 172 constituted by the upper edges of a row of parallel plates 173 which are mutually spaced and positioned to extend between the successive arms 158 of each of the baskets 155 (see FIGS. 8 to 11). Each plate 173 has an upstanding portion 174 at its outer end, the parts 174 thus constituting, by their rear edges, a stop against which the brick 70a comes to rest. Hence as a basket 155 rises through the loading platform or chute 172, the arms 158 engage the underside of the brick and lift it off as shown successively in FIGS. 10 and 11. The brick settles into the basket, i.e. against cushions 176 of rubber or other resilient material on the faces of the rearward basket arms 157. In FIG. 10 the basket 155 is approaching the arms 173 of the chute 172, which hold the brick 70a, as also shown at the lower lefthand part of FIG. 8. In FIG. 11 the basket 155 has moved upward and now carries the brick 70a.

While conceivably the chute 173 may be the terminal of a simple inclined conveyor so that removal of a brick merely allows the remainder of the row of bricks to move forward against the stop 174, a special feature of the feeding system is a delivery escapement, shown in FIGS. 8 and 9. This device includes a gate 178 disposed at the end of the roller conveyor 170 and carried by a pair of rearwardly extending arms 179, 179 at the sides of the conveyor, the arms being pivoted at 180, 180 to appropriate brackets 181, 181 whereby the gate may occupy a normal downward position as shown, restraining a brick 70b from advancing onto the conveyor section 171. The gate 178 is linked, as at its center, to the piston rod 182 of an air or other fluid-operated cylinder 184 above the gate assembly, so that upon appropriate supply of air or other fluid under pressure to the cylinder 184, the gate may be rocked upward about its pivots 180, to release the brick 70b. Situated above the position occupied or to be occupied by the next succeeding brick 70c is a further air or fluid-operated cylinder 185 which has a piston rod 186 carrying a shoe 187 of rubber or other resilient material. The arrangement, as shown, is such that when the cylinder 185 is suitably energized by air or other fluid, the shoe 187 is moved downwardly against the surface of the brick 70c beneath it, and there acts as a brake to hold the brick 70c against movement, and indeed retaining the remaining bricks 70d, 70, and so forth of the row.

By appropriate control, as in response to sensing of a brick on a basket 155 moving just above the chute 172, i.e. thus indicating the removal of the brick 70a, the cylinders 184, 185 are actuated to lift the gate 178 and to depress the shoe 187 against the brick 70c. That is to say, the shoe 187 is engaged with the brick 70c either before or at the time that the gate is opened. Thereupon the brick 70b, released by the gate 178, moves forward onto the conveyor section 171. After a brief, timed interval to allow such movement of the brick 70b, the cylinders are actuated in reverse direction, dropping the gate 178 to the position shown and raising the shoe or brake 187. Thus the next brick 70c, is released, and likewise the entire remainder of the row, so that all of the bricks advance, with the brick 70c coming to rest against the gate in the position previously occupied by the brick 70b. The movements of the cylinders 184, 185 are such, of course, that the brick 70c can not reach the locality of the gate 178 before it is at least partially restored to intercepting position. The released brick 70b then advances down the conveyor section 171 and comes to rest against the stop 174 in the chute 172, i.e. in the position of brick 70a. In order to avoid damage to the bricks by rapid descent to the chute 172, the roller elements 188 of the conveyor section 171 may be positively driven at a slow rate of speed, thereby braking the movement of the brick as it engages these rollers. Such drive is effected, for example, by appropriate chain and sprocket connections to all of the elements 188, including the chain 189 driven by a motor 190.

In the described fashion, bricks are individually released by the escapement mechanism in automatic, substantial synchronism with the movement of the baskets 155 of the elevator, so that each time a basket passes the chute 177, a brick 70a is ready to be loaded. Within reasonable limits, the function of the escapement is independent of the speed of the elevator, i.e. in that whether the elevator is traveling fast or slow, or is changing speed, a brick is delivered to the chute every time a previous brick has been removed. As explained, the elevator carries the successive bricks over the upper sprocket 147; and then down the length of the tower to the lower sprocket 148, where the bricks are dumped as shown in FIG. 13 and more fully described below.

ROTATING CARRIAGE

At its foot, the tower 61 supports the carriage structure 72, which primarily serves to carry the extendible run-out conveyors 75, 76 and likewise a coacting platform structure 195, of extendible nature, where working personnel can stand. Thus as the carriage turns slowly, bricks are delivered to successive points along the inner periphery of the vessel 64, to be laid up by a person standing on the adjacent part of the platform structure 195.

As shown in FIGS. 1, 14, 15 and 16, the carriage 62 includes a main supporting frame of rectangular construction, being square in plan, and including columns 197 at the four corners, secured by appropriate cross-members, e.g. as at 198, 198 and 199, 199 in FIGS. 14 and 15, like cross-members being also disposed at lower localities.

The carriage is supported by free-running flanged wheels 200, suitably journaled at inner sides of the cross-members 198, 198 and 199, 199, centrally of each, so as to ride on a circular rail or ring 202 which surrounds the tower 61 and is secured to the latter by appropriate brackets 203, conveniently secured at the corners of the tower structure. For stabilizing purposes a ring or rail 204, identical with the ring 202, is disposed above the bearing surfaces of the wheels 200 and is secured to the tower by brackets 205 similar to the brackets 203. Ordinarily there is a slight clearance between the wheels 200 and the lower face of the ring 204, the function of this upper ring 204 being to cooperate in maintaining stability and also to support the tower on the wheels when the entire assembly is disposed to rest on the carriage, e.g. when the assembly is stored at some place outside the vessel with the feet 207, at the bottoms of the columns 197, resting on a floor or the ground.

The principal guide or stabilizing means for preventing rocking of the carriage relative to the tower comprises a lower ring or circular rail 208, surrounding the tower and supported by rackets 209 from the corners of the latter, e.g. at the foot of the tower structure somewhat below the location of the rings 202, 204. Rollers 210, freely rotating on vertical axes, are journaled on suitable arms 211 projecting inwardly from side regions of the carriage frame, so as to bear on the inner, vertical surface of the circular rail 208, the brackets 209 being welded to this ring at the upper edge so that there is clearance for the rollers 210, as shown. Thus in the structure illustrated, the four rollers 210, coacting with the ring 208, provide a horizontal guide for the carriage, while the wheels 200, on horizontal axes, coact with the rings 202 and 204 to provide a vertical guide for the carriage and also afford support of either the carriage or the tower by the other of these structures as circumstances may require.

While desired rotation of the carriage relative to the tower, when the latter is suspended in the vessel 64 (FIG. 1), might be achieved manually, a continuous power drive is shown in FIGS. 14 and 17 to 19A. At one side of the carriage, e.g. somewhat above the bracket-arms 211, a motor such as the hydraulic motor 215 is carried on supporting structure 216 mounted between two adjacent columns 197, and through a reducing gear mechanism 217, including conventional worm gearing, turns a sprocket wheel 218 about a vertical axis. This sprocket 218 drives an endless chain 219 which passes around a horizontal flange 220 of a cylindrical ring 221 that is mounted on and around the tower 61.

The ring 221 carries a plurality of teeth 222, each insert in the flange 220 and replaceably secured by a bolt 223, as in FIGS. 19 and 19A. Conveniently the teeth 222 may be widely spaced around the ring; while in some instances greater numbers may be used, the structure shown includes six such teeth, distributed 60° apart. The links 224 connecting the vertical rollers 225 of the chain project laterally so as to embrace the upper and lower faces of the flange 220, whereby in traversing the span between the outer side of the sprocket wheel 218 to the ring 221, the chain is guided into place in registry with the flange 220 and appropriately engages successive teeth 222 for drive of the tower.

The underside of the gear assembly 217 may conveniently support a plate 226 which carries a pair of spaced rollers 227, 227 that bear on the outer surface of the ring 221. Thus by suitable adjustment of positioning of the plate 226 and the rollers 227, a desired spacing is maintained between the sprocket wheel 218 and the driven ring 221 on the tower, so that the chain 219 is kept suitably taut and accuracy of its driving registration with the teeth 222 is maintained.

The carriage 62 is thus a structure which is basically arranged to be supported by the tower 61, and to turn freely around it, on a vertical axis. Suitable means, e.g. the motor 215, chain 219 and related elements, are provided for continuously driving the carriage in its described path of rotation.

RUN-OUT CONVEYORS

The run-out conveyors 75, 76 are designed to receive bricks delivered endwise in one direction or the other from a central distributor mechanism in the carriage, as described below, and to transport the bricks to the locality of lining construction. As shown in FIG. 20 the conveyors conveniently extend at an acute angle to the side boundaries of the carriage as defined by the corner columns 197, so as to provide abundant clear space for working personnel on the platforms described below. As will be seen, the conveyors are conveniently aligned with the central distributing mechanism 230 and therefore with each other, and are spaced apart by a considerable distance at the center of the carriage, to accommodate such mechanism. Since the two conveyor systems 75, 76 may be identical, the following description will relate to only one of them, chiefly as exemplified by the conveyor 76, shown in FIGS. 34 to 39, but it will be appreciated that conveyor 75 is exactly the same and its parts are identified by the same numbers, e.g. in FIG. 20.

Referring then to one of such conveyors, as illustrated in the views just mentioned, and also in FIGS. 22 and 23, the structure includes a first or main section 231, comprising a pair of spaced channel members or beams 232, 233, each of which supports a long angle member 235 in like, parallel, spaced relation. A multiplicity of conveyor rollers 236 are journaled for free rotation in the upright flanges of the angles 235, providing an elongated roller conveyor bed, as shown. At its inner end the section 231 is supported on a base plate 238 which may extend entirely across the carriage 62 at a level below the conveyors, being appropriately mounted on the columns 197.

Although other fixed or movable supports may be employed, the conveyor is conveniently held to rock about a horizontal axis at the end adjacent the distributor mechanism 230, so as to afford varying degrees of slope downward toward the lining wall 67 under construction. Thus, for example, each of the elements 232, 233 may carry at its lower surface, near its inner end, a horizontal pin 239 which extends pivotally into an appropriate hole or recess at the upper end of a corresponding upright member 240 secured to the base plate 238 (see FIGS. 22, 23 and 34). Thus the roller assembly 231 held by the frame, which includes members 232, 233, and appropriate cross-members 242, is seated above the base plate 238, and as desired, can rock about the horizontal axis of the pins 239.

An adjustable extension of the roller bed is provided by a pair of arms 244, 245 which are spaced approximately the width between the channel members 232, 233 are arranged to slide within and alongside such members. These arms or plates 244, 245, being connected by cross-members 246, 246, thus constitute a sliding frame adapted to telescope into the frame of the roller section 231. As indicated in FIG. 38, the disposition of the channels 232, 233 is such as the accommodate the arms 244, 245 beneath the angles 235, lower support for the arms being provided by bars 247, 247, welded to the lower side of the channels.

Pivoted at the outer end of the roller section 231, a chain of conveyor rollers 248 is arranged to lie on the arms 244, 245 to the extent to which the latter are extended. The chain 248 comprises a succession of links 249, 250 alternating along each side and joined at the journals or bearings of successive rollers 252, the necks of the rollers thus providing connecting pins for the links. Alignment of this conveyor chain 248 with the supporting arms 244, 245 is achieved by depending plates 253 welded at the lower side portions of the alternate links 249 so as to overhang the outer faces of the arms.

The arm 245 has a row of holes 254 along its length for selective cooperation with a securing pin 256 slidably carried in a sleeve 257 that is mounted at the outside of an opening in the conveyor frame member 233 near the outer end of the latter. Thus the pin 256, traversing the sleeve 257 and a selected hole 254 of the arm 245, serves to lock the conveyor extension frame in the desired position. For convenience in withdrawing the pin 256 at desired times a handle 258 is pivoted to the outer end of the pin by a split member 259 which has a cam surface 260 that abuts an outer end face of the sleeve structure 257 and that is shaped to cam the pin outwardly when the handle is rocked the 90°, e.g. from the solid line position to the dotted line position in FIG. 38.

It will now be seen that the supporting frame for the conveyor extension can be slid in and out relative to the first section 231 and can be locked in any desired position, by inserting the pin 256 in a selected one of the holes 254. The conveyor chain 248 rests on the upper edges of the arms 244, 245, and to the extent that such chain is longer than the exposed part of the frame, it hangs over the rounded ends of the arms, for instance as shown at 248a in FIG. 36. Thus the conveyor may be adjusted to a considerable number of lengths, as may be necessary for use of the apparatus with various diameters of inner wall of the vessel 64.

A ball conveyor table 262 is carried by projecting arms 263, 264 that are pivoted on a horizontal axis, respectively to the outer ends of the extendible conveyor arms 244, 245. The device 262 carries a plurality of ball support elements 265, each comprising a ball 266 arranged to turn freely in all directions in a retaining socket 267. The table 262 is shaped to extend over and upon the brickwork 67 being laid up at the interior of the furnace wall, e.g. as shown in FIGS. 20, 34 and 39. Thus it is advantageously elongated in the direction of the conveyor path and carries several groups of six or seven ball elements 265, with their upper surfaces in essentially the same plane as the rollers 252 and 236. The device 262 also has a sloping delivery plate 269 along one side, and at its underpart is provided with several supporting wheels or rollers 270, as well as coacting ball supports such as indicated at 271. Such roller means for the underside of the table permit the latter to rest on the brickwork and to roll along as the operation progresses and as the conveyor moves around the inside of the furnace by virtue of the rotation of the carriage.

While the entire conveyor assembly may be supported from beneath by the carriage structure and also by the seating of the ball table on the brickwork (with suitable supporting means then included between the table and extension arms), a convenient arrangement for holding the outer part of the conveyor may include a bail 274, pivoted at the same locality as the arms 263, 264, i.e. at the ends of the extension arms 244, 245. This bail may be adjustably hung with a cable 275, from an upper part of the carriage, e.g. as shown in FIG. 1.

As will now be appreciated, the run-out conveyor is extendable through a wide arrangement of adjustment by virtue of the extension frame 244-245 and the roller conveyor chain 248, the device being shown in full extension in FIGS. 34 and 35 and in somewhat reduced extension in FIG. 36 where the unused section 248a of the chain hangs down between the remaining bed and the ball table 262. Essentially zero extension is provided by full retraction of the arms 244, 245, e.g. to a locality where the pivots for the ball table support are seated back in notches of the main section arms, e.g. notches as indicated at 277 in the channel 232. Although the conveyor is shown essentially as horizontal in FIGS. 34 to 36, it is normally utilized at some downward slope around the pivot ends 239, for instance as appears in FIG. 1, such slope being readily adjustable to conform with the precise level of the brickwork being laid up. Successive bricks delivered endwise to the conveyor travel along the rollers 236, 252 and thence onto the ball table 262, where the working attendant may slide them sideways and down the ramp or slope 269, for deposit essentially in the desired position as indicated by the brick 70f in FIG. 39.

CARRIAGE PLATFORM

The retractable platform assembly 195 is supported by the carriage 62 at a lower locality, suitable for working personnel to stand on the platform while performing the bricklaying operation. Referring to FIGS. 1, 20 and 40 to 48 inclusive, the platform includes two movable sections 280, 281 arranged horizontally at the same level. These sections are each constituted by a horizontal frame having side supporting rails or beams, the side rails 282, 282 of the section 280 being positioned inward of the side rails 283, 283 of the section 281, so that the pair of rails may slide within the rails 283, while both sections are arranged to slide horizontally (in thus overlapping relation) toward and away from the center of the carriage 62.

This assembly is disposed beneath a lower horizontal base plate or fixed platform 285 which is carried by the columns 197 of the carriage and which has secured beneath it a pair of parallel H-section members 286, 286, so disposed that their outer channels serve as ways for the sliding rails 283, 283, while their inner channels serve as ways for the like sliding members 282, 282 (FIGS. 45 and 46). A pair of parallel screw members 288, 289, of the nature of lead screws, are carried beneath the platform or plaate 285 with their axes parallel to the path of travel of the platform sections 280, 281. These screws 288, 289 are journaled at their ends in appropriate bearing blocks 290, 291, secured under the base 285, and respectively carry the meshing gears 292, 293 whereby the screws can be rotated about their axes, together. The screw 289 has a shaft extension 294 extending to a drive motor 295, for example a suitable hydraulic motor. A cross-member 296 of the platform frame 280 carries a fixed nut or female member 298 in threaded engagement with the screw 288, while a like cross-member 299 of the other platform unit 281 carries a similar nut or female member 301 which is threaded on the screw 289. It will now be understood that the screws 288, 289 have their threads of appropriate hand such that upon turning the screws simultaneously (in opposite directions of rotation) by drive from the motor 295 and with the aid of the gears 292, 293, the platform units are moved toward or away from each other, and correspondingly inward or outward of the carriage 62, depending on the direction of drive of the motor.

Floor grill sections 302, 302 are removably disposable in the side rail assemblies 282, 282 of the platform section 280, while similar floor grill sections 303 are likewise removably disposable in the side rail parts 283, 283 of the section 281. In use of the platform structure, and assuming that the frames of the sections 280, 281 are fully retracted beneath the carriage plate 285, the motor is energized to drive the sections apart and outward, by the screws 288, 289. When the desired position has been reached, grill sections 302, 303 are inserted, in a sufficient number on each side, to occupy the exposed open space of the corresponding platform frames. Likewise, when it is desired to retract the frames, one or more of the grill sections may first be removed, as necessary to accommodate the desired retraction.

Each of the sections 280, 281 carries at its outer end a further platform section 305; these are identical except in the spacing of their supporting elements as necessary to accommodate the related one of the sections 280, 281. Thus each such outer section 305 has a pair of arms 306, 306 pivotally secured to the side rails of the adjacent platform section at 307, 307. The arms 306, 306 extend further inward, toward the carriage 62, and are connected by a cross-bar 308 at their undersides, whereby the section 305 may be folded up to a vertical position as shown in FIG. 41, or swung down about the pivots 307 to a horizontal position where the cross-member 308 abuts the underside of the rails (282 or 283) of the adjacent platform section 280 or 281. In the latter position, the outer section 305 is firmly supported in horizontal relation. At its lower side, adjacent its outer end, each section 305 supports a plate 310, which carries a roller or bearing wheel 311, freely rotatable about a vertical axis and having a suitable, partly spherical or other curved surface, as shown, for abutment with the wall of brickwork 66 or 67 around the inside of the furnace vessel. This plate 310 has a pair of slots 312, 312, through which it is supported by bolts 313, 313, to be slidable toward and away from the furnace wall. By tension springs 314, 314, extending from a bar 315 on the plate 310, outward to appropriate cleats 316, 316 at the underside of the platform section 305, the plate 310 and thus the wheel 311 are urged outwardly, keeping the wheel in firm rolling contact with the furnace wall.

As will be seen, the platform assembly is basically extensible and retractable, and by virtue of the further folding sections 305, 305, can be withdrawn to compact relation in and against the carriage as for removal of the structure from the furnace vessel. At the same time, the platform can be extended to whatever degree is necessary for accommodating the varying inside diameters of the vessel, while it and indeed the entire tower-carriage assembly, are stabilized by the engagement of the rollers 311 with the interior lining of the vessel as it is built up.

BRICK DISTRIBUTING MECHANISM

The brick distributor generally designated 230 is mounted on the carriage, specifically the base plate 238, at a position between the inner ends of the run-out conveyors 75, 76, so as to receive bricks successively dumped from the elevator baskets 155 as shown in FIG. 13. Referring to FIGS. 20 to 23 and 26 to 30, this mechanism includes a central, circular base or plate 320, which has a peripheral cover skirt 321 and which is carried, and indeed integrally if desired, by a vertical hollow shaft 322, supported in a suitable bearing block 324 that is mounted in an opening of the plate 238 (see FIGS. 20, 21 and 27). At its underside, the base 320 has secured to it a gear 325 which meshes with a pinion 326 on a short vertical shaft journaled in a bearing 327 in the plate 238 (see FIG. 26, noting its special section line for clarity). The pinion 326 also meshes with another pinion 326a on a like, similarly journaled shaft which at its lower end, below the plate 238, carries a sprocket wheel 328. This sprocket 328 is turned by a chain 329 from another sprocket wheel 330 at the lower end of a long upright shaft 332 that is carried through a bearing 333 in the plate 238. The shaft 332 includes universal joints 334, 335, respectively near the plate 238 and at its upper end, where it is a downward extension of the shaft 336 which carries and turns the carriage-driving sprocket wheel 218 (FIGS. 17 and 18).

By the described arrangement, including the long shaft structure 332 that extends downward from the carriage drive mechanism, the circular base 320 is continuously turned relative to the carriage and indeed in such fashion that the base 320 maintains a single, constant orientation relative to the tower 61. Thus for example, with a one-to-one ratio of the sprockets 328, 330 and with the overall gear ratio of the pinion 326a to the gear 325 (through the pinion 326) selected for identity of turning displacement with the ratio of diameters of the carriage-driving sprocket 218 and the tower ring flange 220, the plate 320 will maintain a constant position relative to the tower while the carriage is turned by its drive mechanism.

The distributor mechanism functions through the operations of a distributor table 340, which is secured in horizontal position at the upper end of a vertical shaft 341 which is journaled in the hollow center of the shaft 322, so as to be rotatable relative to the latter and to the plate 320, about the same axis. The table 340 is spaced considerably above the plate 320 by an upper extension 342 of the cylindrical shaft 322. As shown in FIGS. 20, 21 and 28 to 30, the distributor table 340 comprises a central plate 344 and several similar plates 345 arranged on each side of the larger center plate 344, the plates being secured together in coplanar arrangement to form the table surface, by a bar 346 secured at the side of the assembly, i.e. along the surface of the plates 344, 345 near one end of each. Thus the table is constituted by the plates, with mutual spacing between them, open along one side, so as to accommodate certain chute arms as described below. The plate also carries an inclined rest or stop 347, above and at the same side as the member 346, with a resilient surface or layer to prevent damage to bricks coming against the stop. Projecting beyond the face of the stop 347 there is disposed the operating arm 348 of a suitably housed limit switch of conventional construction, identified as LS–13.

A set of movable chute arms 350, also collectively referred to as the receiving chute 350, are mounted at their ends on a transverse shaft 351 which is supported in suitable bearings by members 352 carried on the plate 320. These arms 350 are thus adapted to rock about the axis of the shaft 351 from a lower or down position as indicated in solid lines in FIG. 27, to an upper or inclined position as indicated in broken lines in the same figure. The arms 350 are disposed to pass between the plates of the table 340, and can do so when the table is turned to a suitable position relative to the plate 320 and conveniently identified as the "zero" position, where the shaft 351 is beneath and parallel to the side bar 346 of the table 350. The shaft 351 also carries a downwardly extending crank arm 353 which is connected by a link 354 to an eccentric pin 355 of a rocking member 356 that is adapted to be turned about a horizontal axis 357 by a suitable hydraulic motor 358. Thus as the motor operates to turn the member 356 clockwise in FIG. 27 (or counter-clockwise in FIG. 30), the link 354 is pulled back across to the position shown in broken lines at 354a in FIG. 30, and the arm 353 is correspondingly rocked so that the chute arms 350 are raised to their upper inclined position, i.e. the brick-receiving position indicated by broken lines in FIGS. 13 and 27.

Hence when the distributor table 340 is disposed in the zero position relative to the plate 320, which carries the chute arm mechanism, and the motor 358 is operated to move the member 356 through a sufficient arc to elevate the chute arms 350, the assembly is in position to receive a brick 70g dumped from a basket 155 of the elevator. The chute arms thus receive a brick, which comes to rest against the stop 347, at the same time rocking the switch arm 348 downward to shift the limit switch LS–13 (FIGS. 13 and 27). With the brick so received, the mechanism including the motor 356, is caused to return the chute arms to their down position beneath the table 340, whereupon the brick comes to rest on the table, extending lengthwise thereof parallel to the elements 346, 347, and across at least several of the plates 344, 345. Since the table 320 is constantly moved to remain in alignment with the tower, the zero position of the distributor table 340 being therefore a position of like alignment for reception of a brick, this location of the table is in effect continuously changing relative to the carriage and its run-out conveyors 75, 76 by reason of the turning of the carriage to serve successive regions around the furnace wall. Accordingly, having received the brick 70g, the distributor table 340 is then turned on its axis relative to the plate 320 so as to come into alignment with the run-out conveyors, and in this position (FIG. 20) the brick can be pushed onto one or the other of such conveyors, as by mechanism described below. The described rotation of the distributor table 340 is effected by a hydraulic motor 360, having a drive shaft 361 coupled to the lower end of the shaft 341 (FIGS. 27 and 31).

*Transfer of bricks to and from the distributor*

As indicated, the successive baskets 155 of the elevator are tilted, during their passage around the lower sprockets 148, in order to dump each brick on the chute arms 350 as shown in FIG. 13. For this purpose each basket carries a cam follower pin 364 (FIG. 12) projecting laterally from each of the outermost arm elements 157 and arranged to coact with a cam 365 extending across the tower, inside and near each sprocket 148. It will be understood that this arrangement, as shown in FIG. 13, is duplicated at the locality of the other, lower sprocket, so that the cam follower 364 of the basket arm 157 at the opposite side functions identically with the structure illustrated. In other words, it is sufficient to show and describe only one of these means, with the understanding that the action is the same adjacent the other sprocket.

The cam 365 has a camming surface which includes a deep V-shaped notch 366, with a curved bottom, below the downcoming side of the chain 146, and then a curved bend 367 in the cam surface, leading into a shallow, elongated, concavely curved portion 368. The cam 365 is conveniently disposed in a vertical area between the chain 146 and side plates 160 of the baskets, the follower pins 364 being disposed to project into this region but having endwise clearance from the inner side of the chain. As each basket 155 descends and begins to be carried around the sprocket, while swinging on its supporting plates 160, 161, the follower pin 364 descends into the bottom of the cam notch 366 as indicated at 364a. Continuing movement of the chain causes the follower pin to ride along the inclined surface of the notch and over the curve 367 at 364b, 364c, tilting the basket 155 upward around and behind its pivotal support 162. The pin 364 thereafter rides along the cam surface 368, maintaining the basket in tilted position while the chain carries it around beneath the sprocket, the successive locations of the pin being indicated at broken lines in FIG. 13. In this fashion the basket is rocked so as to dump the brick 70g down onto the chute arms 350, now located in their upward position, and the brick comes to rest against the inclined seat 347 as described above, for ultimate lowering to the distributor table 340.

When the table 340 has ultimately been turned (after descent of the chute arms) into alignment with the run-out conveyors 75, 76, a pusher mechanism advances the brick endwise onto a selected one of these conveyors. This mechanism is supported by a rectangular framework 370 mounted on the base plate 238, in general alignment with the conveyors, as shown in FIGS. 20 to 25. The moving parts comprise a horizontal beam or cross-member 371 which has bearing sleeves or blocks 372, 373 at its ends that are traversed by parallel rods 374, 375 so that the member 371 can slide back and forth along the rods. The beam 371 is also connected, as at the lower part of the blocks 372, 373, to a pair of endless chains 376, 377, which respectively ride over idler sprockets 378, 378 at one end, and over drive sprockets 379, 379 at the other end. Thus the chains, extending horizontally parallel to the rods 374, 375, beneath the latter, are arranged to cause the cross-member or beam 371 to slide along the bars in a direction parallel to the paths of the run-out conveyors 75, 76, and over the region of the distributor mechanism 230. The sprockets are carried on suitably journaled, short shafts, such as the shafts 380, 380 for the sprockets 379, 379, the latter shafts also carrying gears 381, 381 in mesh with gears 382, 382 on a long transverse drive shaft 383 that extends across the frame 370 below the run-out conveyor 75 and is supported in suitable bearings in the frame. Appropriate power drive for the shaft 383 is provided, for instance the hydraulic motor 385 coupled at 386 to an extended portion of the shaft 383.

The cross-member 371, thus arranged to sweep over the distributor table 340 and also over the entrance regions of the run-out conveyor roller sections 231, 231, is adapted to engage a brick on the distributor table and move it to one conveyor or the other. Thus, for instance, at a central region, the member 371 carries a pair of depending plates 388, 389 which are positioned to engage and push a brick that is resting on the table, these plates being disposed to clear the rest structure 347 of the table when the latter is in a position of alignment with the conveyors, i.e. as shown in FIG. 20. In other words, the pusher mechanism functions to push a brick endwise onto one or the other of the roller conveyor sections 231, by the engagement of a corresponding one of the plates 388, 389 with the end of the brick, when such plate is moved from one end to the other of its path of travel. In this fashion bricks are removed to the run-out conveyors, for delivery by the latter to the desired position adjacent the actual bricklaying operation.

*Automatic control and operation of distributor*

The operation of the brick distributor 230 and associated transfer mechanism is effected automatically with the aid of limit switches and other electrical control devices. For convenience, the location of a number of these switches and the arrangement of certain controlling instrumentalities for the hydraulic motors is shown schematically in FIG. 49, it being understood that where not otherwise illustrated, the switches are structurally positioned on suitable elements of framework in places where the described operation can occur.

It has been explained, for example, that the distributor table 340 carries a limit switch LS–13 having an operator 348; as shown in FIG. 49, impact of a brick on the element 348 closes the normally open contacts of switch LS–13, the same thereafter opening again when the chute arms 350 lower the brick to the table. The position of the chute arms is registered by two limit switches LS–16 and LS–17 (see also FIGS. 28 to 30), which are mounted on the base 320, at opposite ends of the path of travel of the horizontal operating link 354. The switch LS–16 has an operator 390 which is shifted by the link 354 when the chute arms 350 are in the down position, so as to close the normally open contacts of this limit switch. The switch LS–17 is disposed to have its operator 391 engaged by the other end of the link 354, when the latter is in the broken line position of FIG. 30, thereby to close the contacts of this switch at the time the chute arms 350 are in their up position. A further limit switch LS–18 is mounted, conveniently on the framework of the tower, at a locality alongside of the path of the descending baskets 155, the place of this switch being illustrated in FIG. 49, such that a basket arriving at a position just before the brick-dumping operation causes the otherwise-closed contacts of this switch LS–18 to be opened, for control purposes as explained below.

At suitable localities at the ends of the path of the pusher beam 371, two limit switch devices are respectively mounted, e.g. being appropriately disposed on the frame of the pusher mechanism, in locations as illustrated in FIG. 49. Thus a limit switch group LS–11 is arranged at one end of the pusher travel, which may as a matter of convenience herein be considered the righthand end. As shown, the location of the pusher, as designated by its beam 371, at the extreme right position, closes the contacts LS–11B and opens the contacts LS–11A (mechanically operated together) of this limit switch. When the pusher 371 moves away from this position, the electrical condition of the switches LS–11B and LS–11A is reversed. Similarly at the opposite end of the travel of the pusher beam 371, the switch arrangement LS–15 comprises contacts LS–15A which are closed when the pusher is absent and contacts LS–15B which are linked thereto and are opened at the same time. Upon arrival of the pusher beam at this lefthand location, the electrical condition of the limit switch elements LS–15A and LS–15B is reversed, remaining so until the pusher again moves away.

The several hydraulic motors for actuating the distributor and brick transfer parts are also shown schematically in FIG. 49, with their similarly illustrated connections for receiving hydraulic fluid under pressure from an appropriate pumping and supply system which may be of conventional character, indicated at 395. Thus the motor 385 for the pusher has hydraulic supply lines extending through a neutral and reversing valve 396, for connection by continuing lines 397 to the supply means 395. The motor 360 for the distributor table has similar hydraulic feed lines through a similar neutral and reversing valve 398, further including the lines 399 extending to the supply means 395. The hydraulic operating device 358 likewise has hydraulic feed lines extending through a reversing valve 400 and continuing as the lines 401 to hydraulic source means 395.

The valves 396, 398 which may be of a conventional type, have a normal neutral position where the corresponding motors 385 and 360 are maintained at rest, and also have opposite extreme positions, as indicated diagrammatically, for driving the motors in one direction or the other. A solenoid 5–SOL is provided, in a conventional manner, for shifting the valve 396 in a direction to drive the pusher beam 371 to the left, i.e. when this solenoid is energized. A like solenoid 6–SOL, upon energization, shifts the valve 396 to the opposite end position for moving the pusher beam 371 to the right. Solenoids 3–SOL and 4–SOL are arranged in like fashion relative to the valve 398, for respectively positioning this valve to turn the distributor table in one direction (hereinbelow defined as the forward direction) when the solenoid 3–SOL is energized, and in the opposite or retracting direction when the solenoid 4–SOL is energized. Appropriate spring or like means can be included, as indicated, to restore the valves 396 and 398 to central, neutral positions when neither of the associated solenoids is energized.

The chute arm control valve 400 is arranged, as by a tension spring 402, to keep the hydraulic actuator 358 in such connection with the hydraulic supply means 395 that the chute arms 350 are normally maintained in their down position, i.e. the solid line position in FIG. 49. A solenoid 9–SOL is disposed so that upon energization, it shifts the valve 400 to a position where the hydraulic actuator moves the chute arms 350 to their up position, maintaining them there so long as solenoid 9–SOL is energized. When the latter is deenergized, the valve then returns to the chute-arm-down position, causing the arms to travel to and remain in such position.

Referring to FIGS. 20, 21 and 28 to 30, the underside of the distributor table 340, i.e. conveniently beneath one of the outer plates 345, carries a detent 405 which is adapted to engage a stop 406 that projects upwardly from a housing 407 which is carried on the base 320. It may be explained that forward movement of the table 340, relative to the base 320, carries the table from the position shown in FIG. 21, to the position shown in FIG. 20, i.e. being a counterclockwise rotation from brick-receiving, tower-aligned position (FIG. 21) to the position (FIG. 20) for delivery of bricks to the run-out conveyors 75, 76. During such forward motion the detent 405 moves away from the stop 406, and on the reverse or retract movement (clockwise) of the table, the detent can be brought into reengagement with the stop, i.e. at the stated zero position of the table. Although the stop 406 can be a simple fixed element where the maximum table movement is 180° as described below, it is shown as a plunger upwardly pressed by a spring 408 against a limit plate 409, i.e. normally keeping the stop in the path of the detent 405. Such structure is useful where the table control means requires displacement of the table up to 360°, or otherwise if provision is needed for turning the table counterclockwise past the stop; a sloping cam face 410 at the opposite end of the detent can then engage a like face 411 on the stop 406, camming the latter downward against the spring 408.

The plate 320 also carries a limit switch LS–12 having an operating arm 412 arranged in the path of the detent 405 so that when the latter strikes the arm 412 and moves it down beneath the lower surface of the detent (from an upper position of the arm) the limit switch LS–12 has its contacts opened, such contacts being otherwise closed, i.e. when the distributor table 340 is away from the zero position.

While the stop 406 has been described as arresting the table in zero position, it may actually be disposed at an angular location, around the table axis, a few degrees beyond (and the detent 405 likewise a few degrees back); the function of the limit switch LS–12 is to arrest the table, by opening the switch (regardless of the stop) at the zero position. In the slightly angled arrangement (as shown), positive stop engagement need not occur in most clockwise retractions of the table, but is available for safety and permits a slight misalignment of the table that can be tolerated at certain times as explained below.

For electrical connection to parts such as the limit switches mentioned above that are carried by the plate 320, the lower portion of the shaft 322 may carry suitably insulated contact or slip rings designated 415 (FIGS. 27, 31 and 32), which are continuously engaged by suitable brushes 416 that are connected in the desired circuits as described below. Likewise for electrical connection to the limit switch LS–13 on the distributor table 340, a lower part of the shaft 341 may likewise carry insulated contact or slip rings 417 (FIGS. 27 and 31) engaged continuously by brushes 418 for similar connection to the desired circuit. As will be understood, the conductors leading from the several contact rings 415, 417 extend through hollow spaces or channels in the metal structures that support the several limit switches, detailed showing being omitted for simplicity. The brushes 416, 418 are carried by supports 421, 422, respectively, that are mounted on an upright channel member 423 fixed between the underside of the base plate 238 and a lower part of the carriage 62. The drive motor 360 for the distributor table may also be supported from the channel 423. For electrical connection of power and control circuits between the carriage 62 via the tower to upper localities and stations, the tower may carry a plurality of suitably insulated contact or collector rings 419 (FIGS. 1 and 14), e.g. at a locality below the circular rail 202, to be engaged by brushes indicated by a holder for same at 420, mounted at a side of the carriage 62.

For control of the positioning of the distributor table 340 in desired alignment with the run-out conveyors 75, 76, a lower part of the table shaft 341 carries a circular cam plate 424 having two projecting cam noses 425, 426, which are adjustably mounted, as shown, for accuracy of positioning, and which are adapted to engage the operating arm 427 of a limit switch generally designated LS-19 (FIGS. 21, 27 and 33). This switch is carried on supporting structure 428 secured to one flange of the upright channel 423, so that the switch arm 427 projects radially inward into the path of the cam noses 425, 426, the arm 427 being adjustable in its operating length (and thus in angle of swing by the cam) relative to the shaft at its pivot axis 429 which turns to actuate the switch. Assuming that the movement of the carriage 62 and thus the entire supported assembly including the run-out conveyors 75, 76, is in a clockwise direction as seen in plan in FIGS. 20 and 21 (so that the ball tables 262 travel on the previously completed course of brick away from the locus of work at the course under construction), a convenient arrangement of the switch LS-19 is such that the forward movement of the distributor table 340, away from zero position, is counterclockwise. These directions are indicated by arrows adjacent the conveyors in FIGS. 20 and 21 and also by the arrow next to the channel 423 in FIG. 33, the channel and switch being moved with the carriage and conveyors as the latter progress slowly around for delivery of bricks to successive points.

As viewed in plan in FIG. 33 and with the directions of movement of the parts as stated above, the structure of the switch LS-19 is such that on displacement of the arm 427 clockwise about its pivot 429, i.e. when engaged by either of the radially straight faces of the cam noses 425, 426, the arm 427 moves from normal (dashed-line) to full line position in FIG. 33 and shifts the normally closed switch contacts LS-19-A to open position and the normally open switch contacts LS-19-B to closed position (as shown in FIG. 33), these switch elements being suitably linked together. When either cam nose, for instance the cam nose 425, rides completely past the bearing roller 427a at the end of the arm 427, the arm returns to normal, radial position relative to the cam plate 424 (as by suitable spring bias, not shown) and rides down the sloping face of the cam nose; in such normal position of the switch, the contacts LS-19-A are closed and the contacts LS-19-B are open. Any relative motion between the cam and the carriage-supported channel 423 in the opposite direction, will merely swing the arm 427 idly counterclockwise about its pivot.

The electrical function of the switch LS-19 is in part to arrest the distributor table when movement of it (by the motor 360) has brought one or the other of the cam elements 425, 426 (which turn with the table) into such engagement with the switch arm 427 as to swing it clockwise( i.e. in switch-actuating position.

For convenience of illustration, the channel 423 and thus the switch LS-19 are shown in FIG. 21 and other views as disposed so that the switch arm 427 is aligned with the paths of the run-out conveyors 75, 76, while the radial faces of the cam noses 425, 426 are shown aligned on a common diameter through the axis of the table shaft 341 (also on or close to a line through the operating face of the detent 405), but it will be understood that other physical orientations of these parts, around the axis of the shafts 341 and 322 may be adopted. The function of the cam system 425-426 and the switch LS-19 can be exactly the same regardless of their angular locations relative respectively to the distributor table 340 and the run-out conveyors of the carriage.

Although the function of the cam-controlled switching and related parts has been explained above, reference to the diagrammatic views of FIGS. 50 to 54 inclusive will further illustrate such operation. In FIG. 50 the parts are shown as in FIG. 21, with the distributor table 340 (dashed lines) at the zero position where the detent 405 has engaged the arm 412 of the limit switch LS-12. On movement of the table forward (counterclockwise), it and the cam 424 advance in the direction of their arrows until the cam nose 425 strikes and displaces the switch operator 427, actuating the switch LS-19 and arresting the table in the dot-and-dash position 340a in desired alignment with the run-out conveyors 75, 76 for delivery of a brick to one of them. On retracting movement of the table 340 (by operation of the motor 360 in reverse direction), it and the cam 424 move clockwise until the detent 405 actuates the limit switch LS-12 to bring the parts to a stop at the zero position of orientation for receiving another brick from the tower.

In FIG. 51, after a number of cycles of brick delivery, the slow clockwise rotation of the carriage has brought the switch-carrying channel 423 to such location that in zero position of the table the cam nose 425 is in effective operating engagement with the arm 427 of the limit switch LS-19. In this situation it is not necessary for the distributor table 340 to move at all in the forward direction; it is already suitably aligned with the run-out conveyors 75, 76, as well as with the tower and elevator, so that after reception of a brick and downward displacement of the chute arms 350 (FIG. 49), the brick may be pushed off onto the selected conveyor.

FIG. 52 illustrates the parts after the carriage has moved clockwise through a small further angle, indicated at a. Since the cam nose 425 has not yet cleared the switch arm 427, the switch LS-19 remains in actuated position. This slight angular deviation of the distributor table 340 can be tolerated, and any tendency of the moving carriage to exaggerate it is limited and accommodated by the small angular positioning of the stop parts including element 406, mentioned above. As in the situation of FIG. 51, no forward movement of the table occurs, and although there may be some slight misalignment, there is in fact no impairment of or interference with the desired function of receiving a brick and the subsequent operation of pushing the brick from the table onto one of the run-out conveyors.

In FIG. 53, the carriage has continued its clockwise movement so that in the zero position of the table, the cam nose 425 is angularly located beyond the switch arm 427, the latter having cleared the cam and resumed its normal position. In these circumstances, movement of the table clockwise to forward position is effectuated, specifically until the other cam nose 426 engages the switch arm 427. The motions of the cam and table are indicated by arrows in FIG. 53, the table being brought to rest in the dot-and-dash position, with the switch LS-19 actuated by movement of the arm 427 to dotted position. Reverse rotation of the table, after removal of the brick, restores it to the dashed-line position, where switch LS-12 is again actuated.

FIG. 54 illustrates the parts at a further, subsequent stage of the carriage rotation, where the control of arrest of the table 340 is still effected by the engagement of cam nose 426 with the switch arm 427, the angular forward travel of the table being less than for the carriage position of FIG. 53. As will now be understood, further turning movement of the carriage and conveyors brings the switch LS-19 and its arm 427 around to a point where the switch is in operated engagement with the cam nose 426 at the zero location of the table. The functions then are similar to the situations of FIGS. 51 and 52 (on slight further movement of the carriage), except that the cam nose 426 is now in play instead of the cam nose 425. Thereafter the travel of the carriage repeats the sequence of positions, with appropriate function of the nearest one of the elements 425, 426, to the switch LS–19, for control of the table forward movement.

While other arrangements of cams and limit switches may be employed, as for example by utilizing only a single cam nose to function through table forward rotations up to 360°, or by employing a single cam projection with a pair of oppositely disposed switches corresponding to the device LS–19 (with alternate functioning for table movements up to 180°), the illustrated combination, including the two cam noses 425, 426 and the single switch LS–19, is notably simple and effective and provides expedited operation in that the greatest required forward displacement of the table is about 180°.

Although ordinarily the movement of the carriage may be so slow during continued automatic operation that there is no displacement of the distributor table 340 beyond the limits of operative tolerance in its dwell at either zero or forward position, the zero stop element 406 positively prevents any excessive misorientation of the table by reason of clockwise carriage movement and corresponding rotative displacement of the housing of the motor 360 by the carriage-mounted suporting channel 423. The hydraulic connections to the motor 360, moreover, are preferably such as to allow the motor to function as a pump whenever a force on the table, such as the stop 406 or other load, causes relative movement between the table and carriage. Thus in FIG. 49 the hydraulic lines 430a, 430b are bridged by a pair of oppositely directed check valves 431a, 431b in series, in a conduit having a center line running to a spring-loaded relief valve 432 discharging to a suitable sump or other body of oil employed as the hydraulic fluid. The lines 430a, 430b also have separate inlet check valves 433a, 433b arranged to draw oil from an appropriate sump or other body.

For example if the valve element 398 is disposed in its off position (as shown) but the motor shaft is turned relative to the motor housing in such direction as to create suction in the line 430a, the check valve 433a opens to allow oil to be drawn into this line and thence to the motor, while the corresponding pressure in the other motor conduit 430b forces oil through the check valve 431b and out through the relief valve 432. Similar action, involving function of the check valves 433b and 431a, occurs if the motor shaft is turned in the opposite direction. In either case, the motor functions as a pump, permitting accommodation of the distributor table to the external force as explained above. The described by-pass valving thus acts as an overload device and also keeps the system, e.g. the motor and its supply lines, filled with oil to prevent cavitation.

A suitable electrical circuit for automatic operation of the brick distribution and delivery is shown schematically in FIG. 55, where various limit switches and valve-controlling solenoids are identified as in other views. For simplicity, the wiring diagram of this figure omits switches, relays and other conventional instrumentalities that may be connected in conventional ways for control of the hoist, elevator and carriage drive motors, and similar parts whereby the corresponding structures and mechanisms are moved as desired and at adjustable or controllable speeds, for the functions described above.

In relation to the distributor control, the circuit of FIG. 55 includes certain relays which can be of conventional electromagnetic type, such relays being simply indicated by legends and their controlled contacts being identified by corresponding reference characters with contacts that are normally open shown as parallel lines and contacts that are normally closed shown as parallel lines with a diagonal bar, it being understood that the condition of such contacts is reversed when the corresponding relay is energized. Thus there is a relay CR–5, called the normal stop relay, which has normally open contacts CR–5–1, CR–5–2 and CR–5–3. A relay CR–7, called the chute-arms-down holding relay, has normally open contacts CR–7–1 and CR–7–3, and normally closed contacts CR–7–2. A relay CR–17, energized when bricks are to be delivered to only one side (right or left) of the distributor mechanism, i.e. to only one run-out conveyor, has normally open contacts CR–17–2 and normally closed contacts CR–17–1 and CR–17–3 to CR–17–6 inclusive. Relays CRT–1 and CRT–2, respectively designated as pusher right and pusher left relays, are included, having respectively normally closed contacts CRT–1–2 and CRT–2–2 and respectively normally open contacts CRT–1–1, CRT–1–3, CRT–2–1 and CRT–2–3.

For purposes of illustration the elevator drive mechanism, including its electrical motor, is designated at M–1, controlled by a start switch 435, manually closed for running the machine. A switch 436 is arranged to be manually closed to place the automatic distributor and transfer mechanism in operation, interruption of such operation being effected by opening this switch. A three-position switch 437 having two pairs of contacts 438, 439 is designated so that when the switch is in central position, as shown, with neither sets of contacts closed, the operation is to push alternate bricks to left and right, i.e. first to one and then the other of the run-out conveyors 75, 76. When this switch is in upper position, closing contacts 438, bricks are only transferred to the left, while in the lower position with contacts 439 closed, all bricks are pushed off the table to the right, such operation serving situations where delivery is desired along only one of the conveyors. The circuit as shown is intended to be connected to a suitable source of electric current at terminals 440, 441, i.e. for desired energization of electrical driving instrumentalities, control solenoids and relays.

The system further includes a timer mechanism, functioning for timing the cycles of operations of the distributor, which may be a conventional device consisting of a motor and a set of cams driven thereby, with corresponding switches opened and closed at various times as explained below, such mechanism being conveniently arranged to provide a complete cycle of 360° of rotation of the cams, at least in effect. Since this device can be of conventional construction it is illustrated by its drive motor TM and controlled contacts T–1 to T–6 inclusive, shown with schematic representation of their actuating cams. FIG. 56 is a timing diagram, illustrating by vertical solid lines the intervals of closure of the several cam contacts T–1 through T–6 of the sequence timer TM, it being understood that a complete cycle is considered to run from zero degrees (a full 360°), wherein each set of contacts is closed only during the intervals indicated in FIG. 56, the times of closing and opening being represented in each instance by the values in degrees set forth adjacent the several lines of the diagram.

AUTOMATIC OPERATION: ELECTRICAL CIRCUIT FUNCTION

The connection and function of the various elements in FIG. 55 can best be explained in describing a cycle of operation, assuming that the various basic drives are running, including the elevator drive motor 152 and the carriage drive motor 215. Thus the start switch 435 having been closed and one or the other of limit switches LS–17 and LS–18 being in closed position, the elevator drive M–1 is energized (with its motor 152, FIG. 1), so that baskets 155 are bringing bricks successively to the lower end of the elevator for dumping, individually onto the chute arms 350 (FIG. 27). Likewise by connections which may be of conventional character, the carriage 62 is turning very slowly under the drive of its motor 215 (FIG. 18) and the base 320 is maintained in alignment with the tower and elevator.

Referring to FIGS. 55 and 56, and also as necessary to FIGS. 21, 27, 30, 33 and 49, it may be assumed that the pusher 371 is at the righthand position, the distributor table 340 is at the zero position (FIG. 21), the chute arms 350 are raised (FIG. 27) and the switch 437 is in condition to provide delivery of bricks alternately to the right and left. The control switch 436 has also been closed, for automatic operation, so that electrical energy is available from the conductors 442, 441.

Arrival of a brick 70g on the chute arms 350 closes the limit switch LS–13, energizing the relay CR–7, which thereafter remains energized for a temporary period its now-closed contacts CR–7–3 and limit switch LS–11–B (pusher right position). Contacts CR–7–1 of the relay are also closed, initiating energization of the timer TM. The previously closed contacts CR–7–2 of the relay are now opened, interrupting the circuit which had been energizing the chute arm control solenoid 9–SOL. In consequence the chute arm control valve 400 shifts to the arms-down position (FIG. 49) and the arms 350 move down to the solid line position of FIG. 27, lowering the brick 70g onto the table 340 and opening the contacts LS–13. The relay CR–7 remains temporarily energized, however, through its holding contacts CR–7–3.

Arrival of the chute arms at their down position effects closure of limit switch LS–16 (FIG. 49) so that as soon as the timer TM effects closure of contacts T–6 (at the 10° point in the cycle), a circuit is completed through the table-forward solenoid 3–SOL, it being noted that both limit switches LS–19–A1 and LS–19–A2 are now closed, since the table is still at zero position. Solenoid 3–SOL then shifts the valve 398 (FIG. 49) to effect rotation of the table 340 in the forward direction, turning itself and the brick into alignment with the run-out conveyors. The length of time that the timer contacts T–6 are closed, namely from 10° to 80° in the cycle, is long enough to accommodate the maximum time of travel of the table by its drive motor 360. It may be here noted that even before closure of contacts T–6, the timer holding contacts T–5 have been so closed, so that the timer TM remains energized and running, at least until the end of 180° in the cycle, even though relay CR–7 becomes deenergized and its contacts CR–7–1 open when the pusher is put in operation as described below.

Arrival of the table at conveyor-aligned position (FIG. 20, also as shown in dot-and-dash lines in FIGS. 50 and 51 to 54) opens one or the other of the LS–19–A switches and deenergizes the table-forward solenoid 3–SOL, thereby arresting the table in such location. At the same time, one or the other of the LS–19–B switches is closed (and thereafter remains closed until the table is retracted), whereby current supply is effectuated to the conductors 443, 441, such connection being insured by the closure of the timer contacts T–5 as described above.

The brick 70g is now ready to be pushed off the table, i.e. toward the left under the conditions assumed above. Noting that the normal stop relay CR–5 is energized concurrently with the timer TM, and therefore contacts CR–5–2 are closed, and noting further that contacts T–2 of the timer have been closed or become closed (at the 60° point in the cycle), the pusher left solenoid 5–SOL is energized from conductors 443, 441. It happens that relay contacts CRT–2–1 are also at this time energized but their function is not needed at this point, in view of the normally closed condition of contacts CR–17–5. In consequence the valve 396 is shifted to cause the motor 385 to drive the pusher 371 to the left (FIG. 49) delivering the brick endwise onto the run-out conveyor 75. The pusher stops when arrested by terminal structure (not shown) at the end of its path of travel, the hydraulic motor 385 permitting such function. In due season the timer contacts T–2 open, their period of closure (FIG. 56) being predetermined to accommodate the full pusher travel. In the meanwhile, upon departure of the pusher from righthand position, the limit switch LS–11–B opened and since limit switch LS–15–B did not close until the pusher reached the lefthand terminus, the circuit to relay CR–7 through its holding contacts CR–7–3 was interrupted, deenergizing this relay. This last-mentioned condition also opened contacts CR–7–1, but as indicated above, both the timer TM and the relay CR–5 remain energized (until the 180° point) by virtue of timer contacts T–5.

Since limit switch LS–12 has been closed ever since the distributor table 340 moved away from the zero position, the time delay relay TR–3 has been conditioned for control alternatively by limit switches LS–11–B and LS–15–B, for energization, from conductors 442, 441. It may be noted further that the table retracting solenoid 4–SOL is energizable through a circuit which includes contacts TR–3–2, normally closed contacts CR–17–3 and timer contacts T–3, together with the same limit switches that control energization of relay TR–3 itself. While switch LS–11–B was closed at the outset of the cycle before the pusher moved away from the righthand position, resulting energization of relay TR–3 did not affect the solenoid 4–SOL, inasmuch as timer contacts T–3 were then open, and indeed did not close until the 90° point in the cycle (FIG. 56), some 10° after the latest time at which the table could reach the forward position and the pusher would begin its leftward travel, causing opening of the switch LS–11–B and deenergization of the relay TR–3. Indeed the delay time of closing of contacts TR–3–2 would insure corresponding delay of any possible premature energization of solenoid 4–SOL until after the pusher had moved away from the righthand position. Upon arrival of the pusher at the lefthand position, closing switch LS–15–B, the time relay TR–3 is energized, through switch LS–12 now closed. Due to closure of timer contacts T–3 (see FIG. 56), the closure of relay contacts TR–3–2 now permits energization of solenoid 4–SOL, the small delay in closure of contacts TR–3–2 being such as to insure completion of the brick delivery movement (and onward travel of the brick down the run-out conveyor) before the last-mentioned solenoid is energized. The valve 398 is accordingly shifted to the table retract position and the motor 360 drives the distributor table 340 back to the zero point. Thereupon the switch LS–12 is opened, interrupting energization of relay TR–3 and the solenoid 4–SOL which it controls. In consequence the motor 360 is arrested, with the table in zero position.

At this stage a circuit between conductors 442 and 441 is established through the solenoid 9–SOL to energize the latter: contacts TR–3–1 have been instantaneously reclosed by deenergization of relay TR–3, contacts CR–7–2 have already been restored to their normally closed state, and timer contacts T–4 are closed for a brief interval, at the 175° point in the cycle. In consequence the valve 400 is shifted to the arms-up position and the hydraulic actuator 358 raises the chute arms 350 in location to receive another brick. At the 180° point of the timer cycle, the contacts T–5 open stopping the timer and also deenergizing relay CR–5.

At this point the limit switch LS–18 coacts with the limit switch LS–17 to arrest the elevator and thus prevent dumping of a brick, should the chute arms 350 not have been raised. The approach of a basket opens the switch LS–18 and as shown in FIG. 55 if the switch LS–17 is not then closed by movement of the chute arm drive link 354 to the arms-up position, the circuit to the elevator drive M–1 is open. This protective feature is effective each time a basket approaches the dumping position, it being noted that at other times when the chute arms are necessarily down, the basket check switch LS–18 is closed and keeps the elevator running.

The distributor and brick pushing cycle for the next brick is in most respects the same as above described for lefthand delivery. Thus the reception of the brick on the chute arms, the downward movement of the latter, the initiation of operation of the timer as well as the preceding energization of relay CR–7 are all as stated. Likewise the movement of the table to the forward position (by energization of solenoid 3–SOL) and the arrest of the table at such location and consequent shift of one set of switches LS–19–A and LS–19–B are the same as has been explained. It will be noted, of course, that the timer is now running through the half cycle beginning after 180°, but with similarly situated sequences of function of contacts T–3, T–4, T–5 and T–6. Since the pusher is now at the left end of its travel, the closure of the timer contacts T–1, at the 240° point in the cycle, initiates energization of the solenoid 6–SOL, through a circuit which includes contacts CR–5–3 (now closed by the re-energization of relay CR–5) and normally closed contacts CR–17–6. Contacts CRT–1–1 are also closed but not necessary in this particular mode of operation. The solenoid 6–SOL in consequence shifts the valve 396 to the pusher-right position and the motor 385 correspondingly drives the pusher, moving the brick to the right and onto the run-out conveyor 76.

On movement of the pusher away from its left-hand position, limit switch LS–15–B was opened and since limit switch LS–11–B was not yet closed, relay CR–7 became de-energized in the same manner and with the same consequences as explained for the first half cycle.

At the righthand end of its path the pusher is arrested in the same manner as at the lefthand end, and the timer contacts T–1 open (FIG. 56) to restore the pusher valve 396 to neutral. Closure of limit switch LS–11–B by arrival of the pusher at its terminus also effects energization of the time delay relay TR–3 through the switch LS–12 (closed because the table is away from zero position) and in consequence by the same circuit as previously described, the solenoid 4–SOL is energized and the table is retracted (by motor 360, FIG. 49) to reach the zero position once more. At this locality the chute arms are again raised and the timer is stopped (by opening of contacts T–5) in the previously stated manner. The apparatus is now in condition to receive a further brick and complete the entire cycle, delivering such further brick to the left and the next succeeding one to the right, all over again.

It may be noted that when the table moved away from the forward position one set of contacts LS–19–A and LS–19–B was shifted, re-conditioning the circuit to the table-forward solenoid 3–SOL for energization upon closure of switch LS–16 and contact T–6 after the beginning of the next cycle. Likewise the switch LS–19–B, being opened, positively interrupted current supply to either of the pusher control solenoids 5–SOL and 6–SOL; such interlock being desirable to avert any motion of the pusher when chute arms are elevated into the path of the latter. It may also be explained that by simple auxiliary connections not necessary to be shown in detail, the various motors, through their control solenoids, can be operated independently (with appropriate care to avoid interference) to position the various parts for initial start-up or to correct any mislocation with respect to the desired course of the cycle; in such fashion the table can be set at zero position, the pusher at an appropriate end of its path and the timer likewise disposed at the zero degree point. The relay CR–5 has the function of maintaining the automatic operation to the end of a given half cycle, should the switch 436 be opened to arrest the machine. That is to say, if the switch 436 is opened, the relay contacts CR–5–1 remain closed and in effect bridge the switch until timer contacts T–5 open, e.g., at the 180° or zero degree (360°) point. Hence if the machine is to be stopped, the switch 436 is simply opened and the functioning will continue until the end of the current half cycle, with delivery of the brick completed and the parts in readiness to be re-started when desired.

The foregoing automatic operations of brick distribution and push-off are basically controlled by the sequence timer TM, so that the total half-cycle is the same, regardless of the distance that the distributor table must move to reach the forward position and likewise to retract to the zero position. While conceivably other sequential controls can be employed, with each step simply dependent on the completion of the preceding step and with perhaps some economy in time where the table travel is relatively brief, the sequence timing system affords good correlation with continuous operation of the elevator. It is convenient to run the elevator at a constant speed, utimately accommodated to the work of laying the bricks, and not to try to keep changing the elevator speed in accordance with changes in time of movement of the distributor table. Since the elevator then, over any extended period of time, deposits bricks at regular intervals, the distributor mechanism cooperates effectively where it has a cycle of uniform duration; the elevator speed is simply set to insure an interval between successive deposits of a brick that is at least as long as, or preferably longer than, the distributor half-cycle.

The apparatus is also operable to deliver bricks in one direction only, as for example to the lefthand conveyor 75. In such case each full-cycle includes an idle return of the pusher to the right, and if necessary the elevator speed may be adjusted slower than for delivery in both directions, i.e. in order to accomodate a full timer cycle between successive deposit of bricks. To initiate operation in one direction, for example to the left, the selector switch 437 is set in the corresponding position, i.e. closing contacts 438. The pusher should be initially at the righthand of its path, and the start switch 436 is then closed. The operations are exactly the same as described for two-direction delivery, up to the point where the distributor table has been moved to its forward position, opening one of the switches LS–19A, and closing one of the switches LS–19B. As before, the timer TM and relay CR–5 have been energized, and in due season, shortly after the table travel is ended, the timer contacts T–6 open.

For purposes of this cycle it will be noted that relay CRT–2 has been energized through normally closed contacts CRT–1–2 of relay CRT–1 (the latter being deenergized because the pusher is at the right and has kept switch LS–11A open) and through switch LS–15A, which is located at the left end of pusher travel and is closed only by arrival of the pusher there. Energization of relay CRT–2 opens its contacts CRT–2–2, thus thereafter, for a while, maintaining relay CRT–1 deenergized even though the pusher moves away from the righthand position and allows closure of switch LS–11A. The pusher is now operated to move the brick from the distributor table to the left, by virtue of energization of the leftward pusher drive control solenoid 5–SOL through timer contacts T–2, now closed, relay contacts CRT–2–1, now closed, one of the switches LS–19B and timer contacts T–5. The brick is thus delivered to the lefthand run-out conveyor 75, as desired.

When the pusher reaches the end of its stroke, at the lefthand position, it opens switch LS–15A thus deenergizing relay CRT–2 and therefore restoring contacts CRT–2–2 to closed condition. Since departure of the pusher from the righthand position has allowed closure of switch LS–11A, relay CRT–1 is now energized, and in consequence by closure of its contacts CRT–1–3 the one-way delivery relay CR–17 is now energized through the previously closed switch contacts 438. It is noted that several of the solenoid control circuits contain normally closed contacts of this relay CR–17 so that when the relay is energized such circuits are open. Hence although one-half of the cycle is nearly completed, opening of contacts CR–17–3 prevents energization of solenoid 4–SOL and consequent retraction of the table. Opening of contacts CR–17–4 likewise prevents energization of solenoid 9–SOL so that the chute arms cannot be raised, and finally during the beginning of the second half-cycle there can be no energization of the table forward-moving solenoid 3–SOL, since contacts CR–17–1 are open.

Although timer contacts T–5 open briefly at the 180° point in the cycle, the timer TM and relay CR–5 remain energized because contacts CR–17–2 of the relay CR–17 are now closed. Hence the timer continues immediately to run through the second half of its complete cycle. As indicated above, there is no forward movement of the table and one of the switches LS–19A remains open and one of the switches LS–19B remains closed. In due course, at the 240° point, timer contacts T–1 close and through relay contacts CRT–1–1 (closed because of energization of relay CRT–1 as explained above) the pusher right solenoid 6–SOL is energized, causing the pusher to return to its righthand position. Although switch LS–15A recloses upon movement of the pusher away from its lefthand location, the relay CRT–2 is not yet energized again, since contacts CRT–1–2, in its circuit, are kept open by the continuing energy of relay CRT–1. When the pusher arrives again at the righthand end of its travel it opens switch LS–11A, deenergizing the relay CRT–1, and in consequence of the restoration of its contacts CRT–1–2 to closed position, and the previous closure of the switch LS–15A, the relay CRT–2 is again energized. Upon the de-energization of relay CRT–1 its contacts CRT–1–3 have also been opened, causing deenergization of the one-way delivery relay CR–17 and restoring normally closed condition of its contacts CR–17–1, CR–17–3 and CR–17–4 in the several solenoid control circuits described above.

The table is now retracted to the zero position by energization of solenoid 4–SOL in its circuit as has been described in relation to two-way operation. When the table completes its movement and re-opens switch LS–12, the time delay relay TR–3 is deenergized, causing interruption of the energization of solenoid 4–SOL and stopping the table motor 360, the timer contacts T–3 also in due season opening. As before, when timer contacts T–4 close the solenoid 9–SOL is energized, causing the chute arms to rise in preparation for reception of another brick and initiation of a further, identical, complete cycle. The timer, of course has stopped, by reason of opening of its contacts T–5, relay CR–5 also becoming deenergized.

If it is desired to operate by pushing bricks only to the right, the equipment is started with the pusher 371 located at the lefthand end and with the sequence timer TM at the 180° point in its cycle. These conditions can be achieved (while temporarily holding the table forward and the chute arms down) by running the timer TM and the pusher left drive (5–SOL) by suitable independent connection (not shown) of these elements to a source of current, but the same result can be readily attained upon closing the start switch 436 into running position (while the brick delivery switch 437 is in its central two-way location), and then after a brick has initiated operation of a cycle, opening this switch 436 to stop the apparatus. Such operation, although permitting one brick to be delivered to the left, brings everything to rest at the end of one-half cycle, so that the timer is at the 180° point and the pusher is at the lefthand location. Thereupon the switch 437 is set in the lower position, closing its contacts 439 for righthand delivery only, and the start switch 436 is closed.

The operation is essentially the same as described for lefthand brick delivery only, except that the working delivery of bricks is achieved by closure of timer contacts T–1 and energization of solenoid 6–SOL, while the idle return delivery is to the left by energization of timer contacts T–2 and solenoid 5–SOL, the cycle of the timer functioning as if beginning and ending at the 180° point. The functions of the relays CRT–1 and CRT–2, are in effect reversed in that the relay CRT–1 is first energized, before the operation of the pusher to the right (since switch LS–11A is then closed and switch LS–15A is then open), whereupon after the pusher completes its movement to the right, the relay CRT–1 becomes deenergized and the relay CRT–2 is energized. This action occurs because switch LS–15A closes (as the pusher leaves the lefthand position), conditioning the circuit of relay CRT–2 for energization when contacts CRT–1–2 later close, and because arrival of the pusher at the righthand CRT–1 and effecting such re-closure of contacts locality opens switch LS–11A, deenergizing the relay CRT–1–2.

In this case, energization of relay CRT–2, on such brick delivery to the run-out conveyor 76, causes energization of relay CR–17 through the circuit of the closed switch contacts 439 and the contacts CRT–2–3, now closed, of relay CRT–2. Relay CR–17 thus performs its previously described function of opening contacts CR–17–1, CR–17–3 and CR–17–4, to prevent any table or pusher movement and also closes its contacts CR–17–2, to keep the timer running and the relay CR–5 energized through the mid-point of the sequence cycle, which in this instance is the 360° (or 0°) point. It may be noted here that also because of this function of the relay CR–17, opening the switch 436 to stop the apparatus will nevertheless permit the system to complete a full cycle (with the aid of relay CR–5) and bring the parts to a stop after the system has delivered a brick and moved the pusher back to the original position. This same function will also occur in the case of operation for brick delivery to the left only, a full normal stop in such situation occurring with the timer at zero degrees whereas for righthand delivery only, the timer will always stop at 180°. Of course, as explained above, if two-way delivery is being effected, the normal stop occurs at the end of a half-cycle, which can be either zero degrees or 180°.

Referring again to the righthand delivery operation, contacts CR–17–2 keep timer TM going, allowing solenoid 5–SOL to be energized by closure of timer contacts T–2 (through relay contacts CRT–2–1 now closed in this instance), restoring the pusher to the lefthand location, in the same fashion as the energization of the pusher-right solenoid 6–SOL for corresponding idle return of the pusher when left delivery only is effected. When the pusher again reaches the lefthand position it opens switch LS–15A, deenergizing relay CRT–2 and permitting re-energization of relay CRT–1 through switch LS–11A, previously closed and contacts CRT–2–2 now re-closed. Since contacts CRT–2–3 are now again open the relay CR–17 is deenergized and its several normally closed contacts again become closed, permitting the operations of table retraction and chute arm elevation to occur as described above for other modes of operation. Finally, opening of timer contacts T–5 deenergizes the timer TM and the relay CR–5, whereby the parts come to rest with the pusher at the lefthand locality and the timer at the 180° point, ready for a repetition of the cycle when a brick arrives on the chute arms and closes the switch LS–13.

It should be noted, particularly with respect to operation for delivering bricks only to the right or only to the left, that the time delay of closure of contacts TR–3–2 cooperates in avoiding false operation of the table retracting solenoid 4–SOL at the mid-point of the complete cycle. The zero position limit switch LS–12 being closed (with the distributor table in forward position), closure of either switch LS–11B or LS–15B at the end of the actual brick pushing stroke, completes the circuit for energizing the relay TR–3. Although the relay CR–17 is presumably energized at or about the same time, as a result of energization of one of the relays CRT–1 and CRT–2, any lag in the opening of contacts CR–17–3 at this stage is of no consequence in permitting unwanted energization of the table retracting solenoid 4–SOL; the circuit for the solenoid remains temporarily open at the contacts TR–3–2, their delayed function thus allowing time for the contacts CR–17–3 to become open. Hence the table remains motionless at this stage and until after the return, idle stroke of the pusher has been effected.

AUTOMATIC BRICK ESCAPEMENT CONTROL

Referring back to the brick feeding mechanism 72 described in connection with FIG. 8, FIG. 57 is a simplified schematic view of electrical and compressed air circuits for operating the brick escapement mechanism. The air cylinders 184, 185 for the gate and brick-holding shoe respectively are connected through a reversing valve 450 to a suitable source 451 of air under pressure, the piping to and from the cylinders being so arranged that when the gate 178 is down the shoe 187 is up and vice versa. Suitable means such as the tension spring 452 keeps the valve 450 in a position where the gate 178 is in its lower, brick-restraining position and the shoe 187 is raised. A solenoid 454 is adapted, on energization, to shift the valve 450 to reverse position for elevating the gate and lowering the shoe.

The structure of the gate and associated parts including the conveyor chain 145 and the basket 155, is shown essentially schematically in FIG. 57 but will be understood to correspond with the illustration of FIG. 8. Appropriately disposed in the path of a rising basket 155 which has just lifted a brick 70a from the chute arms, a limit switch LS-21 is adapted to be momentarily closed by the passage of such basket or brick thereon. Upon closure of this switch a circuit is completed through the solenoid 454, across the terminals 456, leading to a source of electric current, whereby the solenoid is energized. At the same time a time delay relay TR-1 is also energized from the same current source through the switch LS-21. This relay has contacts TR-1-1 immediately closed upon energization of the relay and contacts TR-1-2 which are normally closed (with the relay deenergized) but which only open after a passage of time following energization of the relay. These contacts TR-1-1 and TR-1-2 are connected in series, across the portion of the circuit occupied by the switch LS-21. Hence when the latter switch re-opens as the basket 155 rises beyond it, the stated relay contacts keep the relay TR-1 energized and particularly the solenoid 454. In consequence the valve 450 is shifted so that the cylinder 184 raises the gate 178 and the cylinder 185 lowers the shoe 187 to hold the brick 70c when the gate has released the brick 70b. The time delay for opening of the contacts TR-1-2 is set to allow the gate 178 to remain open, i.e. in its upper position, long enough for the brick 70b to slide down the conveyor to the chute 172. Then the contacts TR-1-2 open and immediately deenergize the relay TR-1 and likewise the solenoid 454. As a result, the valve 450 is restored to its normal position, as shown, by the spring 452, and the cylinders 184, 185 are correspondingly activated to drop the gate 178 and elevate the shoe.

In this fashion successive bricks are automatically delivered to the chute 172, while further bricks are temporarily held and then allowed to come down to the gate 178, thereby effectuating the stated escapement action. The system is advantageously controlled by the limit switch LS-21 so that each time a brick is removed as at 70a, another brick is released to be ready for removal by the succeeding basket of the elevator.

GENERAL OPERATION

The operation of the entire apparatus has in effect been explained in the foregoing description of the several parts. Thus it will be seen that if a furnace vessel 64 is to be relined, and if the bottom bricks have been placed, as by manual or other suitable operation, to a level appropriate for use of the present machine, the latter is carried into place over the vessel, as by a crane engaging the bail 88. With the platforms and run-out conveyors duly retracted or folded to the smallest position adjacent the carriage 62, the entire apparatus is lowered into the vessel and the frame 77 is seated on appropriate support, for example as shown in FIG. 2. The brick delivery mechanism 72 is brought into place, ready for feed of bricks to the elevator. The pin 140 is withdrawn while the tower and carriage assembly 60 is placed under control of the hoist mechanism 100.

The tower, with the carriage 62, is lowered to the desired place in the vessel and the operating personnel, descending on a suitable ladder (not shown) on the tower, effect extension of the platforms 195 to the requisite amount, in the manner described above, so that the rollers 311 abut the lower parts of brickwork already completed. The run-out conveyors are similarly extended as necessary, with the ball tables 262 resting on the face of the last previous course of brick or other similar support, in readiness for work.

With bricks being supplied to the feed mechanism 72 and with the elevator in operation at a desired rate, the brick distributor system can be started. At the same time the carriage rotation is initiated at a suitably slow speed, to accommodate the work of the operators in laying up the bricks as the latter are successively distributed to the ball tables 262. By appropriate manual or automatic control, which may be of conventional sort and is therefore not illustrated, the tower and carriage is progressively raised, with the hoist 100 as each course of brick is finished. Conveniently with two men working respectively adjacent the conveyors 75, 76, each lays up one-half of a complete circular course, whereupon the tower is raised, or may indeed be slowly rising inasmuch as the mounting of the conveyors can readily accommodate a small upward movement of the carriage and tower of this sort even while the course of bricks is being progressively deposited.

The operation thus proceeds, with uninterrupted regular delivery of bricks to the right and left while the carriage slowly turns and the tower and carriage desirably rise. To the extent necessary at the lower locality and also at the narrowing upper part of the vessel, the operators adjust the extensions of the platform 195 and the run-out conveyors, so that they continue their desired functions. As explained, if occasion demands, the apparatus may be operated to deliver bricks in only one direction.

In the described fashion, the machine serves the entire function folining the vessel, i.e. in delivering bricks directly to the localities of laying in the desired brick courses, until the lining is finished. Then the platform 195 may be retracted, and likewise the run-out conveyors 75, 76 may be withdrawn. Finally, upon restoring the pin 140 to its locking position and removal of the brick feed mechanism 72, the entire equipment can be raised and removed. As will be seen, the apparatus accomplishes all of the objects stated hereinabove, as well as further functions and advantages explained or inherent in the foregoing description, especially in providing essentially complete automatic feed and delivery of bricks from a source floor above, down into the vessel and directly to the localities of bricklaying work.

The brick-turning mechanism embodied in the distributor table and associated parts is very advantageous such as to function at all directions of the lateral conveyor means, e.g. while the carriage turns each conveyor from one side to the opposite side (180°) of the furnace interior, and indeed through successive, complete (360°) revolutions of the carriage. In other respects, moreover, the apparatus can readily accommodate various conditions and requirements. Thus the escapement for feeding bricks to the vertical conveyor or elevator can function at any position of the tower and at all times when the tower is actually moving upward, without any special setting or adjustment. As explained, the brick distributor on the carriage is fully coordinated with the brick elevator; it responds to each brick brought down, but if no brick appears, the distributor remains at rest, with the chute arms up, waiting for a brick. Finally, the apparatus, without change or adjustment, can handle a wide variety of sizes and shapes of brick (e.g. with parallel or tapering sides), and is well adapted to programmed delivery of special or different bricks as may be needed for various locations or parts of the courses, by properly composing the row of bricks advancing to the feed escapement.

It is to be understood that the invention is not limited

We claim:

1. Apparatus for conveying bricks from an upper locality to localities in a confined lower region, comprising a tower, means associated with the tower for supporting the same, including hoist means connected with the tower to suspend it in said confined region and driving means for the hoist means to move the tower progressively upward in such region, a vertical conveyor in the tower comprising upper and lower rotating means respectively above said upper locality and adjacent a lower part of the tower, endless carrier means extending around and between said rotating means to provide upwardly and downwardly traveling lengths of said carrier means in the tower, and baskets suspended along said carrier means to travel continuously with the same, means at said upper locality for supplying successive bricks into the path of successive baskets carried by said upwardly traveling length of the carrier means, to be lifted and carried by the baskets around the upper rotating means and then by the downward traveling length of the carrier means, said brick-supplying means being arranged to function while the tower is moved upward by the hoist means, means adjacent a lower part of the tower for transferring bricks from successive baskets and delivering said bricks laterally in the aforesaid lower region, and a carriage supported by the tower at the bottom thereof, which is moved vertically with the tower and which is mounted for rotation on a vertical axis, around the tower, said means for transferring and delivering bricks laterally being associated with said carriage, and including brick transfer means effective to deliver articles from the baskets of the conveyor to the lateral delivering means at all angular positions of the carriage relative to the tower, said brick transfer means comprising a brick-receiving distributor table disposed beneath the lower rotating means of the tower and rotatable upon receiving a brick to turn such brick in accordance with the angular position of the carriage, and including means operable on such rotation of the table, to displace the received brick to the lateral delivering means.

2. Apparatus for conveying bricks from an upper locality to localities in a confined lower region, comprising a tower, means for supporting the tower in said confined region, a vertical conveyor in the tower comprising upper and lower wheel means respectively above said upper locality and adjacent said lower region, endless chain means carried around and between said wheel means, and baskets suspended from said chain means, means for driving the conveyor to provide rising and falling lengths of the chain means respectively carrying baskets upward at one side and downward at an opposite side, means at said upper locality for supplying successive bricks into the path of successive upward baskets of the rising chain means, to be lifted and carried by the baskets around the upper wheel means and then downward by the falling chain means, lateral conveyor means adjacent a lower part of the tower for travel of bricks to said second-mentioned localities, a carriage supported by the tower at the bottom thereof, mounted for rotation on a vertical axis, around the tower, said lateral conveyor means being carried by said carriage, hoist means for progressively raising the tower and carriage together, relative to said brick-suppling means, for delivering bricks to localities at different heights in said lower region, means at the lower part of the tower for tipping successive baskets to deliver bricks therefrom, and brick receiving and distributing means intermediate the vertical conveyor and the lateral conveyor means, receiving bricks from the baskets and controlled in accordance with rotative displacement of the carriage, for turning successive bricks about a vertical axis into alignment with the angular position of the lateral conveyor means as carried by the carriage, said brick receiving and distributing means comprising a brick-receiving distributor table disposed beneath the lower wheel means and rotatable to turn the successive bricks as aforesaid, and including means operable on such rotation of the table, to displace the received bricks from said table to the lateral conveyor means.

3. In apparatus for conveying bricks from an upper locality to a lower region, in combination, a tower, a vertical conveyor in the tower comprising endless carrier means, successive brick-holding devices spaced along the carrier means, and means for moving said carrier means upwardly past said upper locality and downwardly to said lower region, and brick-supplying means at said upper locality, including means for conveying a row of bricks toward the vertical conveyor along a predetermined path and escapement means in said path, comprising means for separately holding and releasing the first and second bricks of said row and means including a control element responsive to passage of successive brick-holding devices, for successively operating said holding means in alternating relation to release successive first bricks in the row, to move into successive devices of the conveyor, while retaining each second brick, and intermediate each such release, to effect movement of each second brick into retained position as the next first brick of the row, said brick holding and releasing means including a device for releasably holding the said second brick of the row, said device comprising plunger means having a shoe, vertically movable to seat the shoe on the top of said second brick for holding the same.

4. In apparatus for conveying bricks from an upper locality to a lower region, in combination, a tower, a vertical conveyor in the tower including successive brick-holding devices arranged to move past said upper locality and to convey the bricks to said lower region, and brick-supplying means at said upper locality, including means for conveying a row of bricks toward the vertical conveyor along a predetermined path and escapement means in said path, responsive to approach of successive brick-holding devices, for releasing successive bricks in said row, to move into the devices, said conveying means including brick-conducting means intermediate the escapement means and the vertical path of said devices, having driving means therefor, for effecting controlled advance of each released brick into one of said devices, said brick-conducting means comprising delivery chute means sloping downward into the path of the vertical conveyor means, including means intermeshing with said brick-holding devices, and conveyor rollers intermediate the escapement means and said intermeshing means, and driving means of said conveyor rollers, to effect said controlled advance of each brick.

5. In apparatus for conveying bricks from an upper locality to a lower region, in combination, a tower, a vertical conveyor in the tower including successive brick-holding devices arranged to move past said upper locality and to convey the bricks to said lower region, and brick-supplying means at said upper locality, including means for conveying a row of bricks toward the vertical conveyor along a predetermined path and escapement means in said path, responsive to approach of successive brick-holding devices, for releasing successive bricks in said row, to move into the devices, said escapement means comprising means for retaining the leading brick of the row, shiftable to non-retaining position, means shiftable to hold the next brick in the row against displacement when the leading brick is released, a control element in the path of the brick-receiving devices, and means controlled by said control element for shifting said brick-retaining means to non-retaining position and for shifting the second brick-holding means into holding position, for delivery of the leading brick to the brick-conducting means, and means controlled by said control element and operated at a delay time after operation of said first means controlled by the control element, for reversely shifting said retaining and holding means to permit the bricks of the row to advance for disposing the second brick in leading position, said second brick-holding means comprising plunger means having a shoe, vertically movable to seat the shoe on the top of said last-mentioned brick for holding the same.

6. Apparatus for conveying articles from an upper locality to localities in a confined lower region, comprising a tower, a vertical conveyor in the tower, means for supporting the tower in such region, and extendable lateral conveyor means carried adjacent a lower part of the tower for receiving and laterally directing articles brought down by the vertical conveyor, said conveyor means including a first lateral guide frame means, conveyor rollers arranged along said first frame means, a second frame means slidable along said first frame means laterally outward thereof, and a chain which consists of a multiplicity of links and conveyor rollers carried by the links and which is connected to said first frame means and adapted to be supported on said second frame means to the extent that said second frame means is extended laterally, to provide adjustable outward length of the lateral conveyor means, said second frame means and chain being constructed and arranged so that when said second frame means is not fully extended, the excess length of said chain hangs down at the end of said second frame means.

7. Apparatus as defined in claim 6, which is constructed and arranged for conveying bricks from said upper locality, to be laid up in courses around said confined lower region, and which includes a carriage supported by the tower at said lower part thereof, mounted for rotation on a vertical axis, around the tower, said lateral conveyor means being carried by the carriage and including a ball conveyor section mounted at the outer end of the second frame means and having roller means for movably seating said section on a course of brick, said ball conveyor section being disposed to provide space for excess length of said chain to hang down between the supported portion of the chain and said section.

8. In apparatus for conveying articles downward to localities peripherally distributed within a confined lower region, in combination, tower means adapted to extend into said region and having an endless vertical conveyor including successive suspended baskets for bringing successive articles to a lower part of the tower means, a carriage associated with the tower means at the lower part thereof and mounted for rotation on a vertical axis, lateral conveyor means on the carriage for carrying articles to localities laterally spaced from the tower means in a direction according to the angular position of the carriage relative to the tower means, a distributor table disposed adjacent the lower part of the vertical conveyor for receiving successive articles from said baskets and mounted to turn on a vertical axis, means for normally maintaining said distributor table in a predetermined orientation with said vertical conveyor and tower means, means controlled in accordance with the angular position of the carriage and operable when an article is received on said distributor table, for turning said table into alignment with the angular position of the carriage, and means operable on said alignment of the table and carriage, for displacing an article from the table onto the lateral conveyor means.

9. Apparatus as defined in claim 8, which includes means for driving said carriage to turn it for delivery of articles by the lateral conveyor means through a range of angular positions extending from one side of the confined region to an opposite side of said region, said means for maintaining said table in said orientation comprising means rotatably associated with the carriage and having an actuating connection with the tower means, disposed in controlling relation to said table to maintain said orientation of the table throughout the aforesaid range of angular positions.

10. Apparatus as defined in claim 8, which includes movable chute means adjacent said distributor table and having means for moving said chute means to an upward position for guiding articles from the vertical conveyor toward the table, and means responsive to arrival of an article on said chute means in the vicinity of said table, for shifting the chute means to a downward position to deposit the article on the table.

11. Apparatus as defined in claim 10, which includes cam means associated with the tower means at a lower part thereof for tilting successive baskets as they approach the distributor table and chute means, to discharge successive articles onto said chute means.

12. Apparatus as defined in claim 11, which includes controllable means for driving the vertical conveyor, a sensing element in the path of successive baskets immediately approaching said cam means, a second sensing means for detecting absence of the chute means from its upward, article-receiving position, and means controllable by both said sensing means for interrupting operation of the vertical conveyor drive means when a basket approaches the cam means and the chute means is not in upward position.

13. Apparatus as defined in claim 10, which includes a control element for sensing absence of said table from said predetermined orientation and means responsive to said control element for preventing operation of said means for moving the chute means upward, when the table is not in said orientation.

14. In apparatus for conveying articles downward to localities peripherally distributed within a confined lower region, in combination, tower means adapted to extend into said region and having a vertical conveyor for bringing successive articles to a lower part of the tower means, a carriage associated with the tower means at the lower part thereof and mounted for rotation on a vertical axis, lateral conveyor means on the carriage for carrying articles to localities laterally spaced from the tower means in a direction according to the angular position of the carriage relative to the tower means, a distributor table disposed adjacent the lower part of the vertical conveyor for receiving successive articles therefrom and mounted to turn on a vertical axis, means rotatably carried by the carriage and having an actuating connection with the tower means, for normally maintaining said distributor table in a predetermined orientation with said vertical conveyor, means controlled in accordance with the angular position of the carriage and operable when an article is received on said distributor table, for turning said table into alignment with the angular position of the carriage, and means operable on said alignment of the table and carriage, for laterally displacing an article from the table onto the lateral conveyor means.

15. Apparatus as defined in claim 14, in which the displacing means comprises pusher means mounted to move across said table, means for driving said pusher means to displace an article from the table onto the lateral conveyor means, and means mounted on the carriage and responsive to positioning of the table in alignment with the angular position of the carriage, for controlling said driving means.

16. Apparatus as defined in claim 15, which includes means operable on completion of an article-displacing stroke of said pusher means by the pusher driving means, and coacting with said means for maintaining the table in the aforesaid orientation, for returning said table to said position of orientation.

17. Apparatus as defined in claim 16, which includes timing means operable through a predetermined cycle of time, for controlling successive operations of said table-turning means, said article-displacing means and said table-returning means, in coaction with the aforesaid means for controlling the pusher driving means, to effectuate said operations in accordance with a predetermined time sequence, to provide for receiving, turning and displacing each article in said predetermined cycle of time.

18. In apparatus for conveying articles downward to localities peripherally distributed within a confined lower region, in combination, tower means adapted to extend into said region and having a vertical conveyor for bringing successive articles to a lower part of the tower means, a carriage associated with the tower means at the lower part thereof and mounted for rotation on a vertical axis, lateral conveyor means on the carriage for carrying articles to localities laterally spaced from the tower means in a direction according to the angular position of the carriage relative to the tower means, driving means for turning said carriage around its said axis, supporting structure rotatably mounted on said carriage and having an actuating connection with the tower means for maintaining said supporting structure in a predetermined orientation with said vertical conveyor, a distributor table mounted on said supporting structure, to turn on a vertical axis, and disposed adjacent the lower part of the vertical conveyor for receiving successive articles therefrom, said structure and table being mutually constructed and arranged for normally maintaining said table in said predetermined orientation, means controlled in accordance with the angular position of the carriage and operable when an article is received on said distributor table, for turning said table into alignment with the angular position of the carriage, and means operable on said alignment of the table and carriage, for displacing an article from the table onto the lateral conveyor means.

19. Apparatus as defined in claim 18, which includes timing means operable through a predetermined cycle of time for controlling the operations of said table-turning means and said article-displacing means in sequence, and means responsive to arrival of an article adjacent the table, for initiating operation of said timing means.

20. Apparatus as defined in claim 18, which includes means operable on completion of an operation of the article-displacing means, for returning the table to said predetermined orientation with the vertical conveyor.

21. Apparatus as defined in claim 20, which includes timing means operable through a predetermined cycle of time for controlling the operations of said table-turning means, said article-displacing means and said table-returning means in sequence, and means responsive to arrival of an article adjacent the table, for initiating opertion of said timing means.

22. Apparatus as defined in claim 18, which includes movable means for guiding an article from the vertical conveyor to the distributor table and having actuating means for moving said guiding means between operative guiding position adjacent the table surface and a second position displaced from the path of turning of the table, means for sensing delivery of an article by said guiding means into position adjacent the table, and means controlled by said sensing means, for controlling said actuating means to move the guiding means to said second position.

23. Apparatus as defined in claim 22, which includes timing means operable through a predetermined cycle of time for controlling the operations of said table-turning means and said article-displacing means in sequence, and means controlled by said sensing means, for initiating operation of said timing means.

24. In apparatus for conveying articles downward to localities peripherally distributed within a confined lower region, in combination, tower means adapted to extend into said region and having a vertical conveyor for bringing successive articles to a lower part of the tower means, a carriage associated with the tower means at the lower part thereof and mounted for rotation on a vertical axis, lateral conveyor means on the carriage for carrying articles to localities laterally spaced from the tower means in a direction according to the angular position of the carriage relative to the tower means, a distributor table disposed adjacent the lower part of the vertical conveyor and normally maintained in a predetermined orientation with said vertical conveyor, for receiving successive articles therefrom and mounted to turn on a vertical axis, means for turning said table, with an article thereon, into alignment with the angular position of the carriage, and means operable on said alignment of the table and carriage and including pusher means movable across said table and driving means for said pusher means, for laterally displacing an article from the table onto the lateral conveyor means.

25. Apparatus as defined in claim 24, in which the lateral conveyor means comprises two lateral conveyors respectively disposed on opposite sides of the distributor table for conveying articles in correspondingly opposite directions, and in which the pusher means is arranged to move back and forth across the distributor table for displacing articles selectively onto each of said conveyors in accordance with the direction of movement of the pusher means, said apparatus including control means selectively operable in accordance with the position of the pusher means at successive, alternate ends of its path across the table, for operating the driving means of the pusher means to displace successive articles alternately onto the said two conveyors.

26. Apparatus as defined in claim 25, which includes supplemental control means for the pusher driving means, settable to effectuate drive of the pusher means in one direction upon completion of an article-displacing stroke in the other direction, without intermediate return of the table to its normal orientation, for providing delivery of successive articles onto only one of said lateral conveyors.

27. In apparatus for conveying articles downward to localities peripherally distributed within a confined lower region, in combination, tower means adapted to extend into said region and having a vertical conveyor for bringing successive articles to a lower part of the tower means, a carriage associated with the tower means at the lower part thereof and mounted for rotation on a vertical axis, lateral conveyor means on the carriage for carrying articles to localities laterally spaced from the tower means in a direction according to the angular position of the carriage relative to the tower means, a distributor table disposed adjacent the lower part of the vertical conveyor and normally maintained in a predetermined orientation with said vertical conveyor, for receiving successive articles therefrom and mounted to turn on a vertical axis, movable chute means adjacent said table and having means for moving said chute means to an upward position for guiding articles from the vertical conveyor toward the table, means for sensing arrival of an article on said chute means in the vicinity of said table, means under control of said sensing means for shifting the chute means to deposit the article on the table, and means for turning said table, with an article thereon, into alignment with the angular position of the carriage, to permit delivery of the article from the table to the lateral conveyor means.

28. Apparatus as defined in claim 27, in which the vertical conveyor comprises an endless carrier and successive article-holding baskets suspended thereon, and which includes cam means associated with the tower means at a lower part thereof for tilting successive baskets as they approach the distributor table and chute means, to discharge successive articles onto said chute means.

29. Apparatus as defined in claim 27, in which the table comprises a plurality of spaced elements and the chute means comprises a plurality of spaced members disposed to move in the spaces between the elements of the table, from said upward position extending above the table, to a shifted position below the table.

30. Apparatus as defined in claim 29, which includes supporting structure rotatably mounted on said carriage and having an actuating connection with the tower means for maintaining said supporting structure in said predetermined orientation with said vertical conveyor, said distributor table being rotatably mounted on and disposed above said structure, said structure and table being mutually constructed and arranged for normally maintaining said table in said predetermined orientation, and said chute means and the moving means therefor being carried on said structure.

31. Apparatus as defined in claim 29, which includes means operable on the aforesaid alignment of the table and carriage and including pusher means movable across said table and driving means for said pusher means, for laterally displacing an article onto the lateral conveyor means.

32. Apparatus as defined in claim 31, which includes means operable on completion of a cross-table stroke of the pusher means, for returning the table to the aforesaid predetermined orientation with the vertical conveyor, and means responsive to arrival of the table again at said last-mentioned orientation, for controlling the moving means of the chute means, to move said chute means into upward position.

33. Apparatus as defined in claim 18, in which the table-turning means includes reversible means for rotatably driving the table, means for initiating operation of said table driving means to move the table from said orientation toward said alignment, and mutually engageable control means carried by the table and the carriage for interrupting operation of said table driving means on arrival of the table at said alignment, said apparatus including means operable after an operation of said article-displacing means, for initiating operation of said table driving means to move the table in reverse direction back to said orientation, and said supporting structure and table having mutually engageable control means for interrupting operation of said table driving means on arrival of the table at said orientation.

34. Apparatus s defined in claim 33, in which said carriage driving means is constructed and arranged for continuously turning the carriage in the same rotative direction as the aforesaid reverse-direction drive of the table by the table driving means, and the aforesaid last-mentioned control means includes stop means preventing reverse-direction movement of said table, relative to said structure, beyond said orientation.

35. Apparatus for conveying articles from an upper locality to localities peripherally distributed within a confined lower region, comprising a tower, a vertical conveyor in the tower, means for supporting the tower in such region, arranged for vertical displacement of the tower, a carriage supported by the tower at a lower part thereof, mounted for rotation on a vertical axis, around the tower, working platform means carried by and extendable laterally from the carriage, lateral conveyor means carried by and extendable laterally from the carriage at a place above and adjacent the platform means, for transfer of article outward from the tower conveyor, driving means for rotating the carriage around the tower, said platform means and lateral conveyor means being constructed and arranged for delivery of successive articles by said conveyor means, as the carriage turns, to peripherally successive localities at a selectable distance from the tower, for use by a person situated on the platform means, a distributor table supported by the carriage at the foot of the vertical conveyor for receiving articles therefrom, said lateral conveyor means having article supporting means substantially level with said table, and pusher means movable across the table for pushing successive articles from the table onto said lateral conveyor means.

36. Apparatus for conveying articles from an upper locality to localities peripherally distributed within a confined lower region, comprising a tower, a vertical conveyor in the tower for delivering articles at the foot thereof in a predetermined horizontal orientation relative to the tower, supporting means associated with the tower, having hoist means for supporting the tower in said confined region and operable for vertical displacement of the tower relative to said supporting means, a carriage supported by the tower at the bottom thereof, mounted for rotation on a vertical axis, around the tower, lateral conveyor means carried by the carriage to distribute articles from the tower conveyor to localities laterally spaced from the tower, in a direction according to the angular position of the carriage relative to the tower, and article distributing means intermediate the vertical conveyor and the lateral conveyor means and controlled in accordance with rotative displacement of the carriage, for turning successive articles about a vertical axis from their aforesaid predetermined delivered orientation to an alignment with the angular position of the lateral conveyor means, said article distributing means comprising means having driving means therefor actuated when the distributing means has turned an individual article to said last-mentioned alignment, for displacing said last-mentioned article onto the lateral conveyor means.

References Cited

UNITED STATES PATENTS

| | | | |
|---|---|---|---|
| 1,020,746 | 3/1912 | Dehler | 198—157 X |
| 1,272,655 | 7/1918 | Gawlet. | |
| 2,121,565 | 6/1938 | Latimer | 254—144 |
| 2,858,763 | 11/1958 | Bloom | 198—157 X |
| 3,033,389 | 5/1962 | Abarotin et al. | |
| 3,106,299 | 10/1963 | Pingon. | |
| 3,285,390 | 11/1966 | Puxkandl et al. | |
| 3,339,710 | 9/1967 | Micgielse et al. | 198—88 X |

FOREIGN PATENTS 99,146 12/1961 Norway.

EDWARD A. SROKA, *Primary Examiner.*

U.S. Cl. X.R.

52—749; 198—88, 101

PO-1050
(5/69)

UNITED STATES PATENT OFFICE
CERTIFICATE OF CORRECTION

Patent No. 3,439,794          Dated   April 22, 1969

Inventor(s) Francis W. Park; Arthur K. Blough; Stanley Darwin Noll; William F. Delfeld; George I. Kraus & Robert Kraus It is certified that error appears in the above-identified patent and that said Letters Patent are hereby corrected as shown below:

Column 2, line 56, for "conference" read --conformance--.
Column 8, line 15, for "where as" read --whereas--. Column 10, line 54, for "70" read --70e--. Column 11, line 11, for "rackets" read --brackets--. Column 12, line 17, for "insert" read --inset--; line 32, for "of" [first occurrence] read --or--. Column 13, line 46, after "desired" insert --outward--. Column 14, line 15, after "and" insert --the--; line 17, for "ball" read --bail--; line 69 for "plaate" read --plate--. Column 23, line 27, for "suporting" read --supporting--.
Column 24, line 24, for "designated" read --designed--.
Column 25, line 12, after "period" insert --through--. Column 25, line 40, delete "so" [first occurrence]. Column 30, lines 1-3 should read --locality opens switch LS-11A, deenergizing the relay CRT-1 and effecting such re-closure of contacts CRT-1-2.--. Column 32, line 38, for "folining" read --of lining--; line 53, for "advantageous" read --advantageously--. Column 33, line 66, for "suppling" read --supplying--. Column 34, line 51, for "of" read --for--. Column 39, line 34, for "s" read --as--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents